(12) United States Patent
Wakahara et al.

(10) Patent No.: US 6,285,382 B1
(45) Date of Patent: Sep. 4, 2001

(54) RECORDING MEDIUM AND IMAGE FORMING APPARATUS FOR FORMING IMAGE THEREON

(75) Inventors: Shirou Wakahara, Chiba; Tomoko Nishino, Tenri; Yoichi Yamamoto, Nara, all of (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/266,019

(22) Filed: Mar. 11, 1999

(30) Foreign Application Priority Data

Mar. 13, 1998 (JP) ................................. 10-063740

(51) Int. Cl.[7] .............................. B41J 2/41; G02F 1/1333
(52) U.S. Cl. ........................... 347/112; 347/153; 349/12; 349/155
(58) Field of Search ................................ 399/1; 347/120, 347/153, 112; 428/1; 430/20; 349/1, 12, 25, 32, 19, 84, 155, 156, 157

(56) References Cited

U.S. PATENT DOCUMENTS

| | | | |
|---|---|---|---|
| 5,115,330 | * | 5/1992 | Nobile et al. ........................... 349/12 |
| 5,418,096 | * | 5/1995 | Iijima et al. ............................. 430/20 |
| 5,515,144 | * | 5/1996 | Miyasaka et al. ....................... 399/1 |
| 5,594,562 | * | 1/1997 | Sato et al. ............................... 349/12 |
| 5,929,960 | * | 7/1999 | West et al. ............................ 349/156 |
| 6,049,366 | * | 4/2000 | Hakemi et al. ........................ 349/86 |

FOREIGN PATENT DOCUMENTS

| | | |
|---|---|---|
| 5-257133 A | 10/1993 | (JP). |
| 6-18917 A | 1/1994 | (JP). |
| 6-67141 A | 3/1994 | (JP). |
| 7-5418 A | 1/1995 | (JP). |
| WO 89/05231 | 6/1989 | (WO). |

* cited by examiner

Primary Examiner—Joan Pendegrass
(74) Attorney, Agent, or Firm—Nixon & Vanderhye P.C.

(57) ABSTRACT

A recording medium includes a liquid crystal material whose polarizing axis is controlled by an applied electric field, a layer including the liquid crystal material, and spacers for maintaining a constant spacing between the layer, and is formed in the form of a sheet. A visible image is recorded on the recording medium by applying a predetermined electrostatic charge image composed of electrostatic charges on a surface thereof and by controlling the polarizing axis of the liquid crystal material by an electric field formed by the charges of the electrostatic charge image, which controls reflectance or transmittance of incident light.

50 Claims, 38 Drawing Sheets

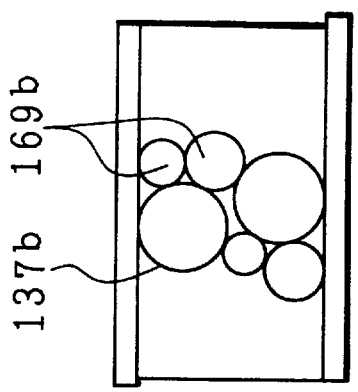
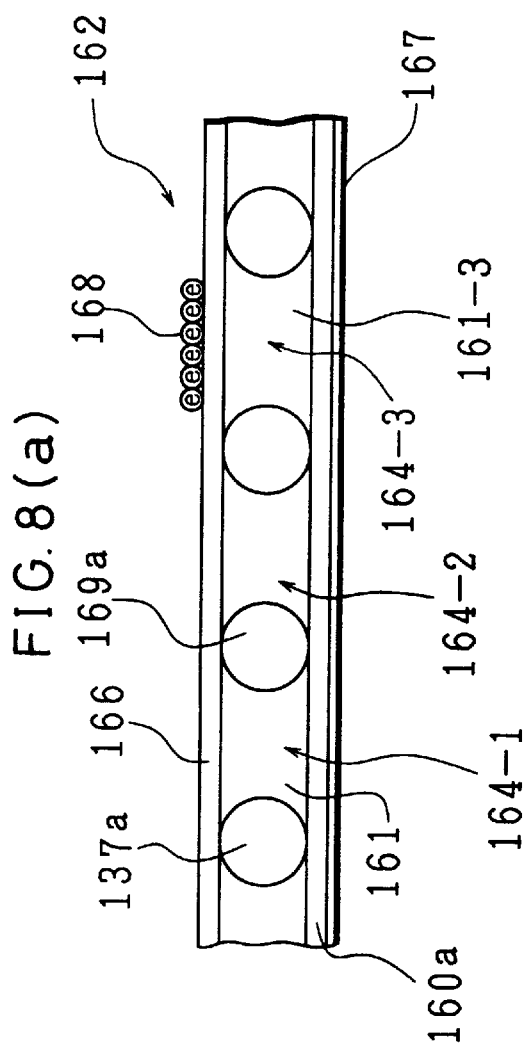
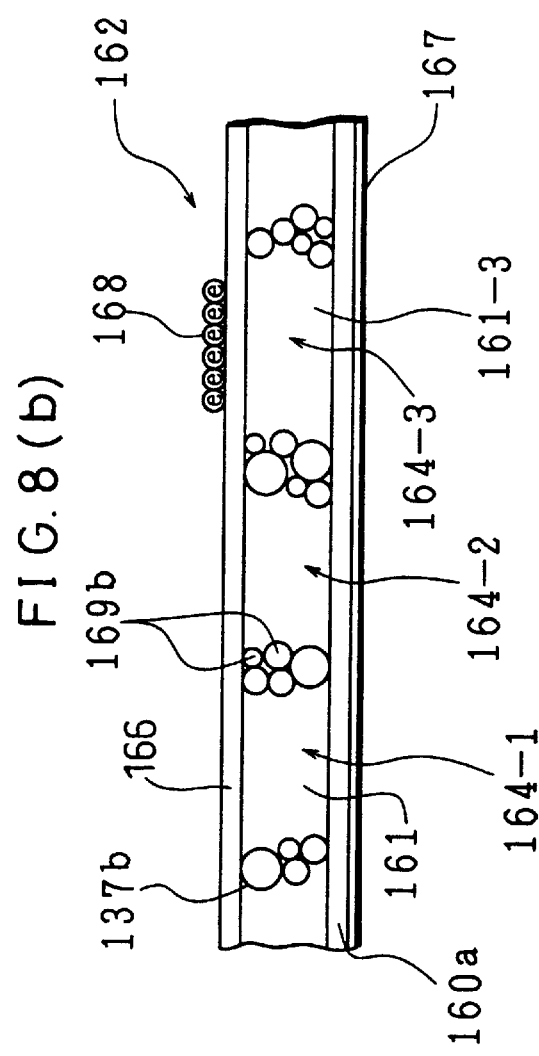

F I G. 20 (a)
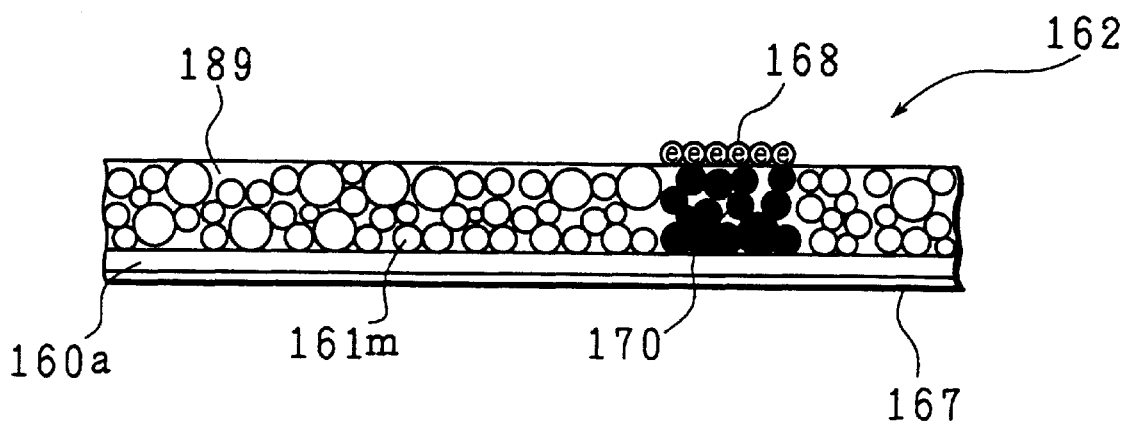
F I G. 20 (b)
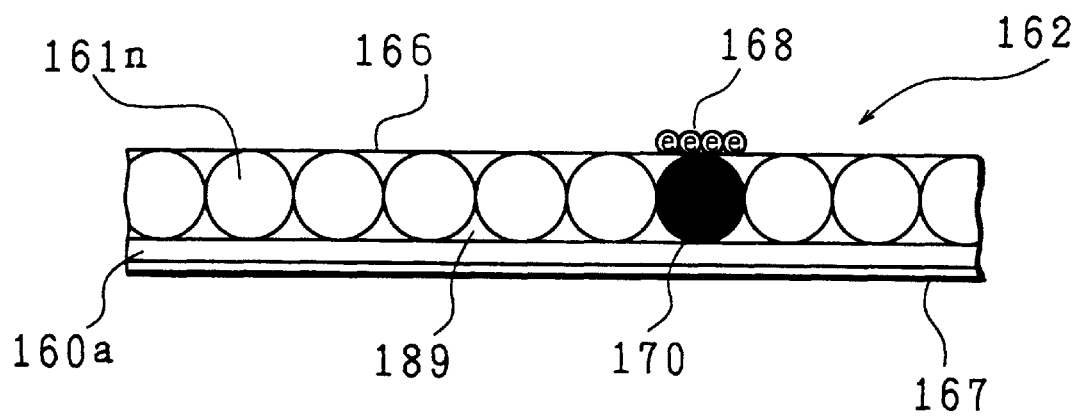

F I G. 39
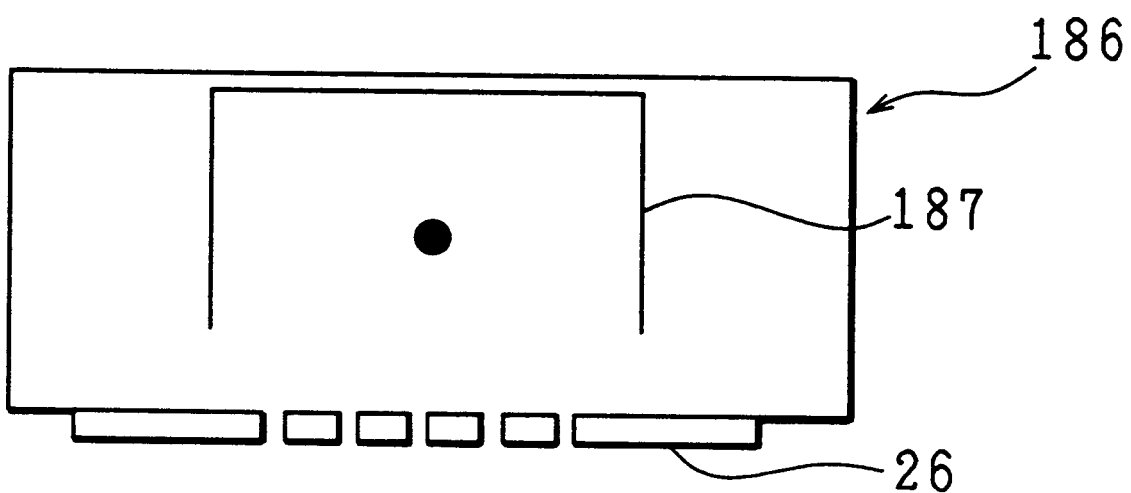

RECORDING MEDIUM AND IMAGE FORMING APPARATUS FOR FORMING IMAGE THEREON

FIELD OF THE INVENTION

The present invention relates to a recording medium and an image forming apparatus for forming an image on the recording medium. The recording medium has rewritability as a replacement of paper, and the image forming apparatus is used as a printing section of digital copying machines or facsimile devices, and as digital printers or plotters, etc., to form an image on the recording medium.

BACKGROUND OF THE INVENTION

For recording of arbitrary information in the form of a visible image, paper has been used conventionally. Also, for recording of arbitrary information on paper, a developer such as an ink has been used. In recent years, there has been research on a display device which displays such arbitrary information in the form of image data, such as a liquid crystal display device, which can be handled easily in the same manner as paper.

Meanwhile, as an image forming apparatus for outputting information as a visible image on a sheet of paper, a laser printer has been widely used along with analog and digital copying machines.

These recording apparatuses form an image by the method in which an electrostatic charge image formed on a photoreceptor is developed using developer particles such as toner and then the developed image is transferred onto a sheet of paper. Meanwhile, printing devices which directly form an image on a sheet of paper have also been widely used. For example, ink-jet printers and thermal printers represent such printing devices. More recently, for example, Published Japanese Translations of PCT International Publication for Patent Applications No. 503221/1989 (Tokuhyohei 1-503221) proposes an image forming apparatus in which an image is directly formed on a recording medium by charged particles which are flown by an electrical force generated by application of an electric field to the charged particles, and are adhered onto a recording medium by changing a potential applied to a control electrode having a plurality of passage pores which are provided in the flying path of the charged particles.

Japanese Unexamined Patent Publication No. 257133/1993 (Tokukaihei 5-257133) proposes a recording method in which an image is recorded by forming an electrostatic charge image on a recording medium having photosensitivity. Also, Japanese Unexamined Patent Publication No. 67141/1994 (Tokukaihei 6-67141) proposes a method in which an image is formed on a recording medium which is in the form of a sheet.

However, the above conventional arrangements have the following problems.

As described, in the above examples, the main recording medium for an arbitrary visible image is paper. Paper is inexpensive and can be easily processed in arbitrary shapes and allows information to be recorded as a visible image conveniently. Further, because a single sheet of paper is thin and light, paper is very easy to handle.

However, while image information formed on paper can be erased or corrected to some extent by various methods, it cannot be erased or corrected completely.

Further, when recording some image information on a sheet of paper, it is absolutely required to use a developer such as toner and ink to visualize the image information. Also, while a single sheet of paper may be light, it adds up to a substantial weight as the amount of information to be recorded is increased.

Faced with and in order to solve these drawbacks, research has been active on a display device which displays arbitrary visual information in the form of electrical image data, such as well-known liquid crystal displays, which are small and light-weight and therefore are easy to carry. Such devices are advantageous because they are capable of storing a large amount of information in a memory and, unlike paper, do not result in an increase in weight even when the amount of information is increased. However, these devices require an energy source such as battery and are quite expensive at present. Further, these devices have a drawback that the degree of freedom in terms of data manipulation is poor as they require other devices such as a keyboard in order to allow user to manipulate data, such as addition and deletion of data.

Meanwhile, as mentioned above, a laser printer, along with analog and digital printers, has been widely used as an image forming apparatus for outputting information as a visible image on a sheet of paper. This recording apparatus forms an image by the method in which an electrostatic charge image formed on a photoreceptor is developed using developer particles such as toner and the developed image is transferred onto a sheet of paper. Meanwhile, printing devices which directly form an image on a sheet of paper have also been widely used. For example, ink-jet printers and thermal printers represent such printing devices. More recently, there is proposed an image forming apparatus in which an image is directly formed on a recording medium by directly adhering toner to the recording medium.

These devices also require a developer for recording the image on a sheet of paper, and it is difficult to correct or erase the image formed on the sheet by these devices other than by forming another image on the original image. Thus, once the image is formed by these devices, it is practically impossible to reuse the sheet bearing the image. Further, these devices are quite complex and expensive.

Japanese Unexamined Patent Publication No. 257133/1993 (Tokukaihei 5-257133) and No. 18917/1994 (Tokukaihei 6-18917) disclose a method in which an image is formed by charges of an electrostatic charge image which is formed on a recording medium having photosensitivity using an electrophotographic process. This method requires the recording medium to be photosensitive and this limits the selection of materials to be used as the recording medium, setting a limit to the cost of the material that can be reduced. Thus, this method is not preferable.

Also, in the arrangement of the device as disclosed in Japanese Unexamined Patent Publication No. 5418/1995 (Tokukaihei 7-5418), because multi-stylus is used, the driver for driving a high voltage applied to each needle electrode needs to have significantly high voltage resistance, and this inevitably increases the number of components, size, and cost of the device, and lowers reliability of the device.

Further, Japanese Unexamined Patent Publication No. 67141/1994 (Tokukaihei 6-67141) proposes an image forming apparatus which forms an image on a recording medium made of a liquid crystal material. However, this apparatus requires the material of the recording medium to have heat resistance due to the fact that fixing means and a transfer voltage are not controlled when carrying out printing on the recording medium. This sets a limit to the selection of the material, and the cost associated with the material is inevitably increased. This apparatus also has a problem that sufficient image formation is prevented as the image is disturbed by a strong electric field used in transfer.

SUMMARY OF THE INVENTION

An object of the present invention is to provide a recording medium having rewritability which is inexpensive and can be handled with ease, and an image forming apparatus for forming an image on the recording medium.

In order to achieve this object, a recording medium of the present invention includes an optical polarizing material whose polarizing axis is controlled by an applied electric field; and a layer including the optical polarizing material, and spacing maintaining member for maintaining a constant spacing between the layer, the recording medium being formed in a form of a sheet having bending elasticity which is bendable, a visible image being recorded on the recording medium by applying a predetermined electrostatic charge image composed of electrostatic charges on a surface of the recording medium and by controlling the polarizing axis of the optical polarizing material by an electric field formed by the charges of the electrostatic charge image, by which reflectance or transmittance of incident light is controlled.

In this recording medium, an image is formed by application of a charge on the surface of the recording medium, thus realizing a recording medium having rewritability which is inexpensive and can be handled with ease.

Also, with the above arrangement, since the spacing maintaining member (spacers) is provided, image formation by the optical polarizing material, and the strength and durability of the recording medium are ensured.

In order to achieve the above-mentioned problem, the image forming apparatus of the present invention for forming an image on the recording medium including an optical polarizing material includes a recording member for supplying a charge on the surface of the recording medium by being made contact with the recording medium, an image being formed by moving the recording member on the recording medium.

This image forming apparatus allows an image to be formed with ease on the recording medium using the recording member.

In order to achieve the above-mentioned problem, the image forming apparatus of the present invention for forming an image on the recording medium including an optical polarizing material includes an image carrier; an electrostatic charge image forming member for generating an electrostatic charge image in accordance with image data on a surface of the image carrier; and a transport member for transporting the recording medium onto the surface of the image carrier so as to form an image in accordance with the electrostatic charge image on the recording medium.

In this image forming apparatus, an electrostatic charge image in accordance with image data is formed on the image carrier, and the image is formed on the recording medium using the electrostatic charge image. Namely, it is possible to realize an image forming apparatus which, in addition to allowing the user to freely form an image on the recording medium, forms a predetermined image by image data, for example, from a copy image of a document or from a computer.

In order to achieve the above-mentioned problem, the image forming apparatus of the present invention for forming an image on the recording medium including an optical polarizing material includes a charged particle source for outputting charged particles including ions or electrons; a counter electrode facing the charged particle source; an electrostatic charge image forming member, provided on a facing region of the counter electrode and the charged particle source, including a plurality of passage sections of the charged particles outputted from the charged particle source, for forming an electrostatic charge image on a surface of the recording medium transported onto a surface of the counter electrode by controlling passage of the charged particles through the plurality of passage sections by application of a potential in accordance with image data to an electrode provided on each of the plurality of passage sections; and a developing member for visualizing the electrostatic charge image by a developer of at least one color, the image forming apparatus being provided with a first printing mode in which an image is formed on a recording medium such as paper using the developer, and a second printing mode in which an image is formed on the recording medium including the optical polarizing material from the electrostatic charge image.

This image forming apparatus allows an image to be formed directly on the recording medium, thus realizing image formation on the recording medium with a simple arrangement.

For a fuller understanding of the nature and advantages of the invention, reference should be made to the ensuing detailed description taken in conjunction with the accompanying drawings.

BRIEF DESCRIPTION OF THE DRAWINGS

FIG. 8(a), FIG. 8(b) and FIG. 8(c) are cross sectional views of another example of the recording medium including a liquid crystal material in accordance with one embodiment of the present invention.

FIG. 20(a) and FIG. 20(b) are cross sectional views of yet another example of the recording medium including a liquid crystal material in accordance with one embodiment of the present invention.

FIG. 39 is a drawing showing a latent image forming head used in the image forming apparatus.

DESCRIPTION OF THE EMBODIMENTS

First Embodiment

The following will describe one embodiment of the present invention referring to FIG. 1 through FIG. 25.

Figure 1:
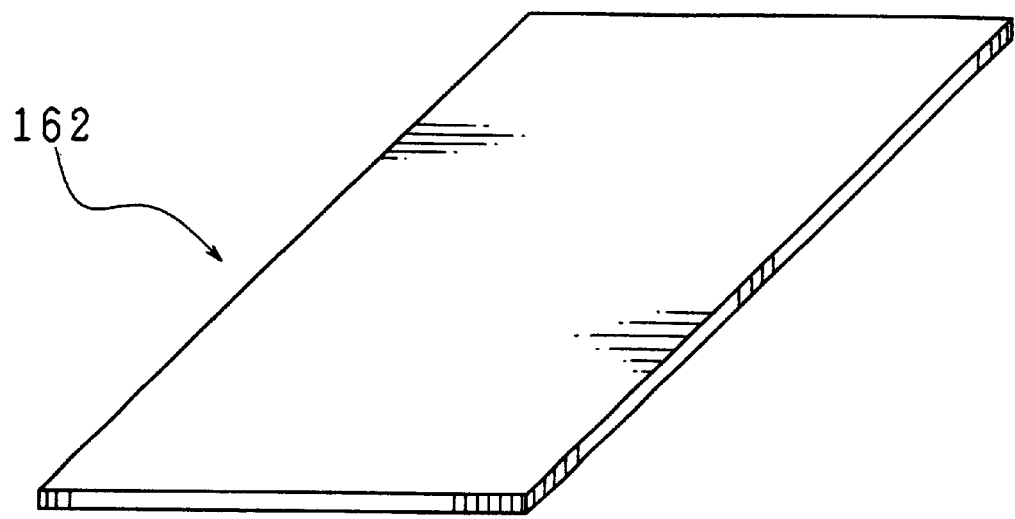
FIG. 1 is a drawing showing an external view of a recording medium including a liquid crystal material in accordance with one embodiment of the present invention.

First, a recording medium in accordance with one embodiment of the present invention will be explained. The recording medium, for example, is a recording medium 162 as shown in FIG. 1, which includes a liquid crystal material as an optical polarizing material which can be driven by an electric field, more preferably a high polymer dielectric liquid crystal material.

The recording medium 162 has the size of an A4 sized sheet and the thickness of 100 μm with respect to its entire surface, which is practically the same thickness as that of an ordinary sheet of paper, and has bending elasticity as paper does.

Figure 2:
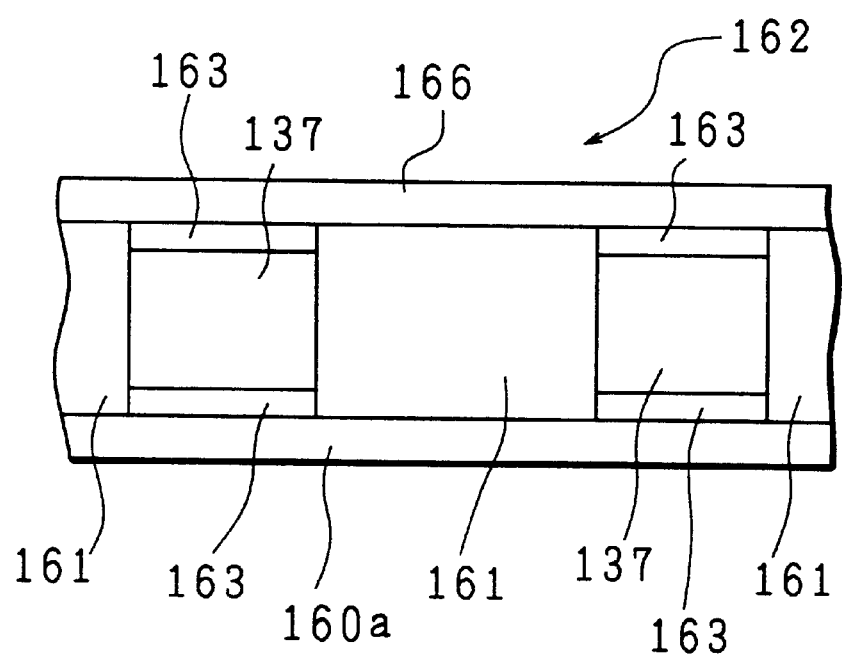
FIG. 2 is a cross sectional view of the recording medium.

FIG. 2 is an enlarged cross sectional view of the recording medium 162. The recording medium 162 includes a liquid crystal material 161, a polarizing plate 166 as a first substrate and a white board 160a as a second substrate, which are positioned so as to sandwich the liquid crystal material 161, and spacers 137 as spacing maintaining means for maintaining a spacing between the white board 160a and the polarizing plate 166 and for providing a spacing for maintaining the liquid crystal material 161 so as to anchor the liquid crystal material 161.

The board 160a is made of, for example, polyethylene terephthalate having a thickness of 25 μm and contains a white pigment. The spacers 137 are made of, for example, polyacrylate having a thickness of 20 μm, and are provided with an adhesive layer 163 having a thickness of 10 μm for bonding the spacers 137, the board 160a, and the polarizing plate 166 at the interfaces of these members so as to anchor the spacers 137, the board 160a, and the polarizing plate 166.

Figure 3:
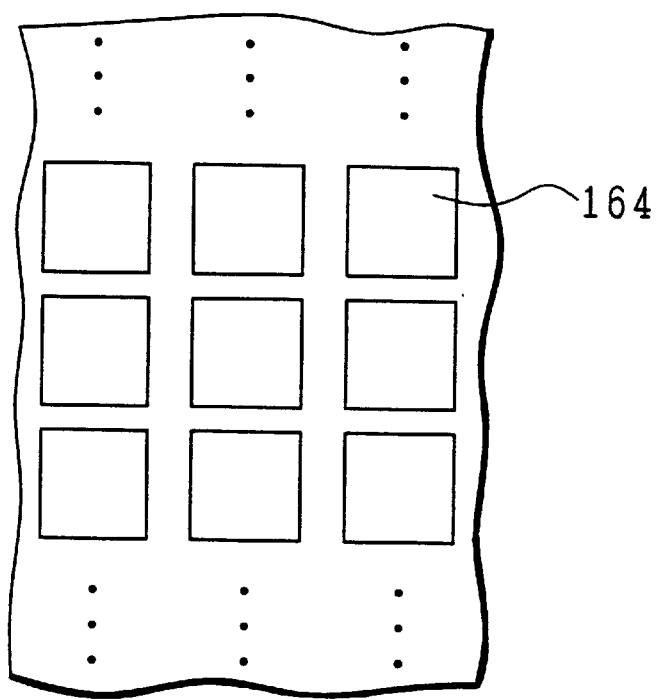
FIG. 3 is an upper view of the recording medium.

The liquid crystal material 161 is made of, for example, an azobenzene derivative having a nematic characteristic. FIG. 3 is an enlarged view of the recording medium 162 as viewed from above. As shown in FIG. 3, the liquid crystal material 161 is disposed in a grid arrangement, and the liquid crystal material 161 in each cell constitutes a pixel 164. The pixel 164 is disposed with the interval so that its resolution is equivalent to 300 DPI.

Figure 4:
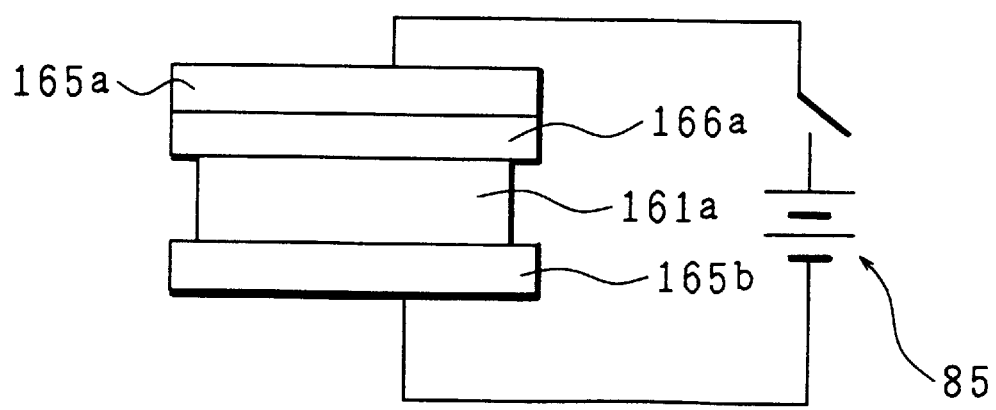
FIG. 4 is a drawing explaining a normal liquid crystal control.

The following describes a control of a device adopting an ordinary liquid crystal material. FIG. 4 illustrates the concept of this control. A polarizing plate 166a and a liquid crystal material 161a are provided between parallel plates 165a and 165b made of, for example, transparent electrodes, and an electric field is applied to the liquid crystal material 161a by a potential difference between the parallel plates 165a and 165b, which is supplied from a power source 85, so as to control the polarizing plane of light with respect to the liquid crystal material 161a. The electric field is controlled to be the potential difference formed by the potential of around 10 V in a liquid crystal layer in particular, and it is turned ON or turned OFF based on image information.

In this manner, in conventional liquid crystal display devices, it is required to provide electrodes for applying an electric field to the liquid crystal material, and for this reason there is a limit to the display resolution, as imposed by the fact that the resolution of the display device is limited by the electrodes or by the feeding pattern of supplying the potential to the electrodes. Even if it is possible to increase the display resolution, the manufacturing cost is then increased and the yield is reduced by the need to make fine electrodes and fine electrode pattern. Also, for the same reason, there is a limit to the size of the display device that can be increased, making it difficult to make a large display device.

In contrast, the recording medium 162 does not include any electrodes which correspond to the parallel electrodes 165a and 165b in the above conventional example. Further, because an electric field is generated by an electrostatic charge applied to the recording medium 162, the recording medium 162 is free from the limitations as imposed by the electrodes, thus realizing a fine resolution at significantly low costs.

Figure 5A:
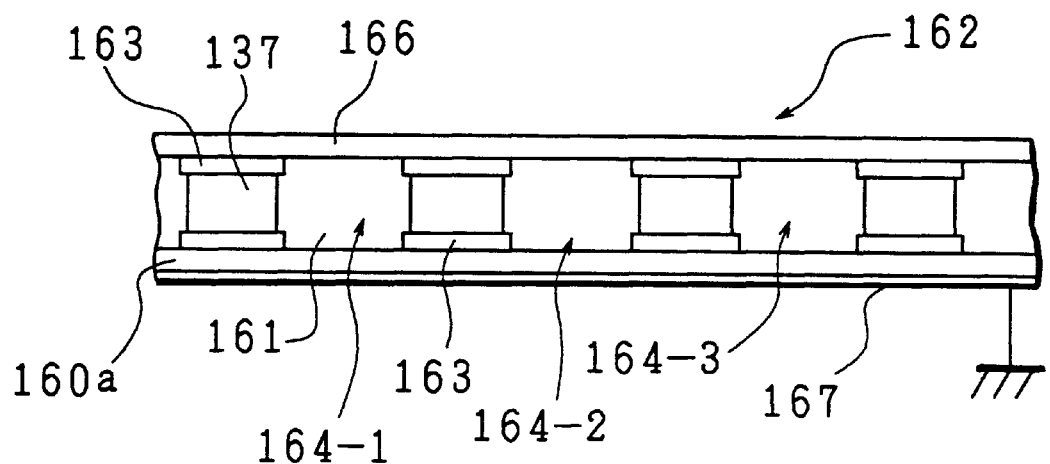
FIG. 5(a) and FIG. 5(b) are drawings explaining image recording of the recording medium.

Recording of information on the recording medium 162 is carried out as shown in FIG. 5. FIG. 5(a) shows the initial state. The recording medium 162 is disposed on a substrate 167 having conductivity, which is grounded, so that the surface of the recording medium 162 makes contact with the substrate 167. Under this condition, no electric field is applied to the recording medium 162, and as shown in FIG. 5(a), the liquid crystal material 161 is transmissive and appears white (referred to as "light state" hereinafter) by the white of the board 160a when viewed from the upper side of the recording medium 162.

Figure 5B:
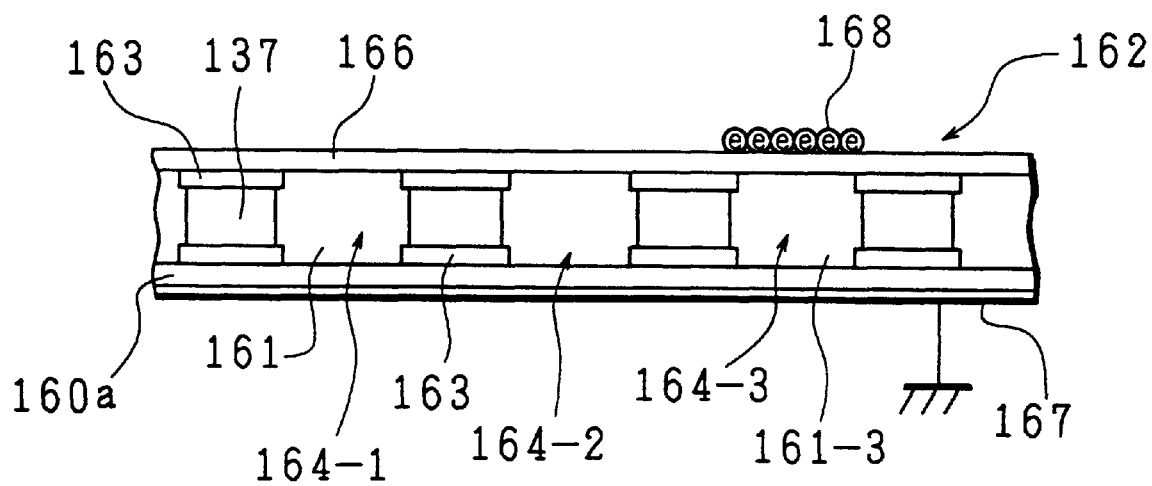

To form an image under this condition with respect to a certain pixel, for example, a pixel 164-3 as shown in FIG. 5(b), a predetermined amount of surface charge 168 is supplied on the pixel 164-3. Because the surface charge 168 on the pixel 164-3 has a potential with respect to the substrate 167, an electric field is applied to a liquid crystal material 161-3 corresponding to the pixel 164-3. By this electric field, the molecular arrangement of the liquid crystal material 161-3 is changed, and this alters the polarizing axis of the liquid crystal material 161-3. As a result, the liquid crystal material 161-3 becomes non-transmissive by the change in aligning plane of transmitting light, and appears black (referred to as "dark state" hereinafter) as the white of the board 160a is not transmitted. Under this principle, by supplying a charge image in accordance with desired image data to a position on the recording medium 162 corresponding to each pixel, a dark portion corresponding to the charge image is formed on the recording medium 162, thus visualizing the desired image data.

Image formation on the recording medium 162 is realized by putting charges corresponding to a desired image on the recording medium 162, utilizing the electric field induced by such charges. This arrangement does not require electrodes, which are required for application of an electric field to an optical polarizing material, and the limitation imposed on image resolution by the electrodes is completely eliminated, allowing image formation with arbitrary resolutions. Further, unlike conventional liquid crystal displays, it is not required to provide control means such as an IC driver for controlling the power source for applying a charge to the electrodes and the potential, thus greatly miniaturizing the recording medium by the fact that the arrangement required for recording or displaying of an image can be reduced to its simplest form, that is, the arrangement of an ordinary sheet of paper, and it is also possible to realize easy handling of the recording medium, allowing the recording medium, for example, to be bent in the same manner as an ordinary sheet of paper. Furthermore, absolutely no power is required for saving and displaying of image data, thus completely eliminating the cost and problems associated with devices for supplying power.

Normally, the liquid crystal material loses its polarizing axis, which is formed by application of an electric field, when released from the electric field. However, by using a liquid crystal material whose property is such that the polarizing axis formed by application of an electric field is maintained even after released from the electric field (such a property will be referred to as "memory effect" hereinafter), namely by adopting a liquid crystal material 161b having memory effect in the present embodiment, the dark state of the pixel 164-3 is maintained even after the surface charge 168 is removed, as shown in FIG. 6(b).

An example of the liquid crystal material having memory effect includes a 2-substituted naphthalene derivative having ferroelectricity. As the liquid crystal material 161 to be used in the recording medium 162 of the present embodiment, it is preferable to use a liquid crystal material having memory effect for the following reasons.

Figure 6A:
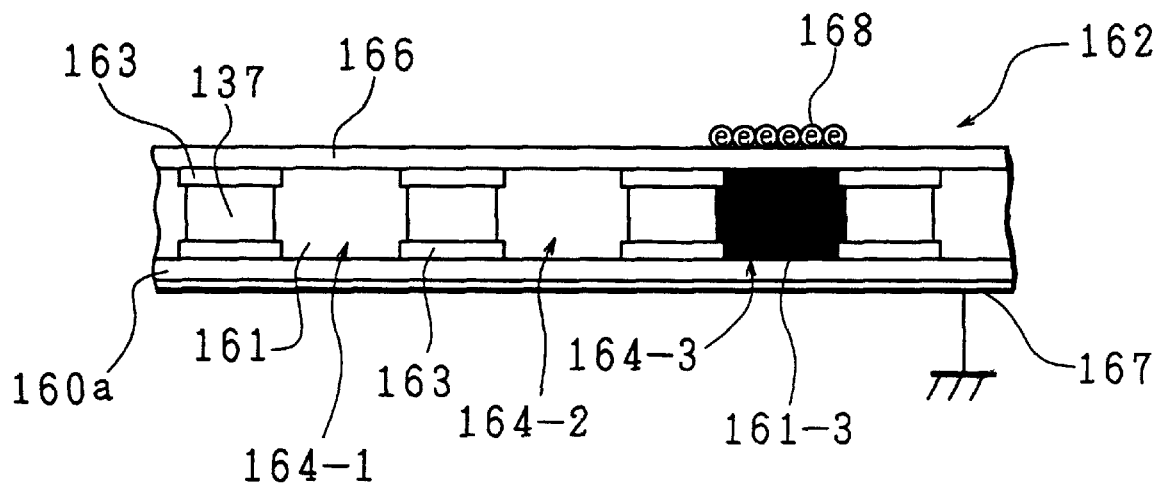
FIG. 6(a) and FIG. 6(b) are drawings explaining image recording of the recording medium.
Figure 6B:
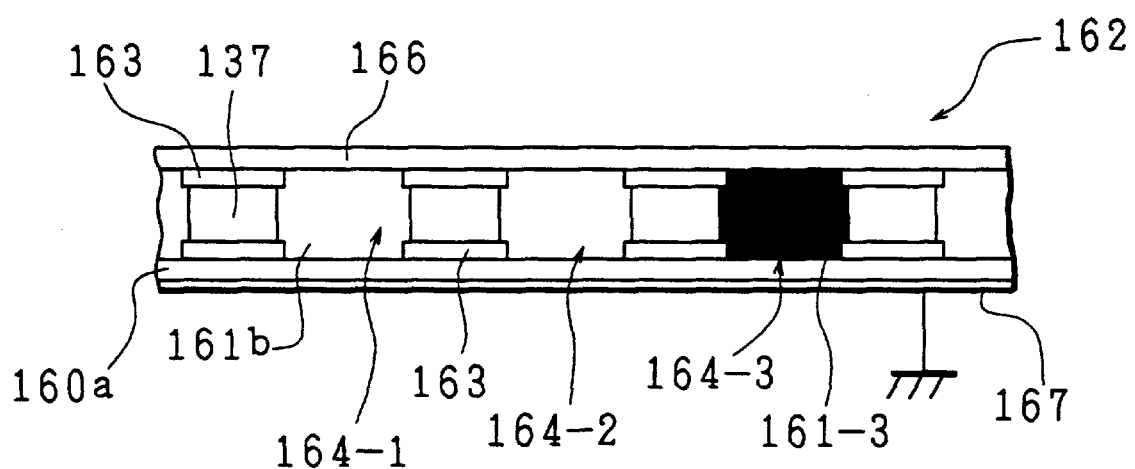

In the present embodiment, in the case where the liquid crystal material 161 does not have memory effect, as shown in FIG. 6(a), it is required to leave the surface charge 168. However, the surface charge 168 eventually disappears by gaseous discharge, other than by being neutralized by ions in the air, or by being absorbed by the moisture existing on the surface of the recording medium 162. As the surface charge 168 disappears, the image also disappears, failing the function of the recording medium. It is for this reason that a liquid crystal material having memory effect is preferable as the liquid crystal material 161 used in the recording medium 162 of the present embodiment.

Also, the surface charge 168 existing on the recording medium 162 causes other problems. For example, handling of the recording medium 162 is made difficult as the recording medium 162 easily adheres onto surfaces such as a desk and to another recording medium 162 by the electrostatic force of the surface charge 168, and the recording medium 162 is easily contaminated by dusts and particles floating in the air, which easily adhere onto the recording medium 162. Therefore, it is preferable to adopt a liquid crystal material having memory effect as described above, and to discharge the surface of the recording medium 162 after forming an image.

Figure 7:
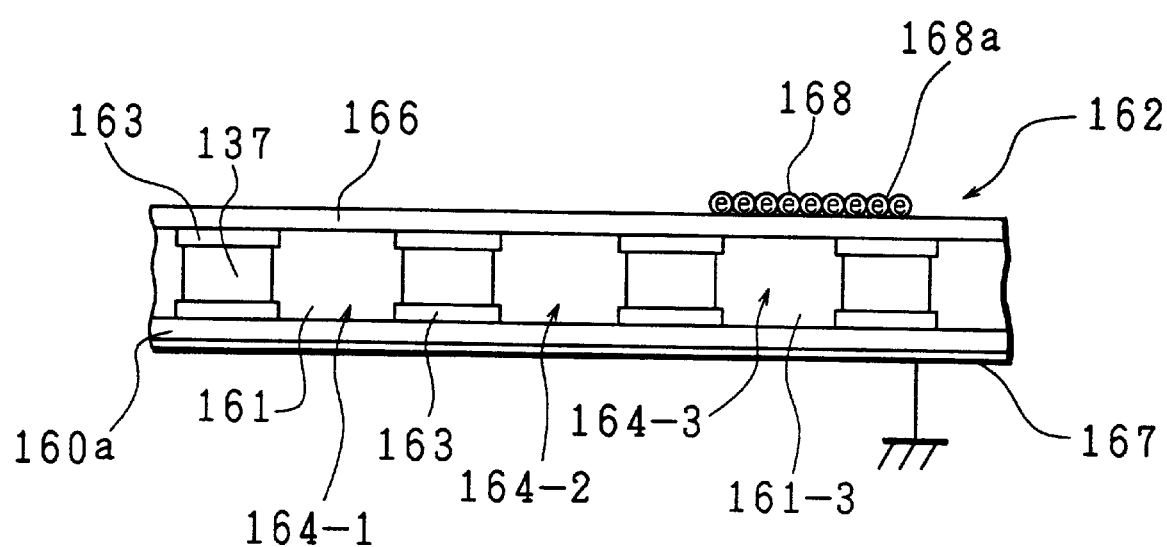
FIG. 7 is a drawing explaining image recording of the recording medium.

In the present embodiment, the spacers 137 are provided so as to part the pixels from one another in a grid arrangement. With this arrangement, as shown in FIG. 7, even when a surface charge 168a exists on the boundary of pixels, adjacent pixels are unaffected by the surface charge 168a, thus forming a desirable image without losing contrast. This arrangement also has an advantage that the liquid crystal material 161 disposed on the pixels is held desirably. Note that, the thickness and the size of the described components, such as the liquid crystal material 161, the board 160a, and the polarizing plate 166, are not particularly limited as long as a desirable recording medium is formed. Also, the liquid crystal material 161 and the surface charge 168 used in image formation only need to have predetermined characteristics and are not particularly limited as long as they can be desirably adopted in an image forming apparatus of the present invention (described later). Further, the resolution is not particularly limited either and a predetermined resolution can be adopted.

The recording medium that can be adopted in the image forming apparatus of the present invention is not just limited to the described arrangement and a wide variety of arrangements can be adopted. For example, the arrangements as shown in FIG. 8 and FIG. 9 are also possible. In FIG. 8(a), spacers 137a, constituted by a plurality of spherical beads 169a made of transparent polyacrylate are adopted and disposed as the spacers 137. Alternatively, as shown in FIG. 8(b), it is also possible to adopt spacers 137b composed of a plurality of beads 169b having a small diameter as the spacers 137. In FIG. 8, as with the described arrangements such as that of FIG. 5, it is also possible to obtain dark state by controlling the transmission of light through the liquid crystal material 161-3 by putting the surface charge 168 in accordance with the image data on the recording medium 162, thereby visualizing arbitrary image data.

Figure 9B:
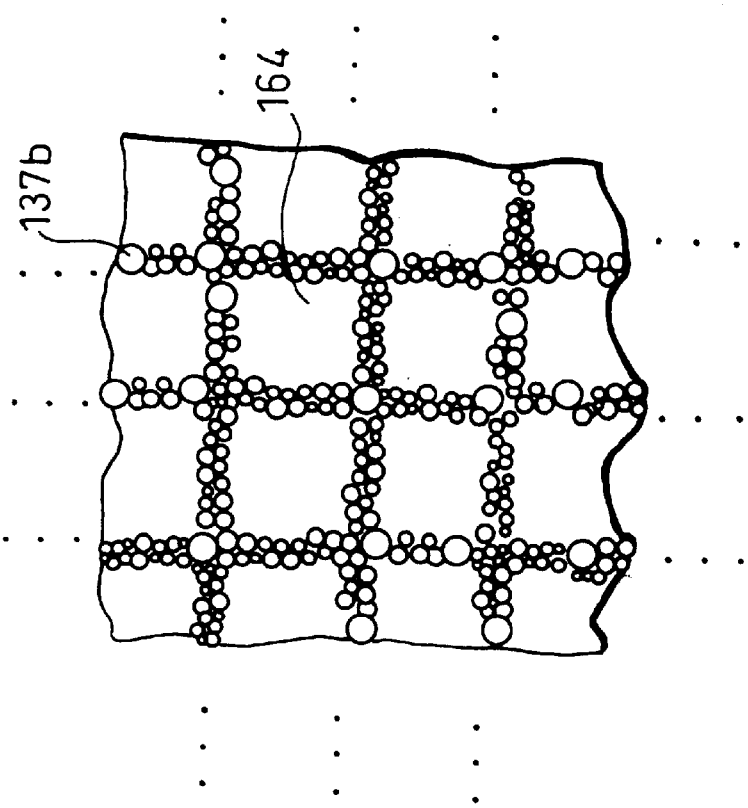
FIG. 9(a) and FIG. 9(b) are upper views of the recording medium.
Figure 9A:
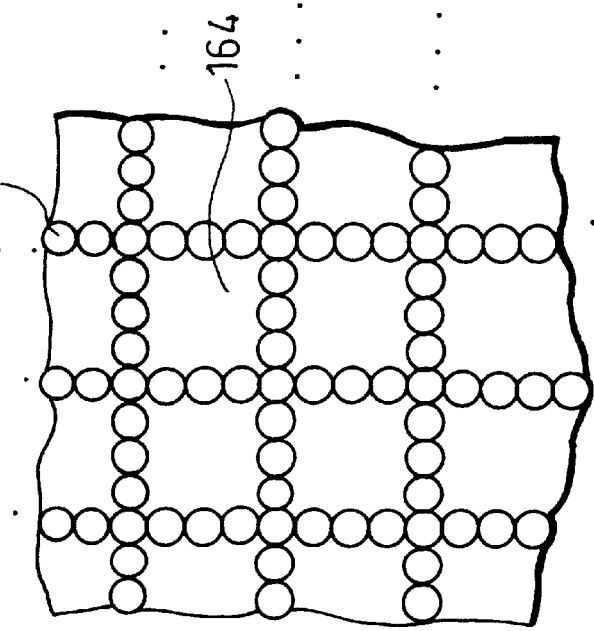

FIG. 9(a) and FIG. 9(b) are enlarged views of FIG. 8(a) and FIG. 8(b), respectively, as viewed from the top. FIG. 8 and FIG. 9 have the same arrangement of pixels 164 as that of FIG. 3. The pixels 164 are parted from one another by the spacers 137a or 137b so that there is no adverse effect on adjacent pixels, thus obtaining high contrast.

In the arrangement of FIG. 2 and FIG. 3, the liquid crystal material 161 is parted per each pixel, and for this reason it is required to adopt a fine structure of the spacers 137 in a grid arrangement as shown in FIG. 3, requiring very high accuracy for the spacers 137. Also, the liquid crystal material 161 of each pixel is completely separated from that of another pixel, and this structure is not suitable for absorbing an applied external force, and it is a comparatively common occurrence that the recording medium is broken and the liquid crystal material 161 flows out of the medium, relatively speaking. In spite of this drawback, the above arrangement is still desirable because even when the recording medium 162 is partially damaged, the liquid crystal material 161 flows out of the recording medium 162 only from the portion of the recording medium 162 which has been damaged so that the liquid crystal material 161 in the recording medium 162 is not lost completely.

In contrast, in the arrangement of FIG. 8, because the beads 169a and 169b are disposed as the spacers 137, positioning of the spacers 137 is relatively easier compared with the arrangement of FIG. 2. In the arrangement of FIG. 8(b), positioning of the spacers 137 is even easier. The beads 169a and 169b can be formed relatively easily by applying the method of producing toner, such as the pulverization method and the polymerization method, thus reducing the cost of the spacers 137.

The example of FIG. 8 is even more preferable because in this arrangement, as shown in FIG. 8(c), which is an enlarged view of the spacers 137b of FIG. 8(b), the spacers 137 form a large number of small gaps between the beads 169b and also between the beads 169b and the polarizing plate 166 and the board 160a. These small gaps allow the liquid crystal material 161 to move between adjacent pixels to some extent. This is preferable because these small gaps act as a damper against an applied external force to absorb such a force, thus improving as a result the strength against external forces. FIG. 8(c) used the spacers 137b as an example to explain this desirable effect; however, this effect is also exhibited by the spacers 137a.

The liquid crystal material 161b having memory effect is also preferably adopted in the recording medium 162 of FIG. 8.

Figure 10:
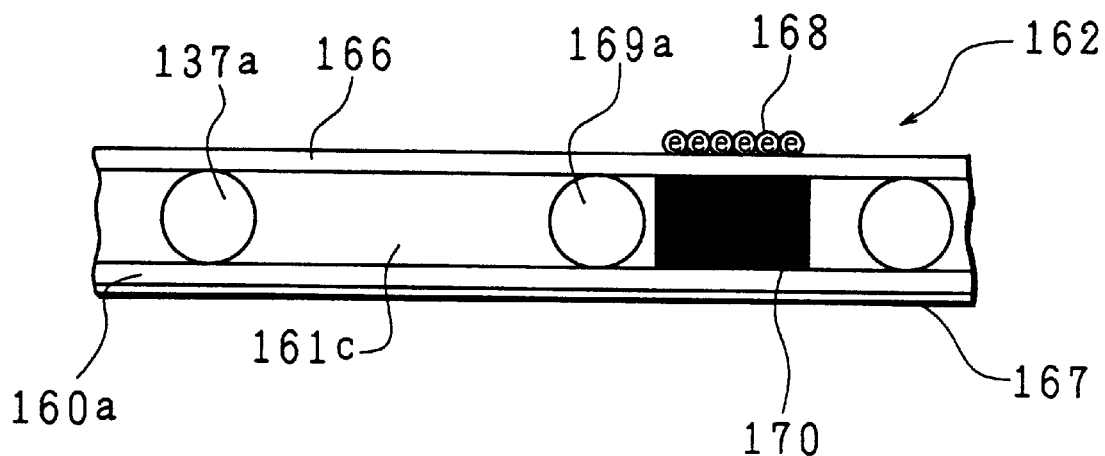
FIG. 10(a) and FIG. 10(b) are cross sectional views of yet another example of the recording medium including a liquid crystal material in accordance with one embodiment of the present invention.
Figure 10:
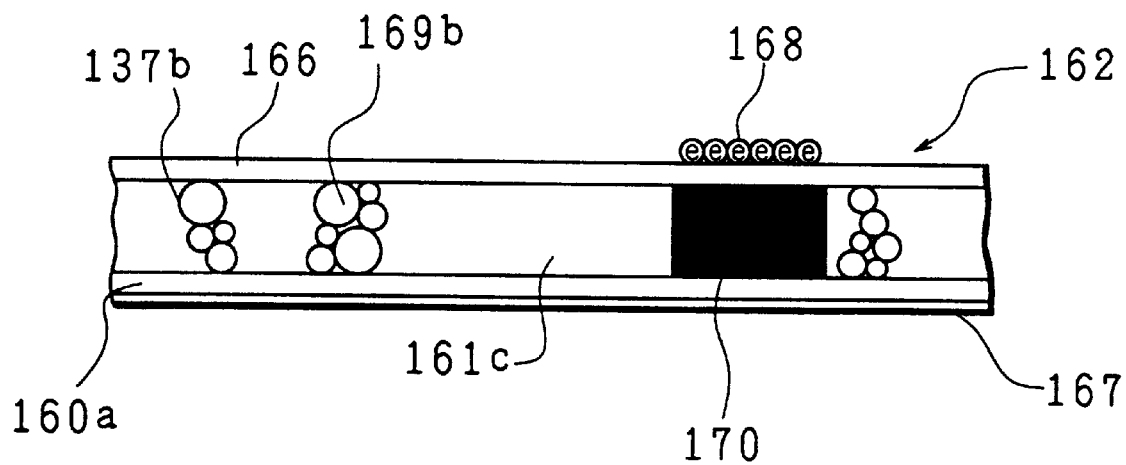
Figure 11B:
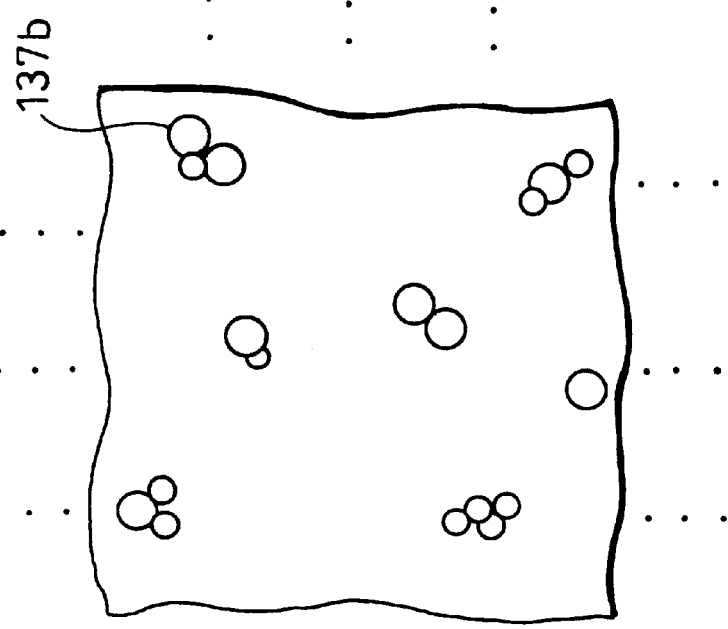
FIG. 11(a) and FIG. 11(b) are upper views of the recording medium.
Figure 11A:
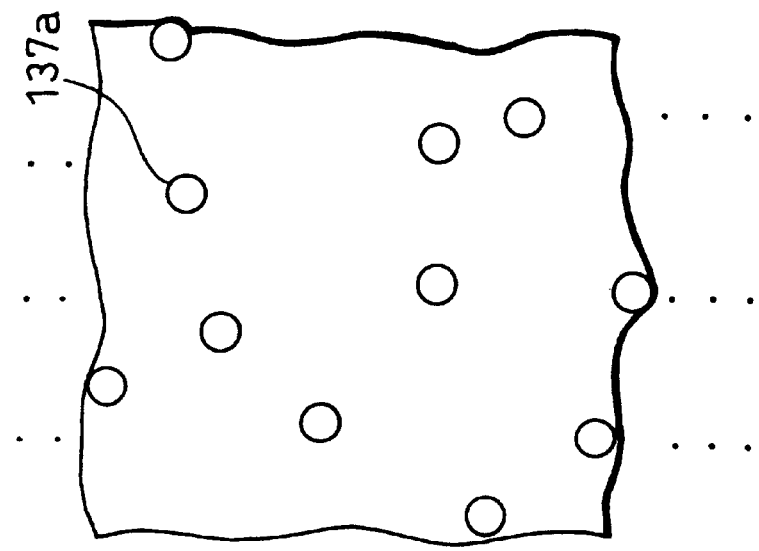
Figure 12:
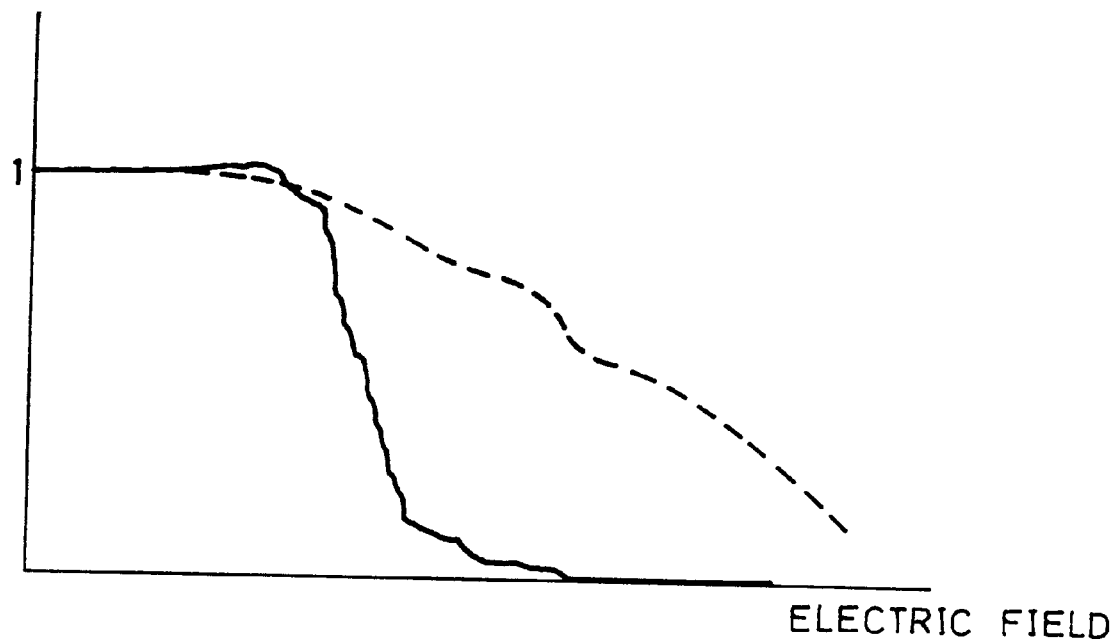
FIG. 12(a) and FIG. 12(b) are drawings explaining image recording.
Figure 12:
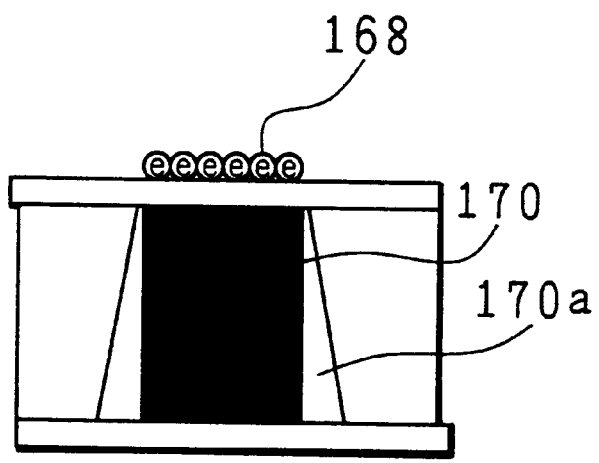

In the described examples, the liquid crystal material 161 is parted by the spacers 137 so as to form pixels. However, in this arrangement, unless the width of the spacers 137 is made sufficiently small, the spacers 137 appear as white lines, for example, on a solid image formed and the image cannot be formed desirably. In such a case, the arrangement as shown in FIG. 10 is preferable. In FIG. 10, unlike FIG. 2 and FIG. 8, instead of arranging the spacers 137 in an orderly manner, the spacers 137 are randomly dispersed over a predetermined region. FIG. 10(a) shows the case where the beads 169a of FIG. 8(a) are used, and FIG. 10(b) shows the case where the beads 169b of FIG. 8(b) are used. FIG. 11(a) and FIG. 11(b) are enlarged views of FIG. 10(a) and FIG. 10(b), respectively, as viewed from the top.

The arrangement of FIG. 10 is more preferable because the beads 169a and 169b have a diameter in a range of 10 $\mu$m to 30 $\mu$m and are randomly arranged, making them to appear on the image less often and making it more difficult for the user to recognize them on the screen. Further, because the spacers 137 are positioned arbitrarily, it becomes easier to reduce the cost associated with positioning of the spacers 137. This arrangement does not present any problem as long as the liquid crystal material 161 has a sufficient strength. However, a desirable recording medium 162 is not always obtained when the strength of the liquid crystal material 161 is insufficient. In such a case, it is preferable to have an arrangement in which a sufficient strength of the liquid crystal material 161 is ensured by making the liquid crystal material 161 with a material having a certain molecular weight.

Also, in the example of FIG. 10, the liquid crystal material 161 is not formed per pixel, and this often results in deterioration of an image due to the surface charge 168. When the sensitivity of the liquid crystal material 161 used is, for example, linear with respect to an applied electric field, as shown by the broken line in FIG. 12(a), by an insufficient electric field formed by the charge existing on the periphery of the surface charge 168, there are formed a dark region 170, which is in the dark state by the surface charge 168, and an incomplete dark region 170a on the edges, whose dark state is incomplete, as shown in the enlarged view of FIG. 12(b). This lowers the contrast of the image on the edges and is not preferable. In FIG. 12(a), the transmittance of light for a given electric field is normalized with the zero value of the electric field.

Here, as shown by the solid line in FIG. 12(a), when a liquid crystal material 161c whose property has a threshold value for an applied electric field is adopted, a distinct dark region 170 as shown in FIG. 10 (a) and FIG. 10(b) is formed, realizing a desirable recording medium having sufficient image contrast. The liquid crystal material 161b having memory effect is also preferably adopted as the liquid crystal material 161c.

Figure 13:
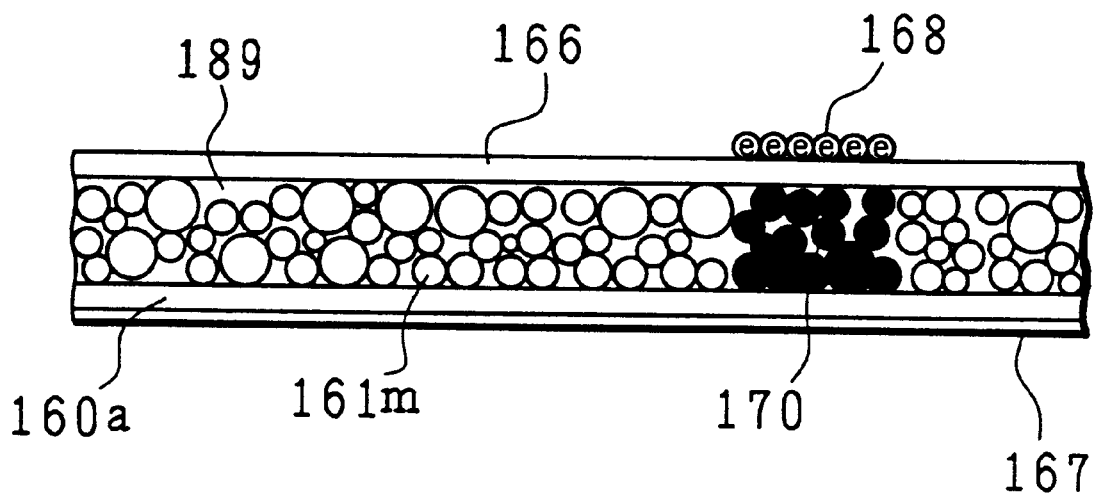
FIG. 13(a) and FIG. 13(b) are cross sectional views of still another example of the recording medium including a liquid crystal material in accordance with one embodiment of the present invention.
Figure 13:
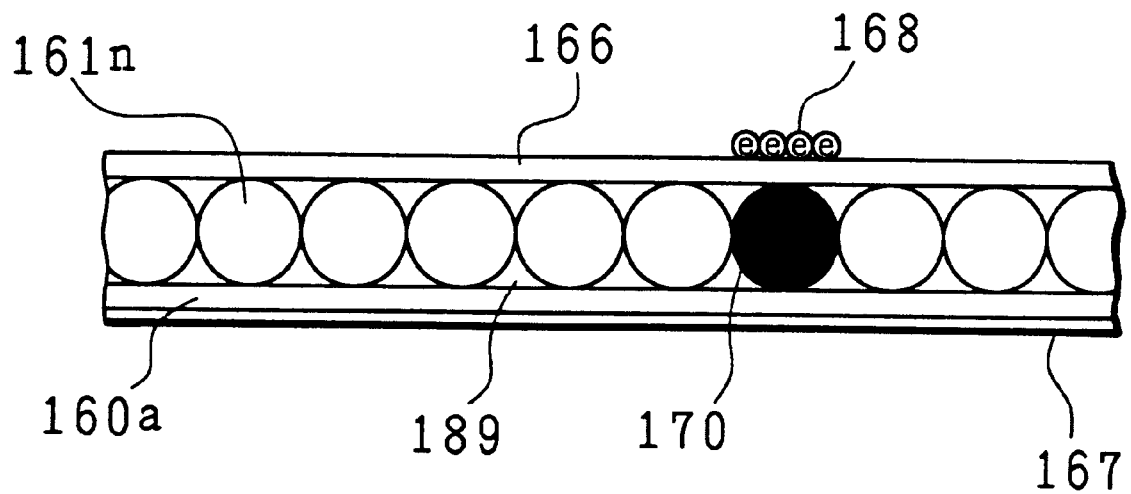

The described examples adopt the arrangement wherein the recording medium 162 provides a spacing for a liquid crystal material using spacers, and various types of liquid crystal material 161 are used to fill this spacing. However, the arrangement is not just limited to this, and it is more preferable to adopt a so-called PDLC arrangement, which includes, for example, as shown in FIG. 13, a capsule 161m (or 161n) enclosing the liquid crystal material 161. In this arrangement, the liquid crystal material is enclosed in a capsule, and this increases a selection of materials which can be used for the liquid crystal material 161 in the described recording medium 162 in the form of a sheet. Therefore, this arrangement is preferable in view of reducing cost and increasing the strength.

In the described arrangements of the examples before FIG. 13, there is a case where the liquid crystal property of the liquid crystal material 161 is changed by a chemical reaction with the spacers 137 and the substrates. However, in the arrangements of FIG. 13(a) and FIG. 13(b), the liquid crystal material is completely separated from these components, and the property of the liquid crystal material is stably maintained over an extended period of time. Further, with these arrangements, because the spacers 137 are not required, problems associated with spacers can be avoided. In FIG. 13(a), between capsules 161m are filled with filling means 189 such as high polymer so as to maintain and protect the capsules 161m and to disperse an external force applied to the recording medium 162.

The capsules 161m in FIG. 13(a) are significantly smaller compared with the thickness of the recording medium 162. Alternatively, for example, the arrangement as shown in FIG. 13(b) is also possible.

Figure 14A:
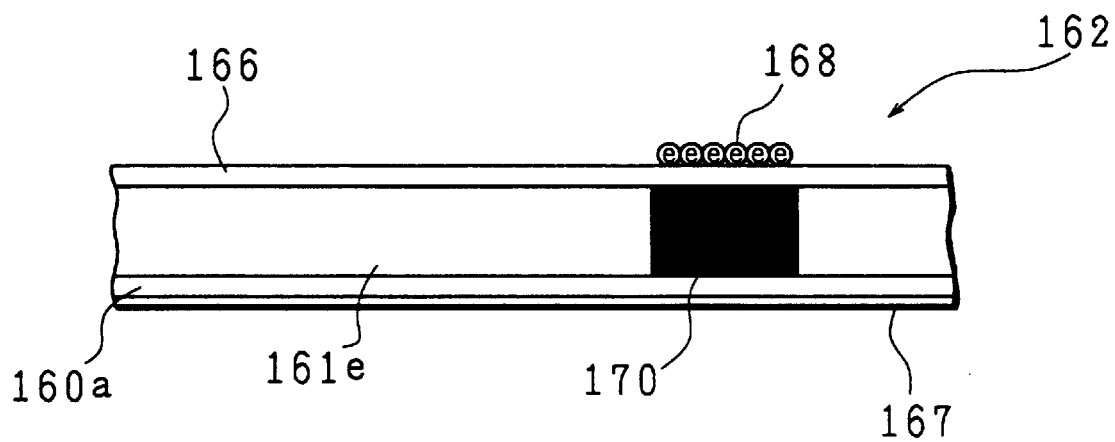
FIG. 14(a) and FIG. 14(b) are cross sectional views of yet another example of the recording medium including a liquid crystal material in accordance with one embodiment of the present invention.

As the liquid crystal materials 161, 161b, and 161c, a material of a relatively low molecular weight can be used. However, when adopting a high molecular weight liquid crystal material 161e including polyacrylate having a p-substituted aromatic side chain, the arrangement as shown in FIG. 14 is possible. As shown in FIG. 14, the high molecular weight liquid crystal material 161e does not require any spacers 137, and therefore does not cause any problems, a rise in cost, and instable factors associated with the spacers 137 as described above. In the arrangements of the examples before FIG. 14, it is difficult to generate the dark region 170 with respect to, for example, the charge put on the spacers 137, and an image failure results due to the charge. However, with the arrangement of FIG. 14, it is possible to realize a desirable recording medium 162 which is totally free from such a problem.

The high molecular weight liquid crystal material 161e is further preferable as the recording medium when the liquid crystal material 161c having the property as shown by the solid line in FIG. 12(a) is adopted, since this prevents lowering of contrast on the image edge and realizes desirable contrast. As the liquid crystal materials 161c and 161e, it is also preferable to adopt a high polymer material having memory effect, such as a ferroelectric high polymer liquid crystal material made of, for example, polyacrylate having a chiral cholesterol group on the end of the p-substituted aromatic side chain.

Figure 14B:
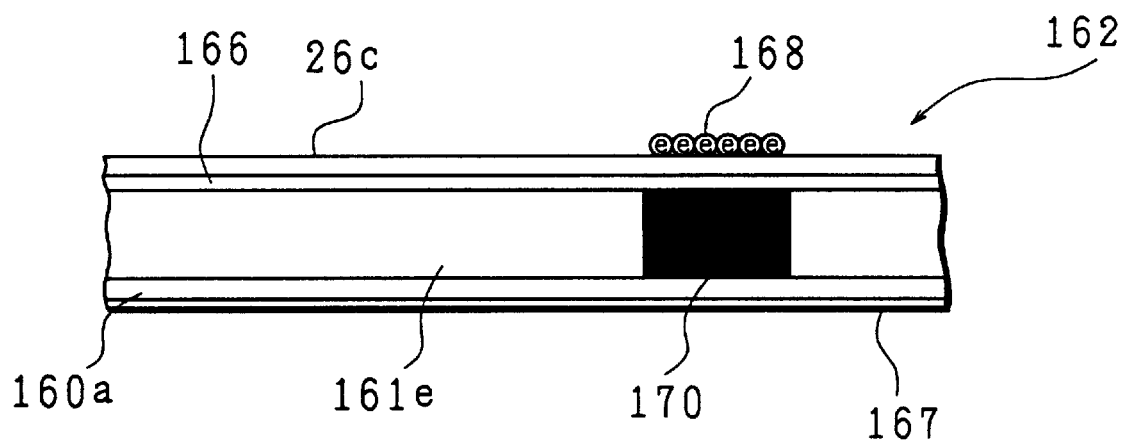

In the above examples, the polarizing plate 166 is provided on the surface of the recording medium 162 on which the charge is put. However, as shown in FIG. 14(b), it is possible alternatively to have an arrangement wherein a protective layer 26c is provided on the surface of the polarizing plate 166.

Figure 15:
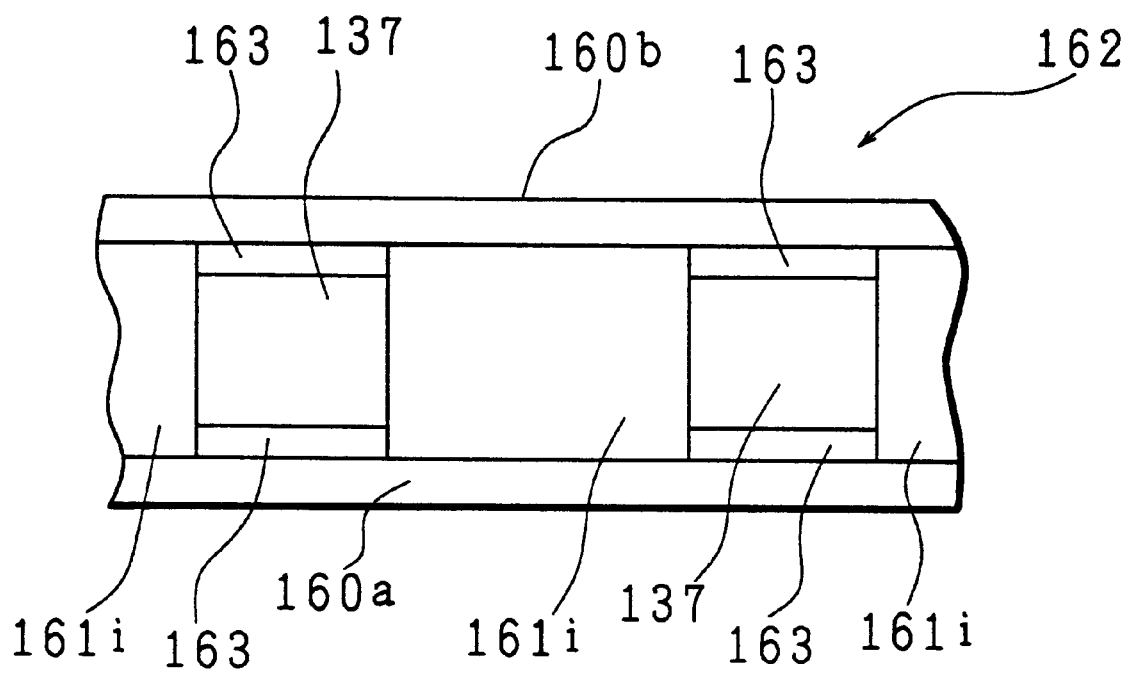
FIG. 15 is a cross section of still another example of the recording medium including a liquid crystal material in accordance with one embodiment of the present invention.
Figure 16A:
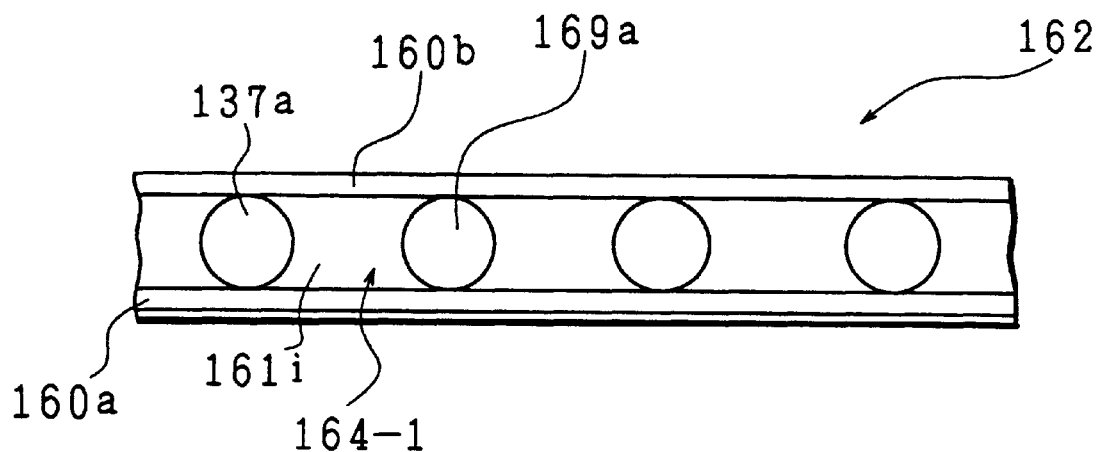
FIG. 16(a) and FIG. 16(b) are cross sectional views of yet another example of the recording medium including a liquid crystal material in accordance with one embodiment of the present invention.
Figure 16B:
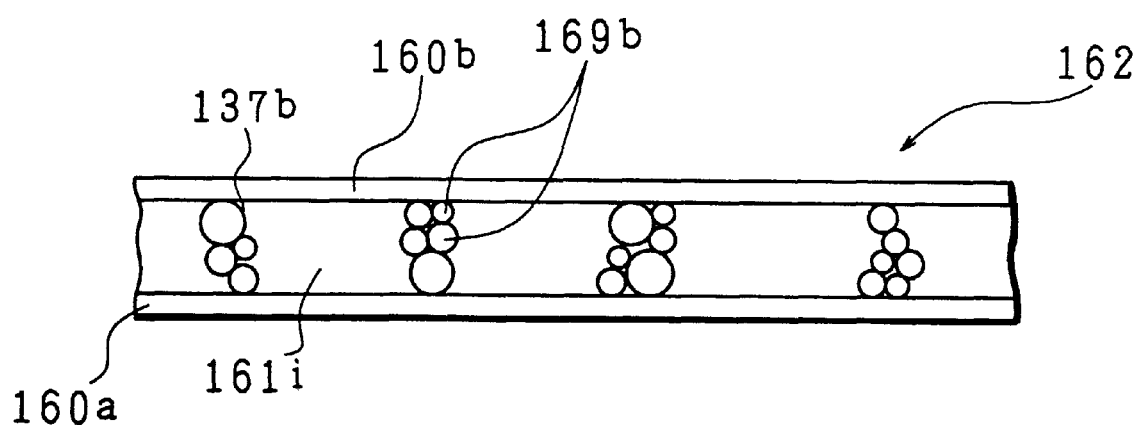
Figure 17A:
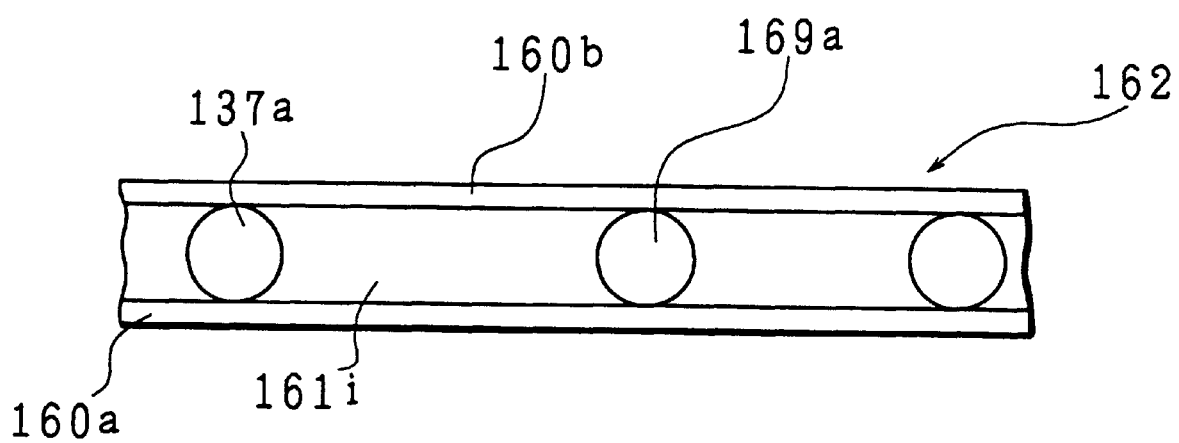
FIG. 17(a) and FIG. 17(b) are cross sectional views of still another example of the recording medium including a liquid crystal material in accordance with one embodiment of the present invention.
Figure 17B:
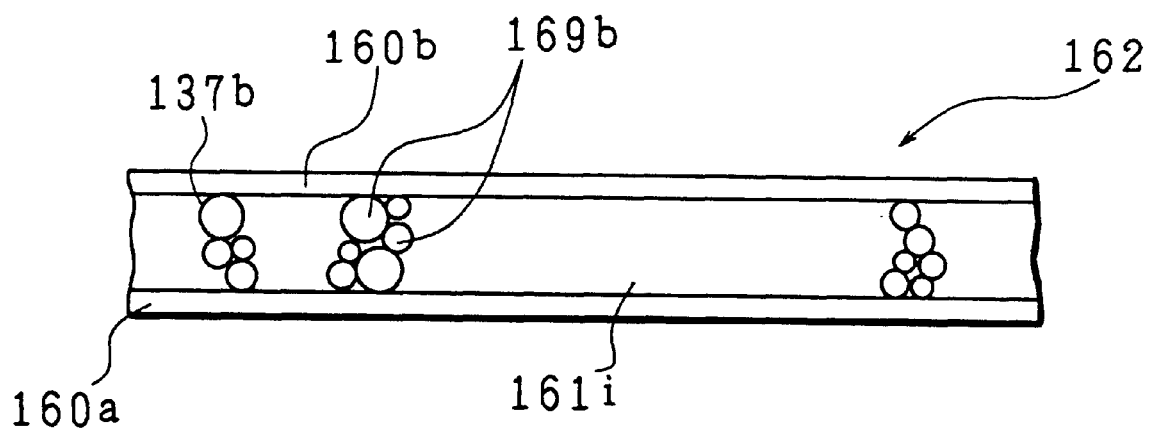

In the present embodiment, the polarizing plate 166 can be excluded by adopting (a) a liquid crystal material 161i which has arbitrary aligning angles in a certain electric field and has the same aligning angle under the condition of application of a predetermined electric field or (b) a liquid crystal material 161i composed of a plurality of liquid crystal materials 161 having different polarizing axes with respect to an applied electric field, which become equal in a certain electric field. FIG. 15 through 17 show arrangements of FIG. 2, FIG. 8, and FIG. 10, respectively, with the liquid crystal material 161i.

Figure 18A:
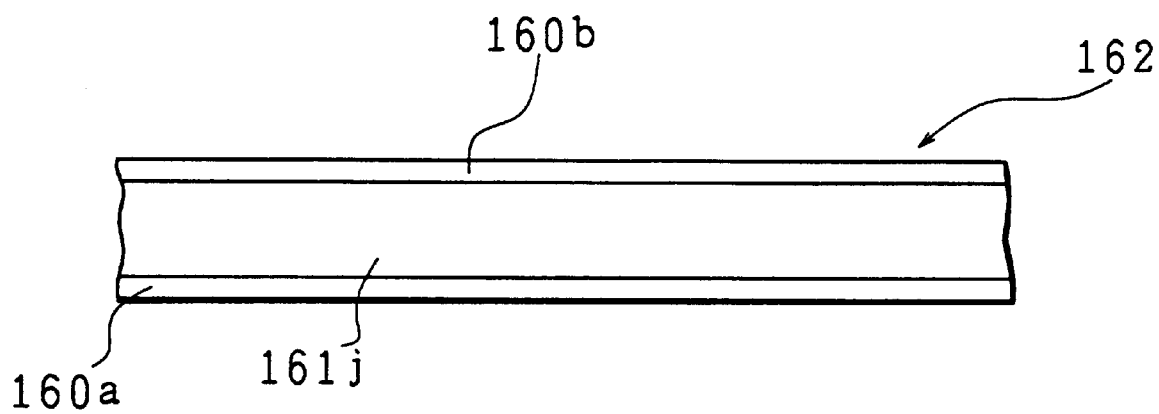
FIG. 18(a), FIG. 18(b), and FIG. 18(c) are cross sectional views of yet another example of the recording medium including a liquid crystal material in accordance with one embodiment of the present invention.

In FIG. 15, a transparent board 160b is provided instead of the polarizing plate 166. The board 160b has a thickness of around 25 $\mu$m and is made of PET, as with the board 160a, for example. When the liquid crystal material 161 having the following property is adopted in the arrangement of FIG. 14, that is, with the use of a liquid crystal material 161j having a sufficient strength by itself, the arrangement as shown in FIG. 18(a) is possible. In FIG. 18(a), provided that the liquid crystal material 161j is sufficiently strong, instead of using a PET having a thickness of 20 $\mu$m as the board 160b, it is possible alternatively to adopt, for example, a Teflon-coated layer having a thickness of 10 $\mu$m which is capable of protecting the surface of the recording medium 162.

Figure 18B:
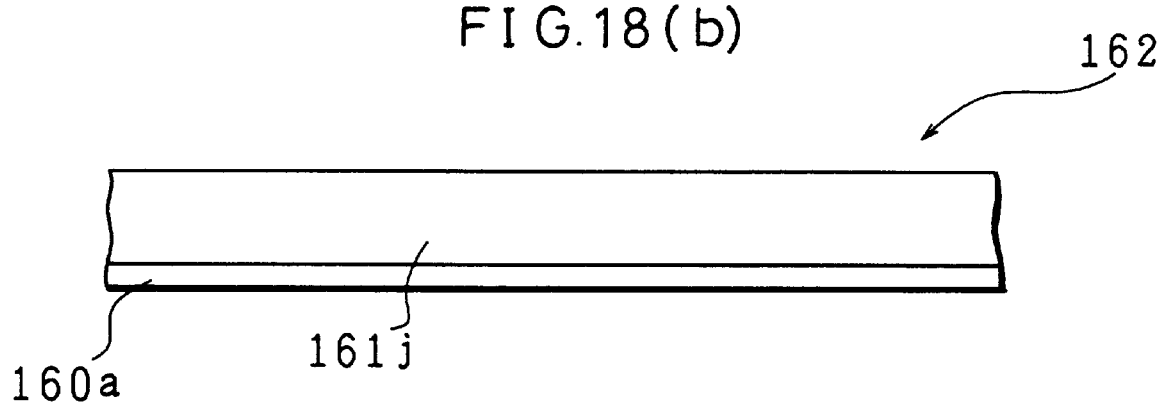

Also, with the use of the liquid crystal material 161j which is stronger, as shown in FIG. 18(b), the board 160b is not required on the surface of the recording medium 162 and the structure of the recording medium 162 can be simplified.

In such a case, as above, a liquid crystal material having memory effect and having a threshold value for transmission of light with respect to an applied electric field is more suitable as a recording medium.

Figure 18C:
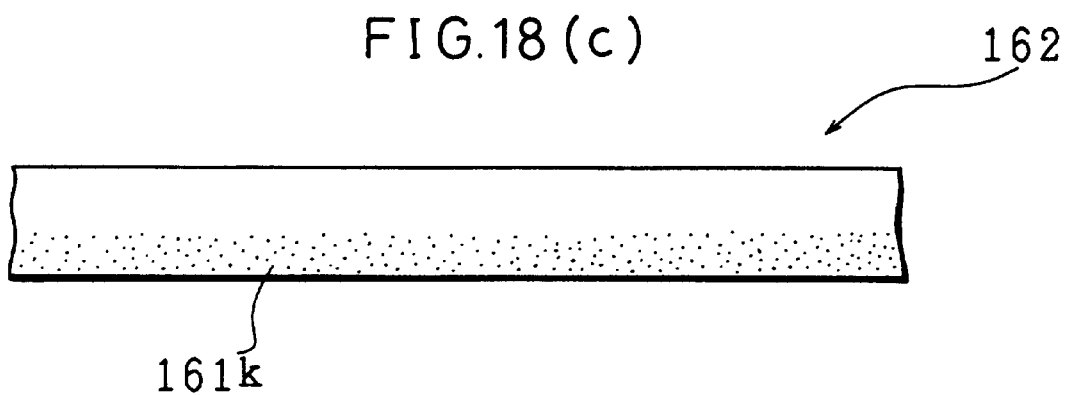

Alternatively, it is also possible to have an arrangement, for example as shown in FIG. 18(c), wherein a liquid crystal material 161k, which can be partially colored on its relative bottom portion, is colored white. This excludes the board 160a, thus realizing the simplest structure of the recording medium 162 and reducing the cost to minimum. Note that, in FIG. 18(c), a white material in the liquid crystal material 161k is represented by dots. Also, with the described arrangement, it is not required to provide an adhesive between the board 160a and the liquid crystal material 161, thus further improving durability. Further, with the described structure in which the multi-layer structure is simplified, the interface between each layer of the recording medium 162 is prevented from being destroyed by bending or folding of the recording medium 162, thus further improving the strength of the recording medium.

Figure 19A:
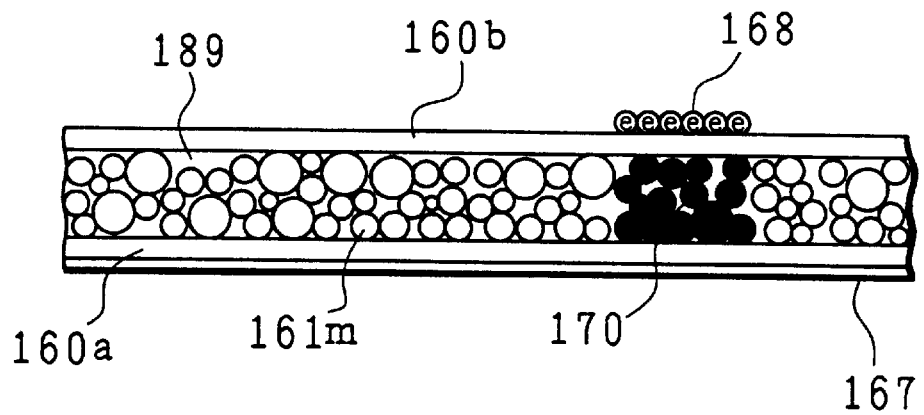
FIG. 19(a) and FIG. 19(b) are cross sectional views of still another example of the recording medium including a liquid crystal material in accordance with one embodiment of the present invention.
Figure 19B:
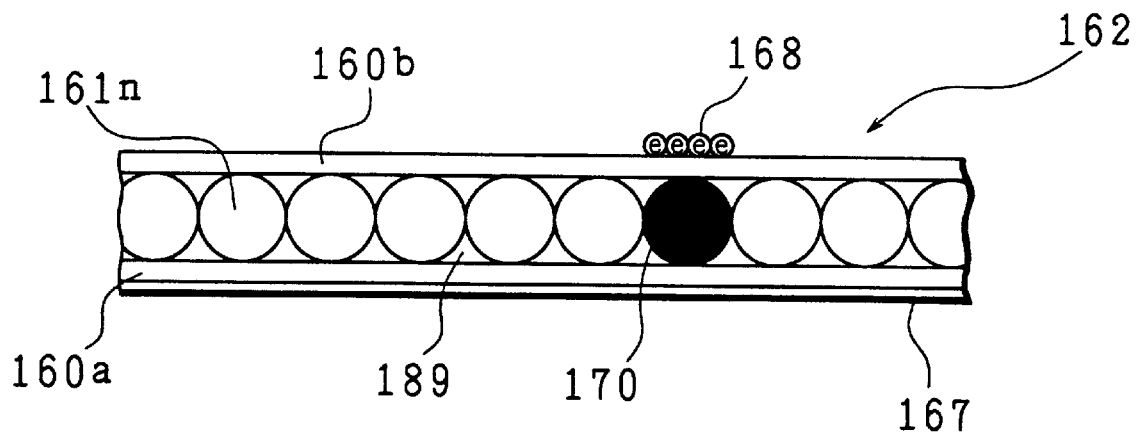
Figure 21A:
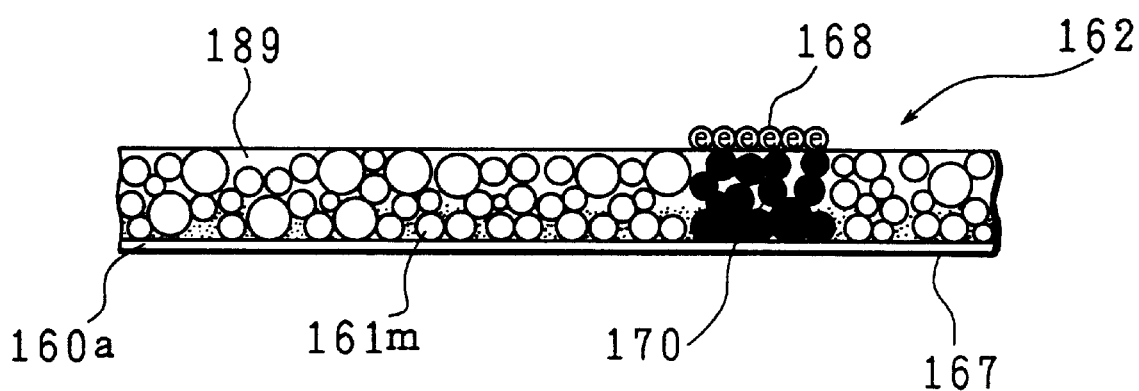
FIG. 21(a) and FIG. 21(b) are cross sectional views of still another example of the recording medium including a liquid crystal material in accordance with one embodiment of the present invention.
Figure 21B:
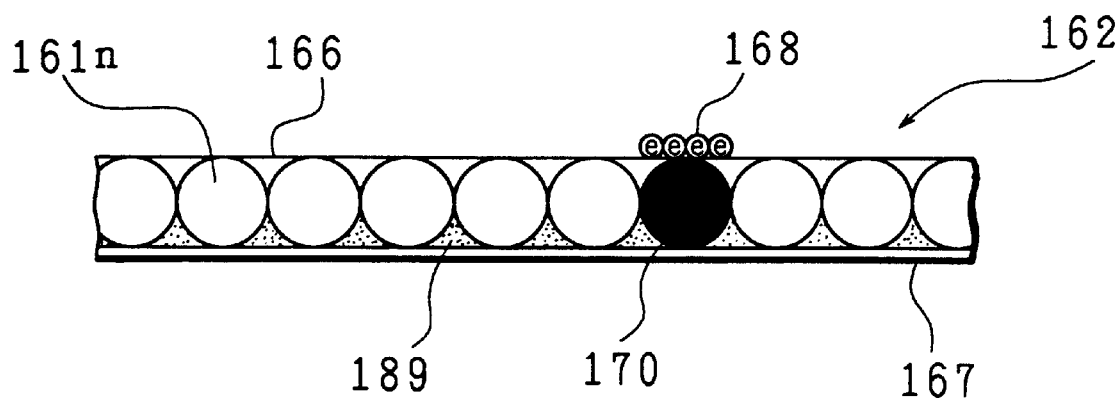

FIG. 19(a) and FIG. 19(b) show the arrangements of FIG. 13(a) and FIG. 13(b), respectively, with the described arrangement. FIGS. 19(a) and 19(b), FIGS. 20(a) and 20(b), and FIGS. 21(a) and 21(b) correspond to FIG. 18(a), FIG. 18(b), and FIG. 18(c), respectively. In this manner, various types of recording medium 162 can be realized with the above arrangement.

Figure 22:
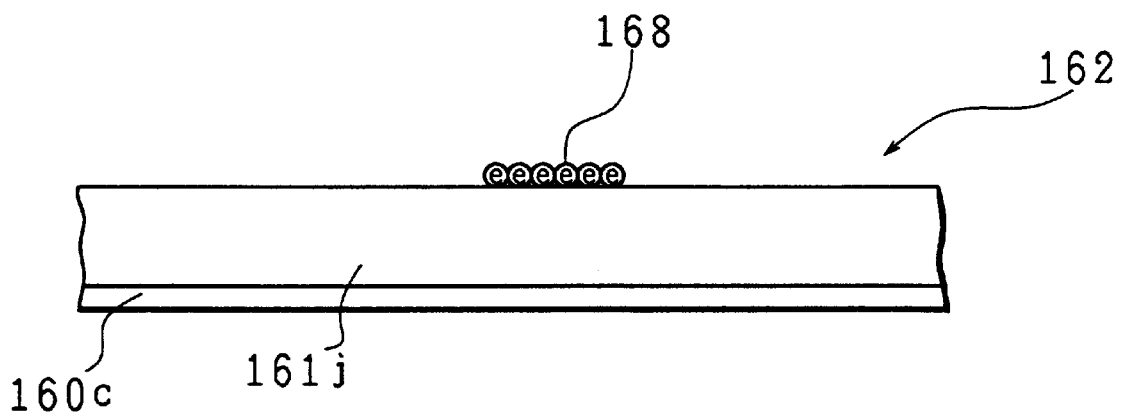
FIG. 22 is a cross sectional view of still another example of the recording medium including a liquid crystal material in accordance with one embodiment of the present invention.

In the above examples, the liquid crystal material 161 is controlled by the electric field generated between the substrate 167 provided on the rear surface of the recording medium 162 and the surface charge 168 put on the surface of the recording medium 162. However, not limiting to this, the electric field may be generated in a different manner. For example as shown in FIG. 22, the described recording can also be carried out with the board 160c having conductivity, instead of the board 160a. With this arrangement, the electric field due to the surface charge 168 is stably formed with respect to the board 160c having conductivity, thus realizing stable image formation regardless of where the recording medium is provided.

Further, in the case where a predetermined potential is applied to an arbitrary point on the board 160c, that is, for example, when the board 160c is grounded, further stable image formation is realized. This arrangement is preferable because it does not require the substrate 167 to be additionally provided, simplifying the arrangement of image formation. FIG. 22 shows the arrangement wherein the board 160c is adopted in the arrangement of FIG. 18(b). However, not limiting to this, the board 160c is also applicable to the other described arrangements.

Figure 23:
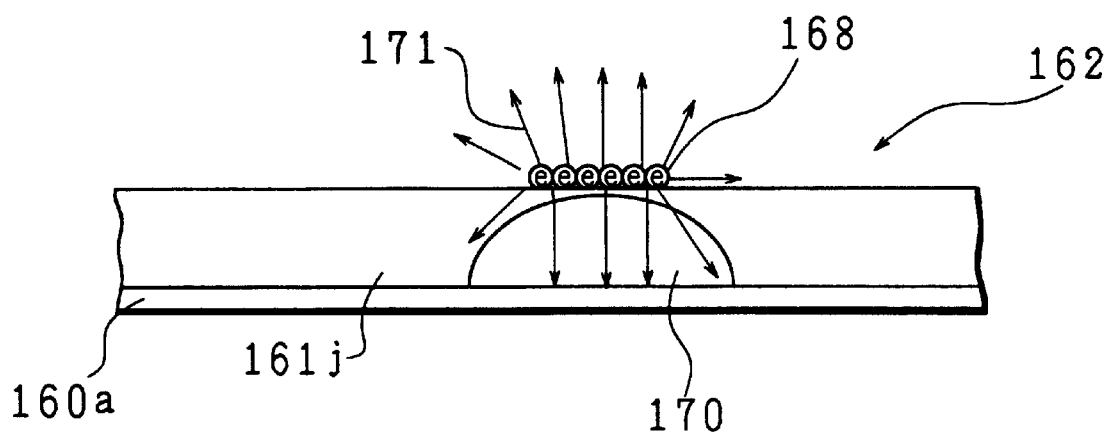
FIG. 23 is a cross sectional view of yet another example of the recording medium including a liquid crystal material in accordance with one embodiment of the present invention.

As the method of forming an electric field for controlling the liquid crystal material 161, other than the method by a potential difference between the surface charge 168 and the opposing conductive board, it is equally effective to adopt a method in which only the surface charge 168 is put on the recording medium 162 and an electric field is formed by electric force lines 171 generated from the surface charge 168, as shown in FIG. 23. In this case, as shown in FIG. 23, when the recording medium of FIG. 18(c) is used, the conductive substrate 160c is not required, and it is possible to use a board 160a made of a thin material. This arrangement further reduces the cost as compared with the arrangement of FIG. 22, that is, the arrangement with the board 160c, and therefore is preferable as the recording medium. Note that, FIG. 22 and FIG. 23 adopt the recording medium 162 of FIG. 18(b) as an example. However, not limiting to this, it is also possible to adopt the other described arrangements.

Figure 24:
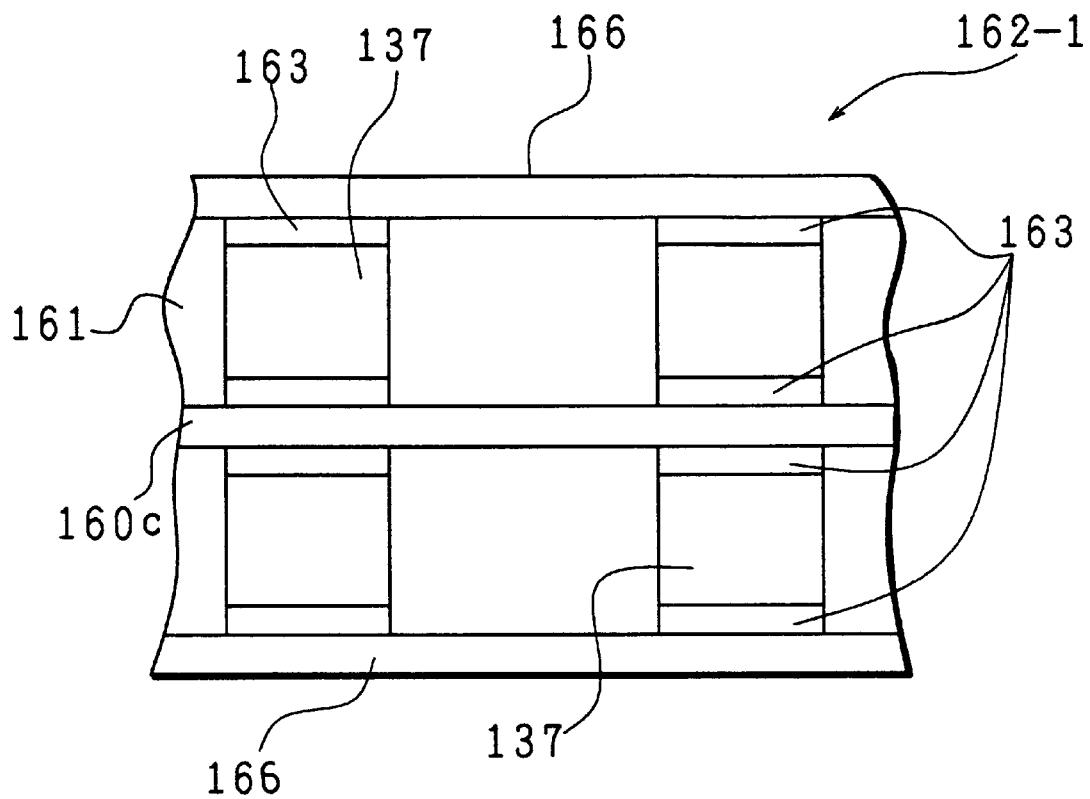
FIG. 24 is a cross sectional view of still another example of the recording medium including a liquid crystal material in accordance with one embodiment of the present invention.
Figure 25:
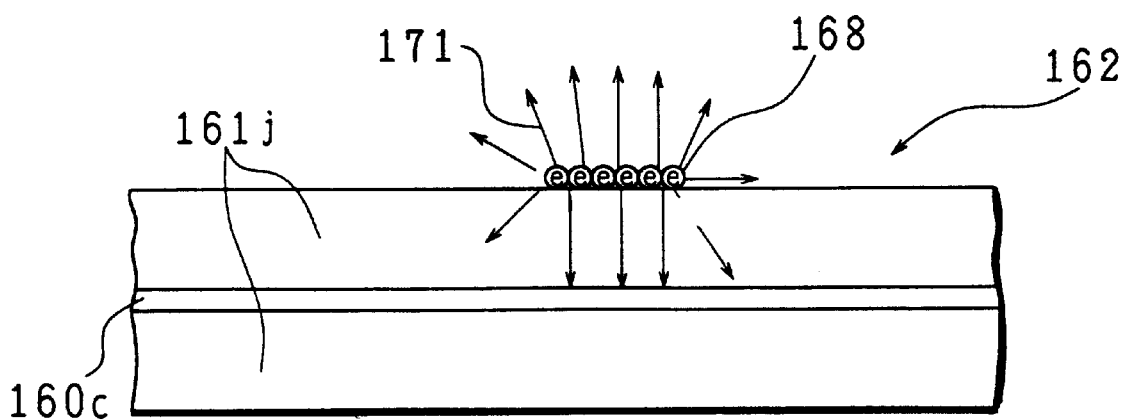
FIG. 25 is a cross sectional view of yet another example of the recording medium including a liquid crystal material in accordance with one embodiment of the present invention.

In the above examples, image data are recorded on one side of the recording medium 162. However, as shown in FIG. 24, it is possible alternatively to adopt a recording medium 162-1 capable of recording image data on both sides, using the arrangement of FIG. 2 for example. Also, the arrangement of double-sided recording medium can also be realized with the described other arrangements of, for example, FIG. 8 and FIG. 10. For example, FIG. 25 is a cross section of a recording medium capable of carrying out double-sided recording, adopting the arrangement of FIG. 18(b).

Although the polarizing plate 166 and the board 160b may be made of an insulator, when insulator is used, a charge is easily induced on the surface of the recording medium 162 by the friction generated when the recording medium 162 is rubbed with cloths, for example. A charge induced on the surface of the recording medium 162 in this manner may generate a dark region other than the dark region due to image data, and the image data may be destroyed. This can be effectively prevented by lowering by a certain amount the resistivity of the component provided on the surface of the recording medium 162, that is, for example, the polarizing plate 166 or the board 160 provided on the surface of the recording medium 162 in the described examples, for this easily neutralizes the charge induced on the surface. As the resistivity of these components, a middle to high resistivity range of 10e5 to 10e15 Ω·cm is preferable, most preferably in a range of 10e7 to 10e12 Ω·cm. A resistivity that is too low fails to form a required electric field as the charge put on the surface is quickly neutralized, making image formation difficult, and a resistivity that is too high fails to prevent the above problems caused by induced charge.

It is also possible to have an arrangement in which the board is not provided on the surface of the recording medium, that is, the arrangement in which, for example, an ion conductor is included in the liquid crystal material 161j to have a resistivity in the above ranges, for example, in the arrangement FIG. 18(b).

Also, in the above examples, a charge is applied on the surface of the recording medium 162 on the other side of the board 160a. However, an image may also be formed by a method in which a charge is supplied to the board 160a. In the arrangement of FIG. 18(a), the conductive substrate 167 as described above may be provided instead of the board 160b, and an arrangement adopting a conductive transparent board instead of the board 160b is also possible.

Further, an image may also be formed by supplying the surface charge 168 on the rear surface of the recording medium 162 in the arrangement of FIG. 18(b). In this manner, by positioning a conductive member on the opposite side of the surface charge 168, it is possible to further stabilize the electric field by the surface charge 168 and to obtain stronger electric field. This is preferable in view of image recording on the recording medium 162.

Also, in the above examples, a colored material is used for the board 160a, the board 160c, and the liquid crystal material 161. However, by adopting a transparent material for these members, an image can be formed in such a manner that only the dark region as formed in the described manner becomes nontransmissive. Such a recording medium has its use as an OHP sheet, for example.

Second Embodiment

The following will describe another embodiment of the present invention referring to FIG. 26 through FIG. 32. Note that, for convenience, members having the same functions as the members described in the drawings of First Embodiment are given the same reference numerals and explanations thereof are omitted here.

The present embodiment relates to an apparatus for forming an image on the recording medium 162. In the following, a method of forming an image will be explained using the recording medium 162 of FIG. 23 as an example of the recording medium 162. Yet, an image can also be formed with respect to the recording medium 162 of the other arrangements.

Figure 26:
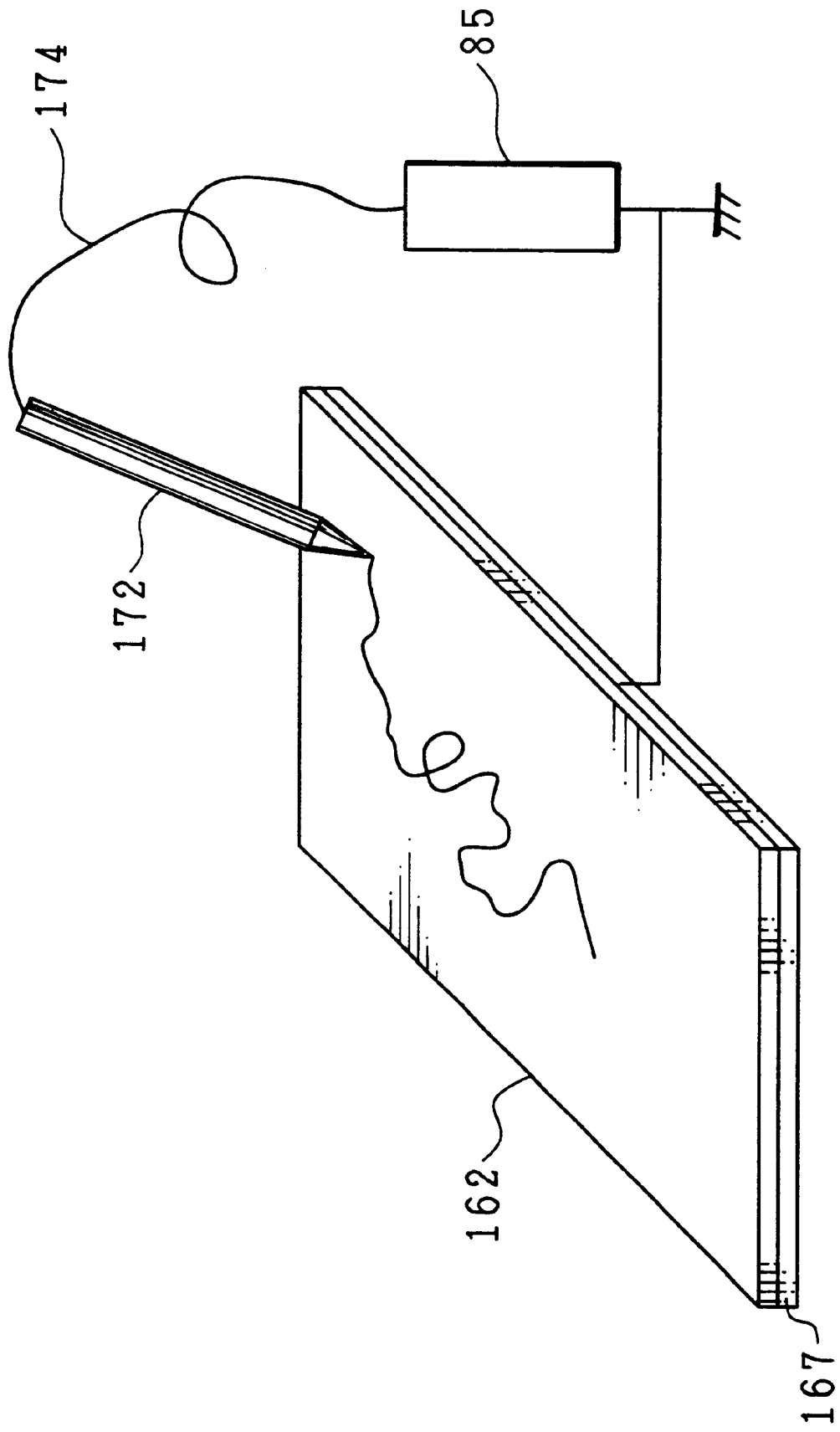
FIG. 26 is a drawing showing an image forming device in accordance with another embodiment of the present invention.

FIG. 26 illustrates the most basic image forming method. As shown in FIG. 26, the recording medium 162 is positioned on the substrate 167, and an image is formed by recording means 172, which is connected to the substrate 167 so that a potential difference is supplied from a power source 85. It is preferable that the recording means 172 has the shape with a fine point as shown in FIG. 26, which can be used in the same manner as an ordinary pen by the user. Even though resolution of recording can be improved as the point of the recording means 172 is made finer, it is required that the point of the recording means 172 be thick enough and soft enough so as not to scratch the recording medium 162. The degree of how fine and how soft the recording means 172 should be is easily changed depending on the strength of the recording medium 162 used, and so they are set appropriately in accordance with the recording medium 162 used. Alternatively, the recording means 172 may be, for example, in the form of a brush as shown in FIG. 27(a), or a flat brush as shown in FIG. 27(b), or a spatula.

It is preferable that the recording means is provided with a member with a resistivity of not more than a certain value on a portion which can be made contact at least with the surface of the recording medium so that the potential difference by the power source 85 with respect to the substrate 167 is generated on the surface of the recording medium 162. It is also preferable that such a low resistance member is provided with an insulating protective layer on the surface so that the low resistance member does not short-circuit when its surface is made contact with other devices, or that the user is prevented from accidents such as electrification upon contract with the low resistance member when the potential of the power source 85 used is large.

Figure 28:
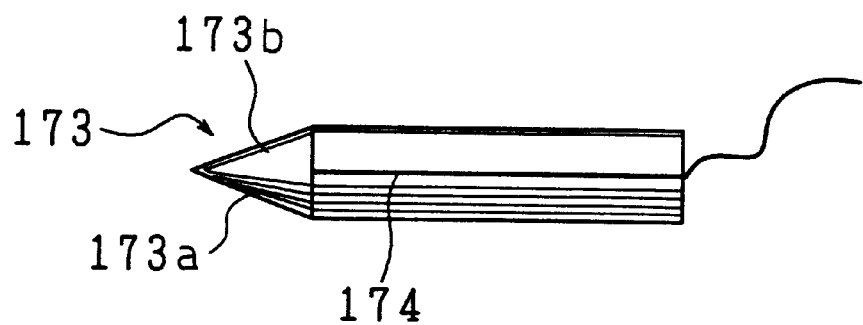
FIG. 28 is a drawing showing recording means used in the image forming device.

For example, FIG. 28 shows a contact portion 173 in the cross section of the recording means 172 used in FIG. 26, which is composed of a low resistance member 173*b* made of, for example, aluminum, which is Teflon-coated with a protective layer 173*a*. The contact portion 173 is connected to the power source 85 by a wire 174 inside the recording means 172.

The contact portion 173 may be composed of metal and an insulating layer covering the surface of the metal as described, or alternatively may be composed of a member 173*c* whose resistivity has been adjusted to realize a desirable image by including a resistance adjuster such as carbon black in a resin such as ABS.

When resistivity of the Teflon used is high, the charge accumulates on the surface of the Teflon, and this prevents the power source 85 to supply a desirable potential, failing to form a desirable electric field and thus a desirable image. In such a case, the protective layer 173*a* may have a resistivity which can easily neutralize the charge on the surface, for example, in a range of 10e3 to 10e15 Ω·cm, and more preferably 10e5 to 10e10 Ω·cm. The resistivity of the protective layer 173*a* that is too low causes the power source 85 to short-circuit in the event when the contact portion 173 is made contact with other parts of the apparatus, or easily causes accidents such as electrification of the user when the output potential of the power source 85 is high. The resistivity in the above ranges is also applicable to the low resistance member.

Figure 27:
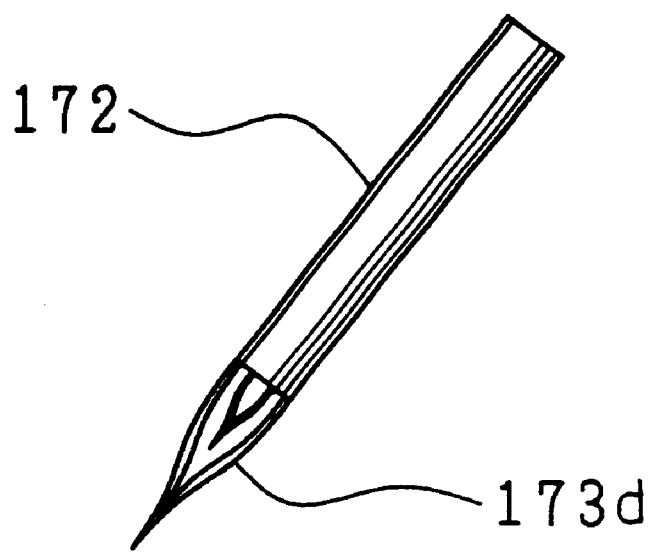
FIG. 27(a) and FIG. 27(b) are drawings showing recording means which can be used in the image forming device.
Figure 27:
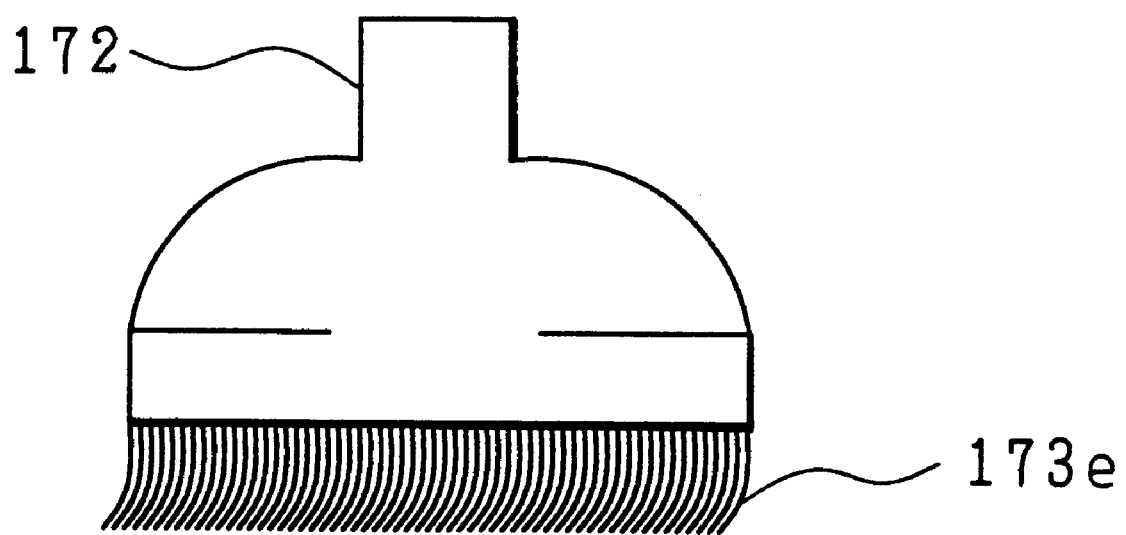

The recording means 172 of FIG. 27(*a*) and FIG. 27(*b*) are also provided with a contact portion 173d and a contact portion 173*e*, respectively, which correspond to the contact portion 173. The contact portions 173*d* and 173*e* may be provided with a coating layer on the surfaces of their conductive fibers in the described manner, or alternatively, the resistivity of the fibers itself may be adjusted to be in the above ranges.

Figure 29:
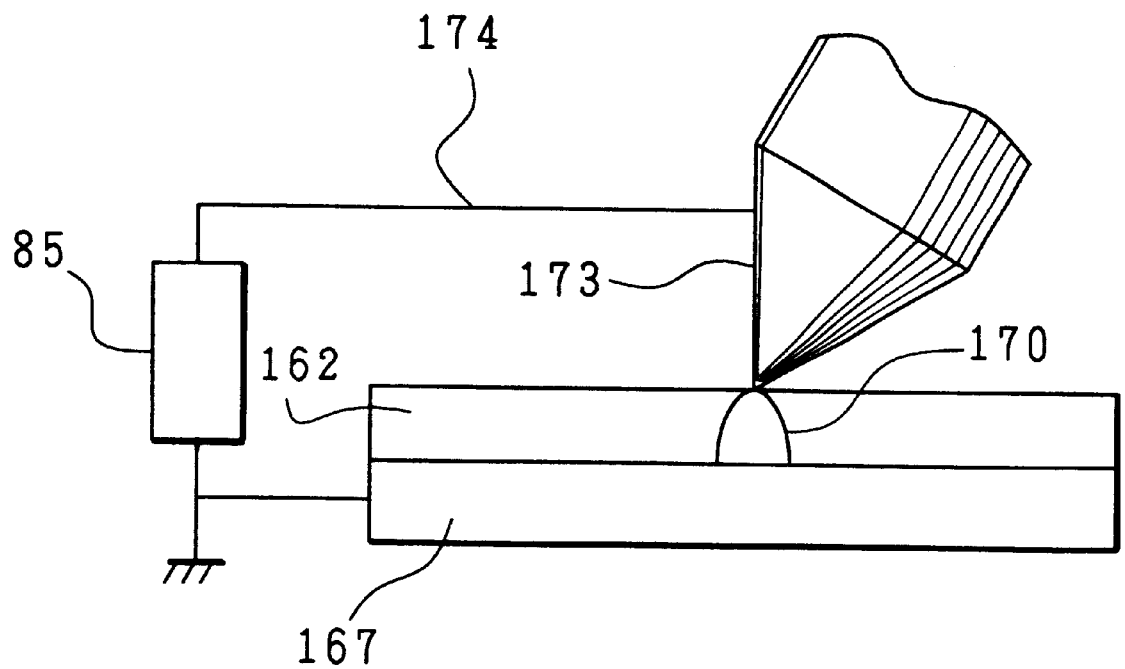
FIG. 29 is a drawing explaining image formation by the image forming device.

FIG. 29 shows the image forming apparatus in operation. As shown in FIG. 29, by the electric field formed by the potential difference supplied from the power source 85 between the substrate 167 and the recording means 172 in contact with the surface of the recording medium 162, a region facing the recording means 172 becomes dark state and the dark region 170 is formed. The dark region 170 is formed successively following the movement of the recording means 172, and the dark region 170 in the shape as desired by the user is formed on the recording medium 162, thus recording an arbitrary image as shown in FIG. 26, for example.

Here, the contact portion 173 of the recording means 172 and the substrate 167 may be electrically in a float state with respect to the power source 85, yet considering safety, it is preferable as in the present embodiment that the portion of the recording means 172 to be touched by the user is insulated and that the substrate 167 is grounded. When the substrate 167 is not grounded, it is required to insulate the substrate 167 entirely, and if this is not an option, a great care must be taken as to positioning of the substrate 167 so that the substrate 167 does not contact with GND to allow current flow from the power source 85, and this limits the positioning of the substrate 167. On the other hand, in the arrangement of FIG. 26, the substrate 167 is grounded and so positioning thereof is not limited.

Figure 30:
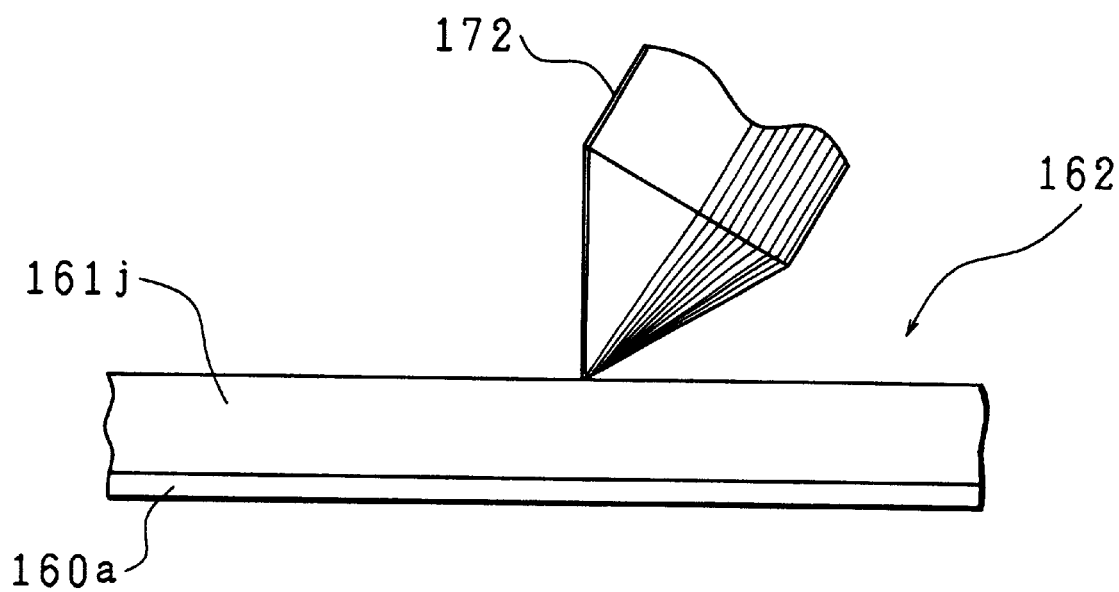
FIG. 30 is a drawing showing another image formation of the image forming device.

In FIG. 26, the dark region is formed by the recording means 172 and the substrate 167 in contact with the recording medium 162. However, provided that the charge is easily generated on the surface of the recording medium 162 by the friction between the surface material of the recording medium 162 and the recording means 172, it is not required provide the power source 85, the wire 174, and the substrate 167 as shown in FIG. 26, and the arrangement as shown in FIG. 30 is possible. In FIG. 30, when the recording means 162 is moved while being kept in contact with the surface of the recording medium 172, an arbitrary charge image is formed on the surface of the recording medium 162 by the charge generated on the contacting surface of the recording medium 162 and the recording means 172, and the dark region 170 as shown in FIG. 23 is formed on the recording medium 162 by the electric field induced by the charge.

This arrangement does not require a power source as recording means for supplying a charge and completely eliminates the need to provide wiring for connecting the power source and the recording means, and as a result it is possible to completely eliminate all the limitations on handling of the recording means, which are set by the power source and the wiring for connecting the power source and the recording means, thus realizing image formation with easy handling.

Figure 31A:
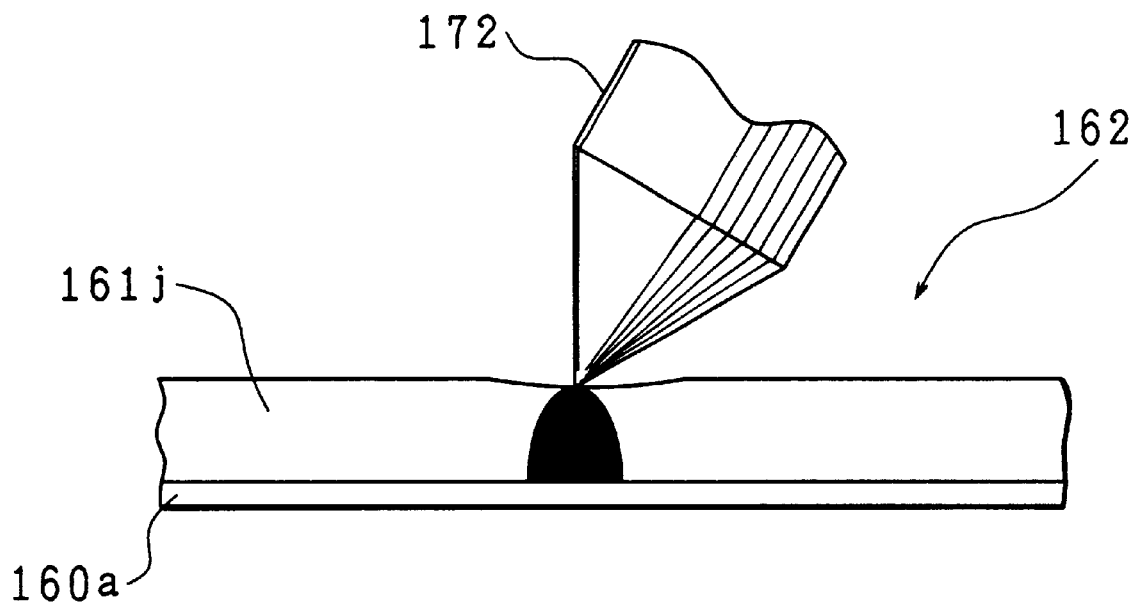
FIG. 31(a) and FIG. 31(b) are drawings showing still another image formation of the image forming device.
Figure 31B:
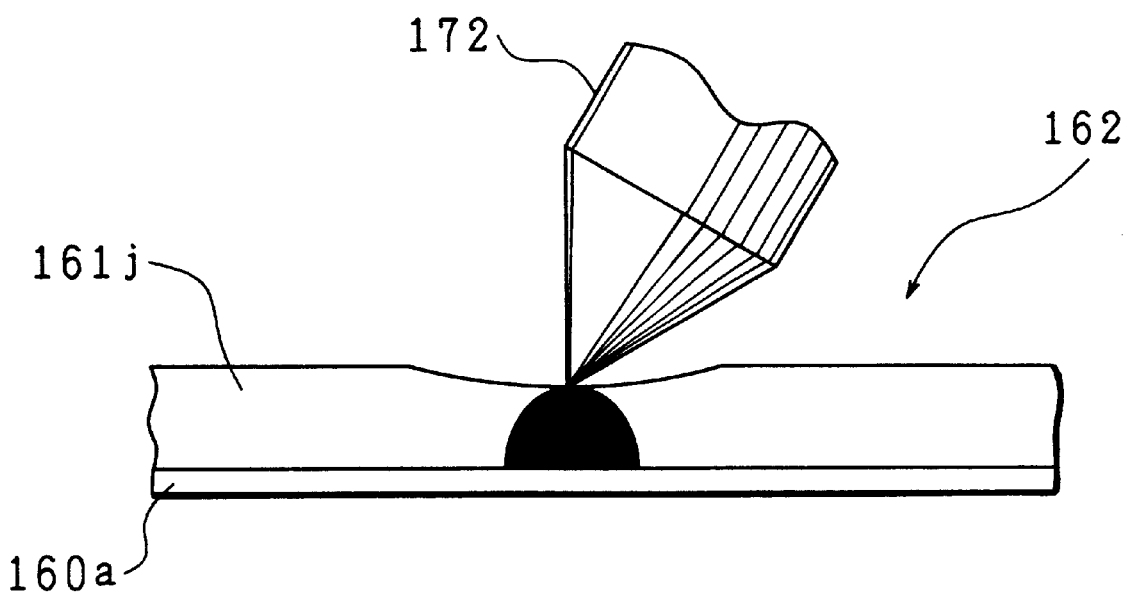
Figure 32A:
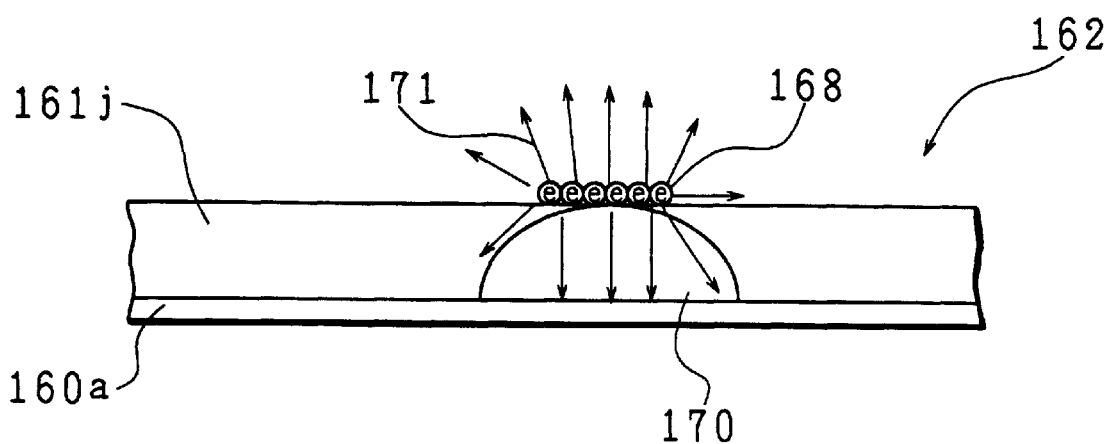
FIG. 32(a) and FIG. 32(b) are drawings showing yet another image formation of the image forming device.
Figure 32B:
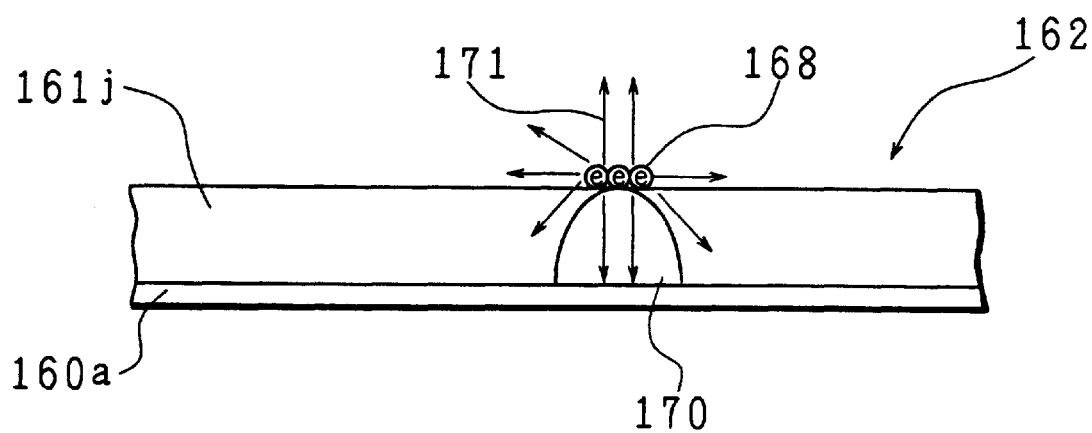

In FIG. 26 and FIG. 30, an image is formed by the recording means 172 which is brought into contact with the recording medium 162. However, in the case where the recording medium 162 has elasticity for the recording means 172 pressed against the recording medium 162, it is possible to adopt an image forming method in which the line width is adjusted by the pressure, as shown in FIG. 31 and FIG. 32. FIG. 31(*a*) shows the case where the recording medium 162 is pressed gently, and FIG. 31(*b*) shows the case where the recording medium 162 is pressed hard. In the arrangement of FIG. 31, the region in which the charge is generated is changed in accordance with the pressure of the recording means 172, making it possible to adjust the line width by the adhering region of the charge, as shown in FIG. 32(*a*) and FIG. 32(*b*). FIG. 32(*a*) shows the case where the pressure is strong, and FIG. 32(*b*) shows the case where the pressure is weak.

In FIG. 26, the conductive substrate 167 is provided. However, in the case where an image is formed in the described manner, the substrate 167 is not necessarily required. In such a case, the structure of the apparatus is further simplified, reducing the number of components and the cost of the apparatus and improving reliability.

FIG. 30 and FIG. 31 show the arrangement without the substrate 167. However, the arrangement in which the substrate 167 is additionally provided is also possible. In such an arrangement, the electric field by the surface charge 168 put on the surface of the recording medium is formed more stably, thus forming an image more desirably.

Third Embodiment

The following will describe yet another embodiment of the present invention referring to FIG. 33 through FIG. 43. Note that, members having the same functions as the members described in the drawings of the previous embodiments are given the same reference numerals and explanations thereof are omitted here.

First, an image forming apparatus for forming an image on the recording medium 162 will be described.

The basic principle for forming an image on the recording medium 162 lies in the described method in which an electrostatic charge image is formed on the surface of the recording medium 162, and the charge image is formed by the image forming apparatus described below.

Figure 33:
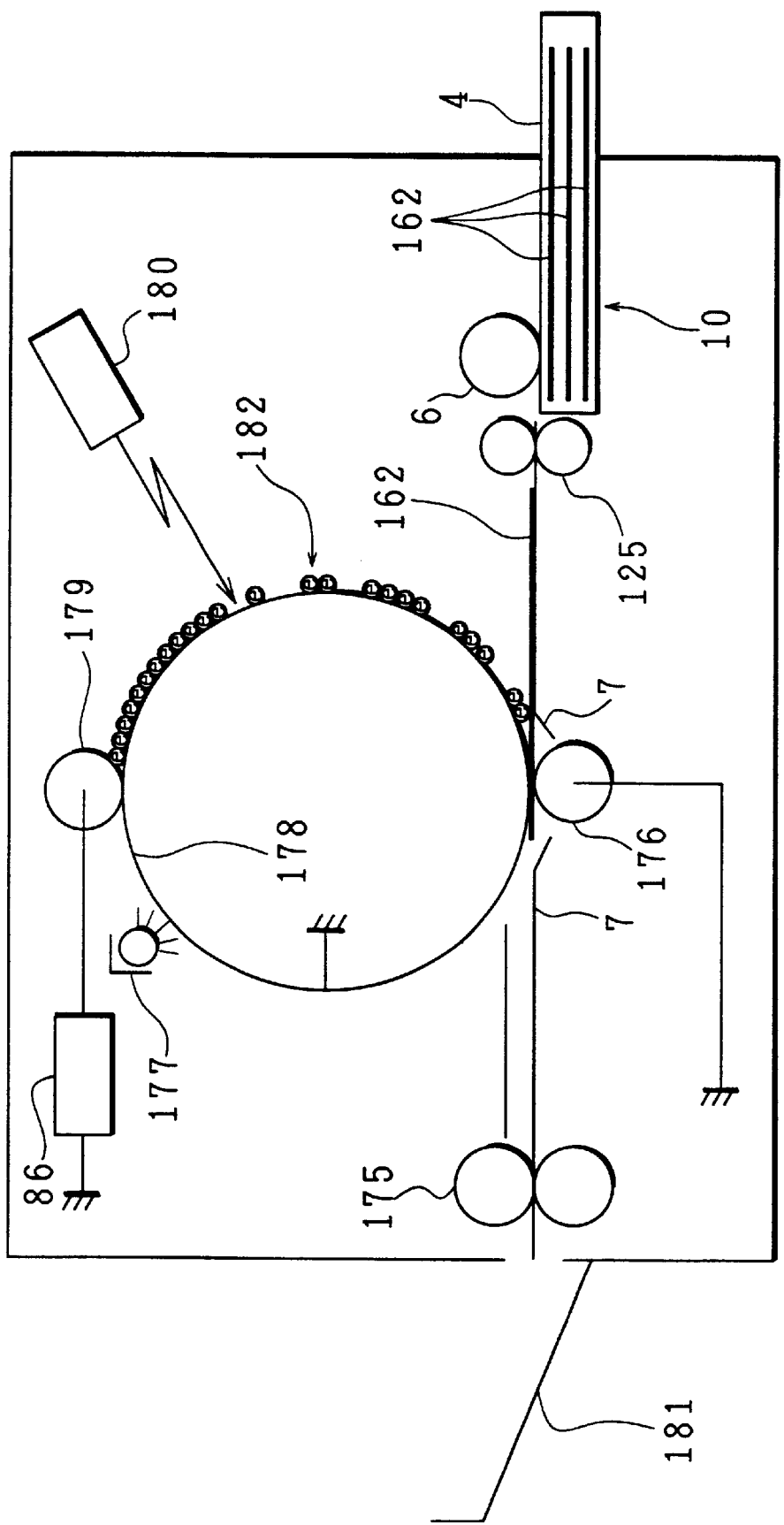
FIG. 33 is a drawing showing an image forming apparatus in accordance with yet another embodiment of the present invention.

FIG. 33 is a schematic cross sectional view of the image forming apparatus employing the recording medium 162, which is used as an output device of computers and also is usable as a printing section of word processors, facsimile devices, and digital copying machines. The image forming apparatus of FIG. 33 is composed of an image forming section for forming an image and a sheet feeding device 10 for supplying the recording medium 162 to the image forming section. The image forming section includes a photoreceptor drum 178 as an image carrier made from an aluminum sleeve with a photosensitive layer, a charging roller 179 for uniformly applying a charge on a surface of the photoreceptor drum 178, a charging power source 86 for supplying a potential to the charging roller 179, a laser unit 180 as exposing means for projecting a laser on the charged surface of the photoreceptor drum 178 in accordance with image data, a transfer roller 176 as transfer means for pressing the recording medium 162 against the photoreceptor drum 178, and a discharge lamp 177 for removing a charge remaining on the photoreceptor drum 178. The sheet feeding section 10 includes a cassette 4 for storing the recording medium 162, a pickup roller 6 for sending out the recording medium 162 from the cassette 4, a sheet feeding guide 7 for guiding the recording medium 162 supplied, and a pair of resist rollers 125 for transporting the supplied recording medium 162 at a predetermined speed. The sheet feeding section 10 also includes a sheet feeding sensor (not shown) for detecting that the recording medium 162 has been supplied. The pickup roller 6 and the photoreceptor drum 178 are rotatably driven by their respective driving devices (not shown). This driving is appropriately controlled by a process control unit (not shown) at a predetermined timing.

On the sheet discharge side of the image forming apparatus are provided a pair of sheet releasing rollers 175 for discharging the recording medium 162 out of the apparatus and a released sheet tray 181 for holding the recording medium 162 discharged.

The charging roller 179 is made of a solid rubber whose base material is, for example, urethane, and has a resistivity of 10e6 Ω·cm. The charging roller 179 supplies a potential to the photoreceptor drum 178, which is grounded by the charging power source 86, so that the surface potential of the photoreceptor drum 178 is −600 V. The transfer roller 176 is made of a foaming rubber whose base material is also urethane and has a resistivity of 10e5 Ω·cm.

The discharge lamp 177 is composed of a plurality of LEDs and is used to neutralize the charge remaining on the surface of the photoreceptor drum 178 by projecting light thereon so as to discharge the photoreceptor drum 178.

Most of the above components can be borrowed from corresponding components of a laser printer, for example.

The following describes an operation of the image forming apparatus of FIG. 33. When a printing operation is started in response to a print command from a host computer (not shown), first, a sheet of the recording medium 162 is picked up from the cassette 4 by the pickup roller 6, and it is sent to the resist rollers 125. The resist rollers 125 send the recording medium 162 at a predetermined speed to a region where the photoreceptor drum 178 and the transfer roller 176 are facing each other. Synchronizing with this operation, the charging power source 86 supplies a potential of, for example, −1000V to the charging roller 179 so that a surface potential of around −600 V is uniformly induced over the surface of the photoreceptor drum 178 by the charge supplied. Under this condition, when the charged area reaches a region facing a laser unit 180 by the rotation of the photoreceptor drum 178, the laser unit 180 projects a laser pulse in accordance with predetermined image data on the surface of the photoreceptor drum 178 charged. The photoreceptor drum 178, irradiated by the laser, loses some of its resistivity by photosensitivity, and the charge put on the surface of the photoreceptor drum 178 is neutralized and the surface potential is reduced, and as a result a charge (referred to as "electrostatic latent image 182" hereinafter) is formed on the surface of the photoreceptor drum 178 by the electrostatic charge. When the electrostatic latent image 182 thus formed reaches the region where the photoreceptor drum 178 faces the transfer roller 176 by the rotation of the photoreceptor drum 178, it is made contact with the recording medium 162 which has been transported to the facing region of the photoreceptor drum 178 and the transfer roller 176. As a result, as shown by the enlarged cross sectional view of FIG. 34, an electric field by the charge of the electrostatic latent image 182 formed on the surface of the photoreceptor drum 178 is formed over the recording medium 162. Then, by the rotation of the photoreceptor drum 178, the point of contact of the photoreceptor drum 178 and the recording medium 162 is moved, and the dark region 170 by the electric field is successively formed on the recording medium 162, thus forming the dark region 170 on the recording medium 162, which corresponds to the electrostatic latent image 182 formed on the photoreceptor drum 178. Thereafter, the recording medium 162 is pushed out by the rotations of the photoreceptor drum 178 and the transfer roller 176, and upon reaching the sheet releasing rollers 175, the recording medium 162 is released to the released sheet tray 181 by the sheet releasing rollers 175.

The electrostatic latent image 182, having passed through the region where the photoreceptor drum 178 and the transfer roller 176 face each other, reaches a region facing the discharge lamp 177. The discharge lamp 177 projects discharge light over the entire surface of the photoreceptor drum 178 facing the discharge lamp 177 so as to neutralize unnecessary charges of the electrostatic latent image 182.

Figure 34:
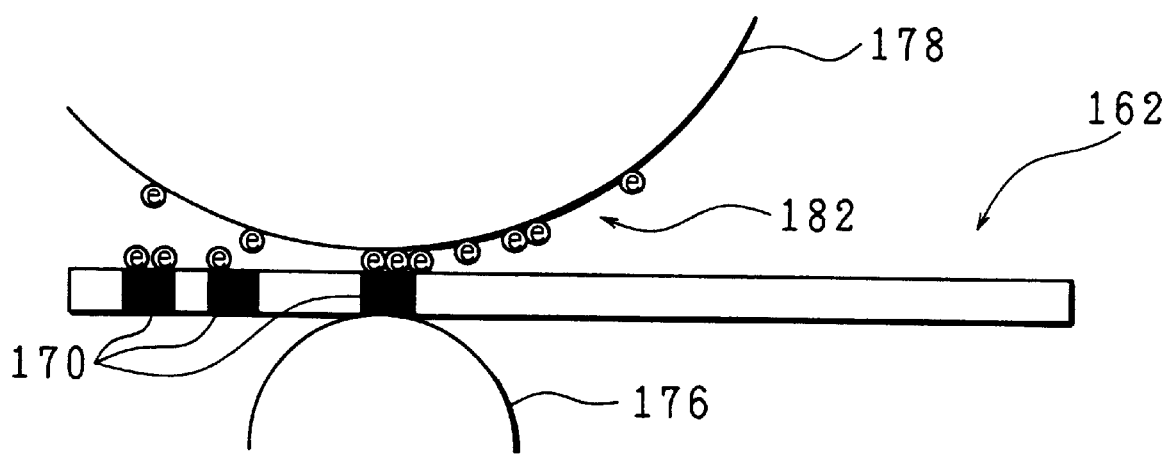
FIG. 34 is a cross section of the recording medium when carrying out recording by the image forming apparatus.
Figure 35:
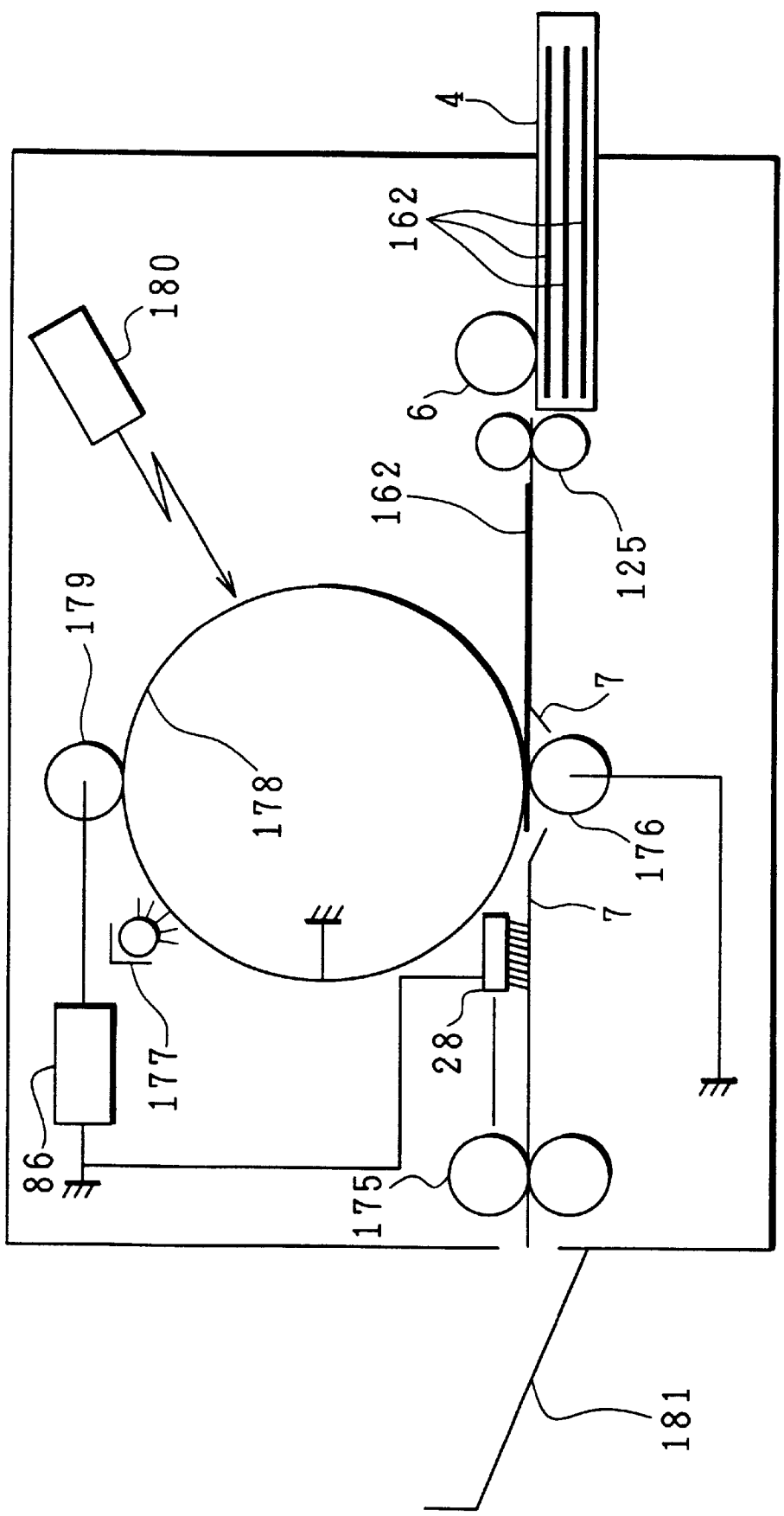
FIG. 35 is another example of the image forming apparatus in accordance with one embodiment of the present invention.

In FIG. 33, as shown by the enlarged view of FIG. 34, there is a case where the charge on the photoreceptor drum 178 is transferred to the surface of the recording medium 162. This causes a transfer failure as the recording medium 162 electrostatically adheres on the transport path, resulting in paper jam. In such a case, it is preferable to provide discharge means for removing unnecessary charges on the recording medium 162 after forming an image, and for this purpose, for example, a discharge brush 28 as shown in FIG. 35 is suitably adopted. Also, for example, when the sheet releasing rollers 175 are made of a material capable of discharging the surface of the recording medium 162, that is, for example, when a material having a low resistivity of not more than 10e5 Ω·cm such as urethane rollers is adopted, it is not required to additionally provide the discharge means, reducing the number of components and size and cost of the apparatus.

In the image forming apparatus of FIG. 33, the laser unit 180 is adopted as exposing means for forming the electrostatic latent image 182. However, not limiting to this, it is also possible to adopt, for example, an LED head composed of a plurality of LEDs. Further, while the exposing means may be means for exposing, for example, an image signal from a computer or from an image processing section of a digital copying machine, it may be an exposing device of, for example, an analog copying machine capable of exposure by copying light projected on a document, for example.

Figure 36:
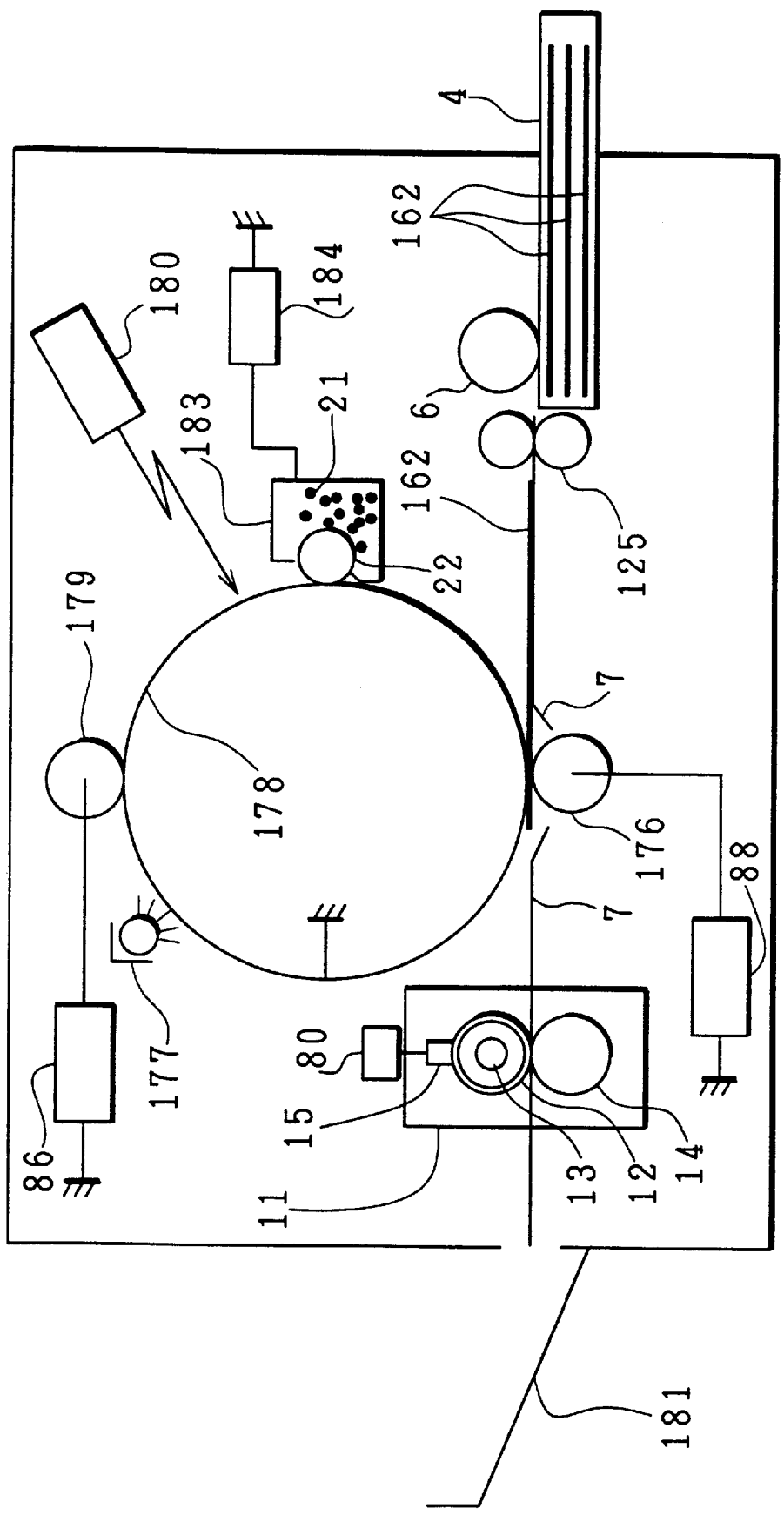
FIG. 36 is yet another example of the image forming apparatus in accordance with one embodiment of the present invention.

As mentioned above, most of the components of the image forming apparatus can be borrowed from corresponding components of a laser printer. This allows the described image formation to be carried out using a common laser printer, etc. For example, in a laser printer of FIG. 36, the described printing on the recording medium 162 can be realized by adding the following functions to the laser printer. In FIG. 36, the components having the same reference numerals as those of FIG. 33 have the same functions. The laser printer of FIG. 36 is provided with means for inputting whether to use the recording medium 162 or an ordinary sheet of paper as a recording medium, and the input means switches a first printing mode in which an ordinary sheet of paper is used and a second printing mode in which the recording medium 162 is used.

The image forming apparatus of FIG. 36 is provided with a fixing section 11 for fixing a toner image formed on a sheet by applying heat and pressure onto the toner image. The fixing section 11 includes a heat roller 12, a heater 13, a pressure roller 14, a temperature sensor 15, and a temperature control circuit 80. The heat roller 12 is composed of an alminium tube having a thickness of, for example, 2 mm. The heater 13 is composed of, for example, a halogen lamp, and is installed in the heat roller 12. The pressure roller 14 is made of, for example, silicon resin, and a load of, for example, 2 kg is applied to each and on the both ends of the axis of the heat roller 12 and the pressure roller 14 by a spring (not shown) etc. The temperature sensor 15 measures the surface temperature of the heat roller 12. The temperature control circuit 80 is controlled by a main control section, and controls ON/OFF operation, etc. of the heater 13 based on the measurement result of the temperature sensor 15 so as to maintain the surface temperature of the heat roller 12 at 150° C., for example. The fixing section 11 is also provided with a released sheet sensor (not shown) for detecting that the sheet has been released. Note that, the materials of the heat roller 12, the heater 13, the pressure roller 14, etc. are not particularly limited. The surface temperature of the heat roller 12 is not particularly limited either. Alternatively, the fixing section 11 may have an arrangement wherein a toner image is fixed on a recording medium such as an ordinary sheet of paper and an OHP sheet by application of heat or pressure.

In the image forming apparatus of FIG. 36, in the first printing mode in which printing is carried out using an ordinary sheet of paper, the toner image is fixed by the described control of the fixing section 11. On the other hand, in the second printing mode in which the recording medium 162 is used, no temperature control is carried out with respect to the fixing section 11, that is, for example, no power is supplied to the heater 13, and the fixing section 11 is merely used as transport means of the recording medium 162, or discharge means of the surface charge on the recording medium 162. Therefore, it is not necessarily the case that the recording medium 162 used in the second printing mode can resist the heat or pressure applied in the fixing section 11 in the first printing mode. Thus, the described control, rather than heating of the fixing section 11, is preferable in the second printing mode since this increases the selection of materials to be used as the recording medium 162.

The image forming apparatus of FIG. 36 includes a developer tank 183 as developing means for developing the electrostatic latent image 182 on the surface of the photoreceptor drum 178 and a developer tank control power source 184 for controlling a potential applied to the developer tank 183. The developer tank 183 is provided inside with toner 21 and a toner carrier 22 for carrying the toner 21. The toner 21, for example, is a black toner with the average particle diameter of 6 μm having magnetism, which is negatively charged by a conventional charging mechanism. In the first printing mode, the function of the developer tank 183 is to develop the electrostatic latent image 182 on the photoreceptor drum 178 by application of a voltage of −500 V by the developer tank control power source 184, whereas in the second printing mode, the developer tank 183 carries out the control of changing the developer bias by the developer tank control power source 184 so as not to develop the electrostatic latent image 182 on the photoreceptor drum 178.

In this manner, the image forming apparatus of FIG. 36 carries out printing by changing the printing mode depending on the recording medium used, thus realizing desirable image formation with ease even when the recording medium 162 is used.

In the example of FIG. 36, the control is carried out in such a manner that the fixing section 11 is not heated in the second printing mode when the recording medium used is the recording medium 162. However, in the case where the recording medium 162 used has heat resistance, or shows no change in property with respect to the temperature applied in the first printing mode, it is not required to carry out a different control for the first printing mode and the second printing mode, and the same temperature or the temperature lower than the temperature (150° C. in the above example) of the first printing mode may be applied in the second printing mode.

Nevertheless, it is preferable not to carry out the control of heating the fixing section 11 in the second printing mode for the following reasons. That is, the recording medium 162 does not require to be fixed by heat in image formation. Thus, there is no need to heat the fixing section 11, saving the power required to heat the fixing section 11. Also, no waiting time due to temperature increase of the fixing section 11, which occurs when power is delivered to the apparatus or when the apparatus is powered from a long standby mode (sleep mode), is generated, thus realizing fast printing.

The image forming apparatus of FIG. 36 carries out a control of changing a developer bias using the developer tank control power source 184 so as to disable the developer tank 183 in the second printing mode. For example, in the image forming apparatus of FIG. 36, the developer tank control power source 184, while supplying a potential of −500 V to the developer tank 183 in the first printing mode, sets the developer bias to 0 V in the second printing mode to prevent transfer of toner to the photoreceptor drum 178. The developer bias in the second printing mode is preferably a potential which does not allow the toner 21 to move towards the electrostatic latent image 182 on the photoreceptor drum 178, and it is more preferable to apply such a potential that the developer tank 183 has a positive potential difference with respect to the electrostatic latent image 182, and for this a potential of, for example, +100 V is suitable. Note that, although the toner used in the present embodiment is negatively charged, in the case of using a toner which is positively charged, the potential difference used is appropriately changed, and the polarity of the toner 21 used is not particularly limited.

As the method of preventing development of the photoreceptor drum 178 in the second printing mode, the developer tank 183 controls the developer bias in the above example. However, not limiting to this, it is also possible to adopt a method in which the developer tank 183 is separated from the photoreceptor drum 178, or an arrangement provided with a shutter (not shown).

Also, in the image forming apparatus of FIG. 36, a transfer power source 88 in the first printing mode applies a transfer potential of 1.5 kV to the transfer roller 176 when transferring the toner 21 on the photoreceptor drum 178 onto a sheet of paper. In contrast, in the second printing mode, a control is carried out in such a manner that the potential applied by the transfer power source 88 to the transfer roller 176 is 0 V. When using the recording medium 162, when a high voltage is applied to the transfer roller 176, there is a case where the image by the electrostatic latent image 182 on the photoreceptor drum 178 cannot be formed on the recording medium 162 due to the potential difference by the applied potential between the transfer roller 176 and the photoreceptor drum 178. Thus, in the second printing mode in which the recording medium 162 is used, it is preferable to lower the potential applied to the transfer roller 176, or to set the potential to 0 V.

Other than the described image formation on the recording medium 162 by the above image forming apparatus, it is also possible to form a toner image on the recording medium 162, using the recording medium 162 as a sheet of paper, that is, the recording medium 162 may also be used in the first printing mode. This makes it possible to create, for example, boarders or ruled lines of a predetermined format, thus freely forming an arbitrary image on the recording medium 162 in accordance with the predetermined format. In this case, the pressure or heat applied in fixing is appropriately adjusted so as not to damage the recording medium 162.

The above example described the image forming apparatus which forms an image based on image data from a computer, for example. However, the recording medium 162 can also be used, for example, for copying of an already existing image as with a common copying machine by application of the above example. A common copying machine is the image forming apparatus adopting the electrophotographic system, as with the image forming apparatus in the above example, and therefore capable of carrying out copying with respect to the recording medium 162 when provided with and by controlling the first printing mode and the second printing mode of the above example, in which an ordinary sheet and the recording medium 162 are used, respectively. This copying operation was explained above and detailed explanations thereof are omitted here.

Figure 37:
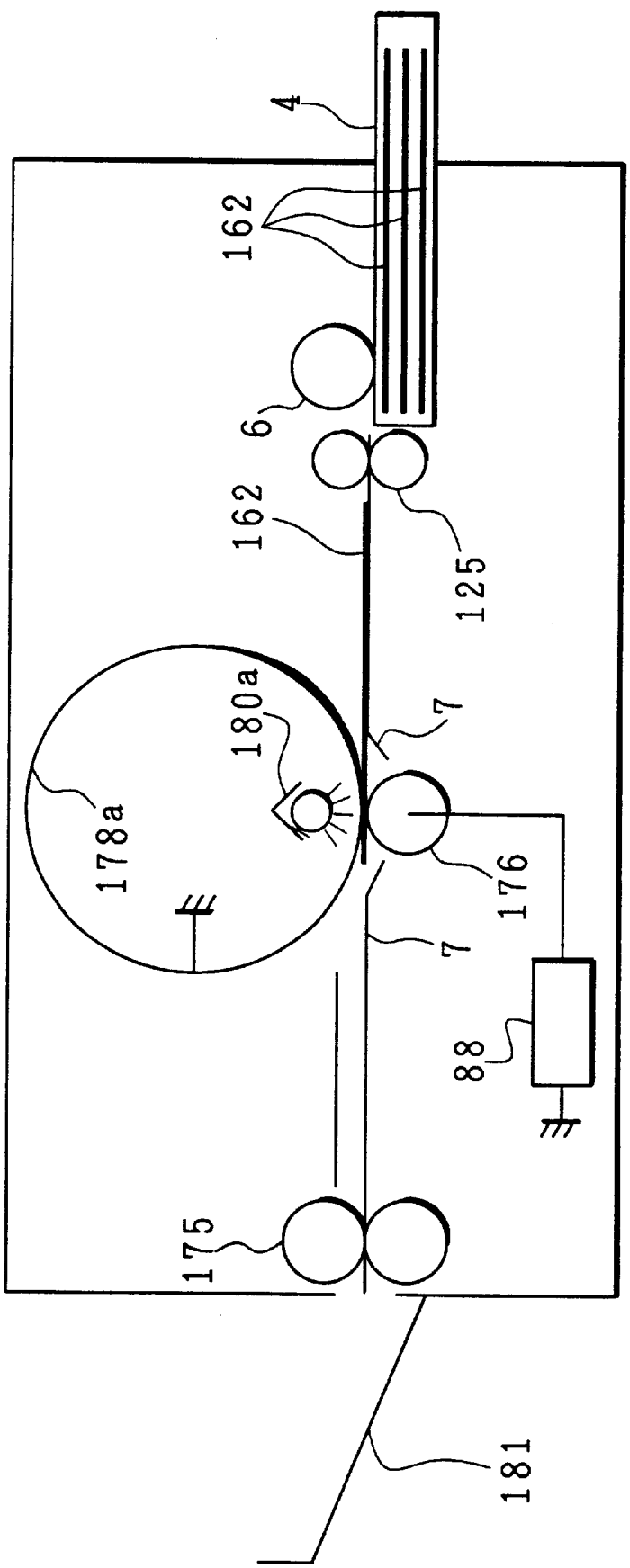
FIG. 37 is still another example of the image forming apparatus in accordance with one embodiment of the present invention.

In the described example, image information to be recorded is made visible on the photoreceptor by the image forming method based on Carlson process. Alternatively, an image forming method by a so-called back exposure system is also possible. FIG. 37 shows an example of such a method. As shown in FIG. 37, an LED array 180*a* as exposing means is provided inside a transparent photoreceptor drum 178*a* as an image carrier facing the transfer roller 176 as electric field forming means. Other components are the same as the ones in the above example. The LED array 180*a* is composed of, for example, a disposed array of 2560 LEDs, and controls ON/OFF of the LEDs in accordance with image data. The portion of the photoreceptor drum 178*a* facing the LEDs lighted loses some of its resistivity, and an electric field is applied to the recording medium 162 which has been transported. As a result, an arbitrary image corresponding to the image data is formed on the recording medium 162. In the image forming apparatus of FIG. 37, it is not required to supply a uniform charge over the photoreceptor drum in image formation with respect to the recording medium 162, and in addition to not requiring the charge roller 179 and the charge power source 86, the LED array 180*a* as exposing means is provided inside the photoreceptor drum 178*a*, thus reducing the number of components, size, and cost of the apparatus and improving reliability. In the case where the recording medium 162 needs to be discharged in the image forming apparatus of FIG. 37, the discharge brush 28 may be additionally provided.

When the charge remains on the surface of the recording medium 162, the recording medium 162 is adhered on the transport path by the electrostatic force of the charge, generating a transport failure of the recording medium 162 and paper jam with ease. This is not preferable and may cause other troubles in the apparatus. It is therefore preferable to discharge the surface of the recording medium 162 in the described manner. Also, a remaining charge on the recording medium 162 causes the recording medium 162 to be easily contaminated by dusts and particles in the air which are attracted by the electrostatic force of the charge remaining on the recording medium 162 after it is transported out of the image forming apparatus. Thus, a remaining charge on the surface of the recording medium 162 is undesirable, and as shown in FIG. 35, it is preferable to provide discharge means for discharging the recording medium 162 after image formation. For example, in FIG. 35, the discharge brush 28 is provided.

Figure 38:
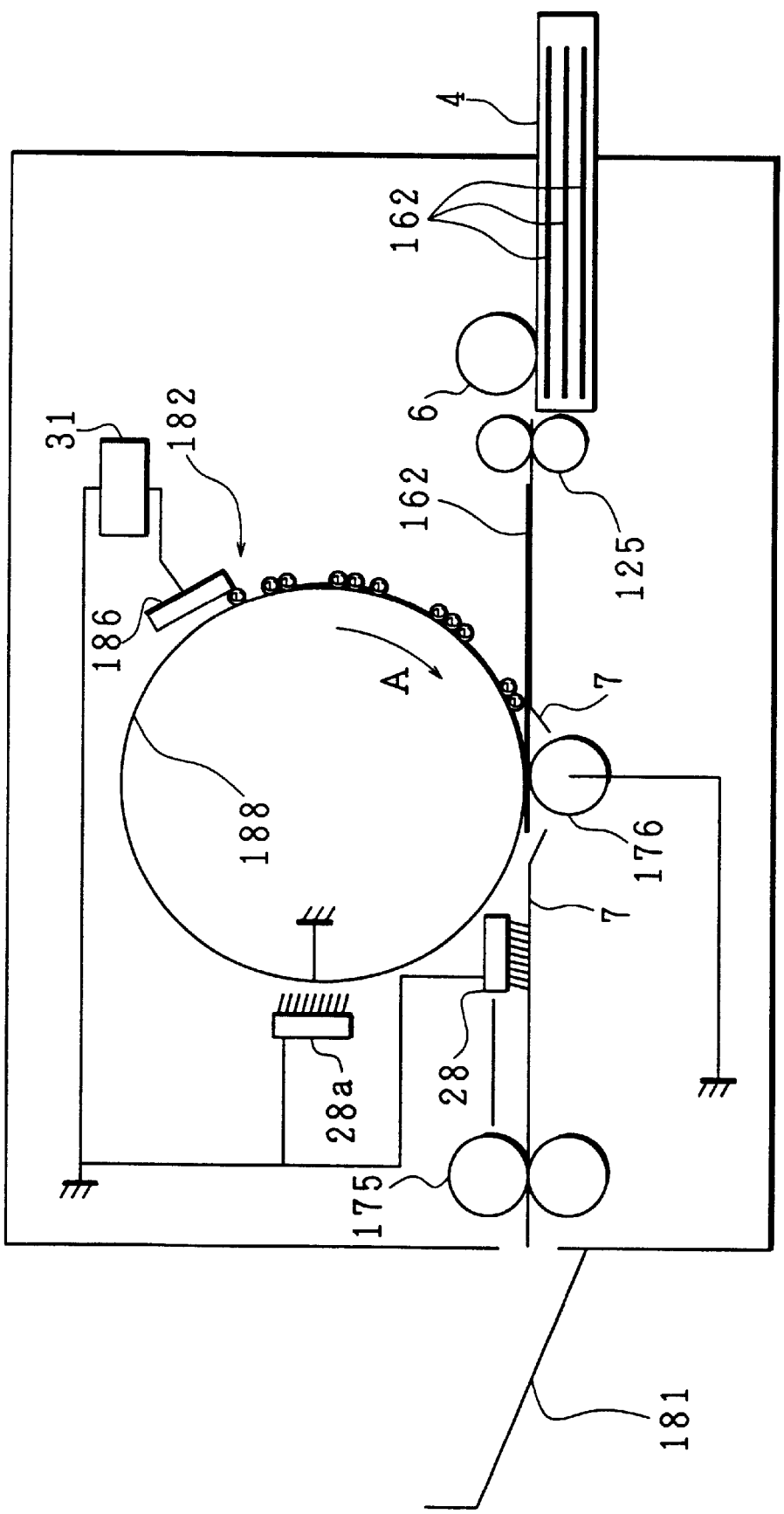
FIG. 38 is yet another example of the image forming apparatus in accordance with one embodiment of the present invention.
Figure 40:
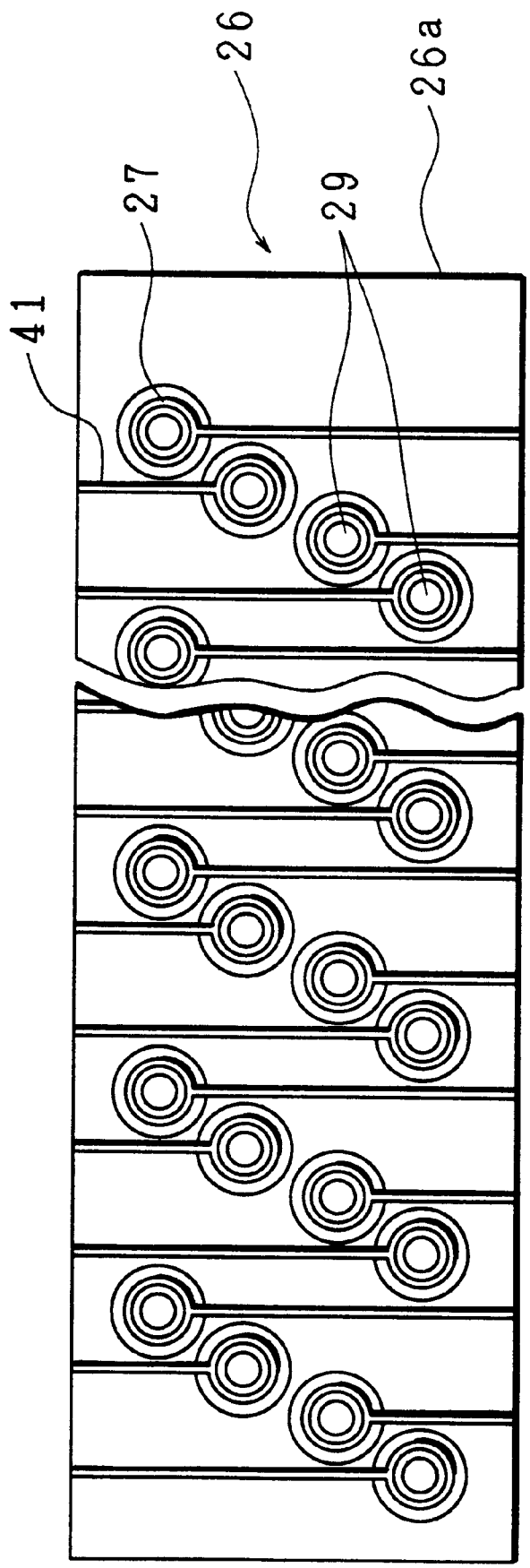
FIG. 40 is a schematic diagram showing a control electrode used in the image forming apparatus.

As described, in the above examples, the electrostatic latent image 182 in accordance with the image data to be formed on the recording medium 162 is formed using the optical system. However, as shown in FIG. 38, it is also possible to adopt a method which uses a latent image forming head 186 as electrostatic charge image forming means, instead of the optical system. This arrangement does not require the charging means for uniformly charging the LED array 180*a* (exposing means) and the photoreceptor drum 178 with respect to image formation on the recording medium 162, reducing the number of components, size, and cost of the apparatus and improving reliability. The latent image forming head 186 is for forming an electrostatic charge image in accordance with the image data on an insulating image carrier 188 facing the latent image forming head 186. FIG. 39 shows an enlarged view of the latent image forming head 186. As shown in FIG. 39, the latent image forming head 186 is provided with a corona discharger 187 as a charged particle source and a control electrode 26. The corona discharger 187 generates a negative charge by means of corona discharge generated inside the corona discharger 187, for example, by a discharge power source (not shown) so as to supply a negative charge to the control electrode 26. The control electrode 26 is fixed on the latent image forming head 186 with the distance of 100 $\mu$m from the image carrier 188. As shown in FIG. 40, the control electrode 26 is composed of an insulating substrate 26*a*, a high voltage driver (not shown), and independent ring insulators, that is, ring electrodes 27. The substrate 26*a* is made of, for example, polyimide resin, and has a thickness of 25 $\mu$m. The substrate 26*a* is provided with pores which constitute gates 29 (described later). The ring electrodes 27 are made of, for example, a copper foil having a thickness of 18 $\mu$m, and are provided around the pores in a predetermined arrangement. The opening section of each pore has a diameter of, for example, 160 $\mu$m, and constitutes a passing section of the negative charge generated by the corona discharger 187. The passing section will be referred to as a gate 29 in the following. Each ring electrode 27 is provided with an opening section with a diameter of 200 $\mu$m.

The size of the gates 29 and the material, thickness, and other dimensions of the substrate 26*a* and the ring electrodes 27 are not particularly limited. There are provided, for example, 2560 gates 29, or pores on the ring electrodes 27, and each ring electrode 27 is electrically connected to a control power source section 31 via a feed line 41 and the high voltage driver (not shown).

Note that, the number of ring electrodes 27 is not particularly limited.

The surfaces of the ring electrodes 27 and the feed line 41 are covered with an insulating layer having a thickness of 30 μm, ensuring insulation between the ring electrodes 27, between feed lines 41, between the ring electrodes 27 and the feed lines 41 which are not connected to each other, and from the toner carrier 22 and a counter electrode.

To the ring electrodes 27 of the control electrode 26 are applied a pulse, that is, a voltage in accordance with an image signal from the control power source section (control means) 31. Namely, the control power source section 31 applies a potential of, for example, 150 V to the ring electrodes 27 when allowing passage of a negative charge toward the image carrier 188 (such a potential will be referred to as ON potential hereinafter), and applies a potential of, for example, −200 V to the ring electrodes 27 when not allowing passage of a negative charge (such a potential will be referred to as OFF potential hereinafter).

In this manner, when passage of a charge through each gate 29 is controlled by controlling the potential applied to the control electrode 26 in accordance with an image signal, the electrostatic latent image 182 in accordance with the image signal is formed on the surface of the image carrier 188. Note that, the control power source section 31 is controlled by a control electrode controlling signal sent from an image formation control unit (not shown).

The electrostatic latent image 182 formed on the image carrier 188 is made into a corresponding visible image on the recording medium 162 which has been transported to a position facing the transfer roller 176, as in FIG. 34. The recording medium 162 formed with the image is released to the released sheet tray 181 by the sheet releasing rollers 175 after its surface charge is removed by the discharge brush 28. The surface charge of the image carrier 188 is removed from the surface after moved to the position of a discharge brush 28a by the rotation in the direction of arrow A in FIG. 38.

In the present example, the image carrier 188 is grounded. However, it is possible alternatively to supply a potential to the image carrier 188 by additionally providing a power source so that the latent image is formed desirably.

It is also possible and desirable to supply a potential to the transfer roller 176 by additionally providing a power source so that the image is formed desirably.

Figure 41:
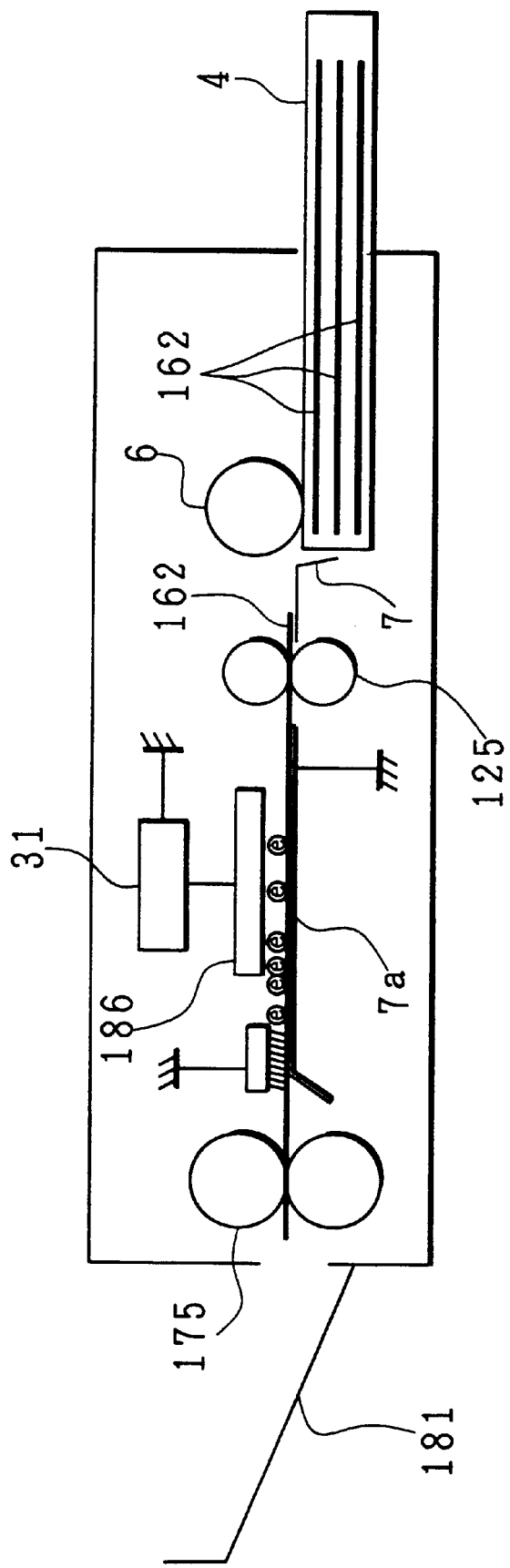
FIG. 41 is a drawing showing still another example of the image forming apparatus in accordance with one embodiment of the present invention.

Provided that the shape of the recording medium 162 used in the image forming apparatus is restricted to the shape in the form of a sheet, the image forming apparatus adopting the latent image forming head 186 may have an arrangement as shown in FIG. 41. In the image forming apparatus of FIG. 41, a guide 7a as a counter electrode, which also functions as a paper guide is provided facing the latent image forming head 186, and the electrostatic latent image 182 is formed by directly supplying a charge onto the surface of the recording medium 162 by the latent image forming head 186 so as to directly form an image on the recording medium 162 by the electric field induced by the charge. This arrangement does not require the image carrier 188, reducing the number of components, size, and cost of the apparatus and improving reliability. Also, in FIG. 41, a GND potential is applied by grounding the guide 7a as a counter electrode. However, it is also possible to stabilize formation of the electrostatic charge image by applying a charge from a power source which is additionally provided.

Figure 42:
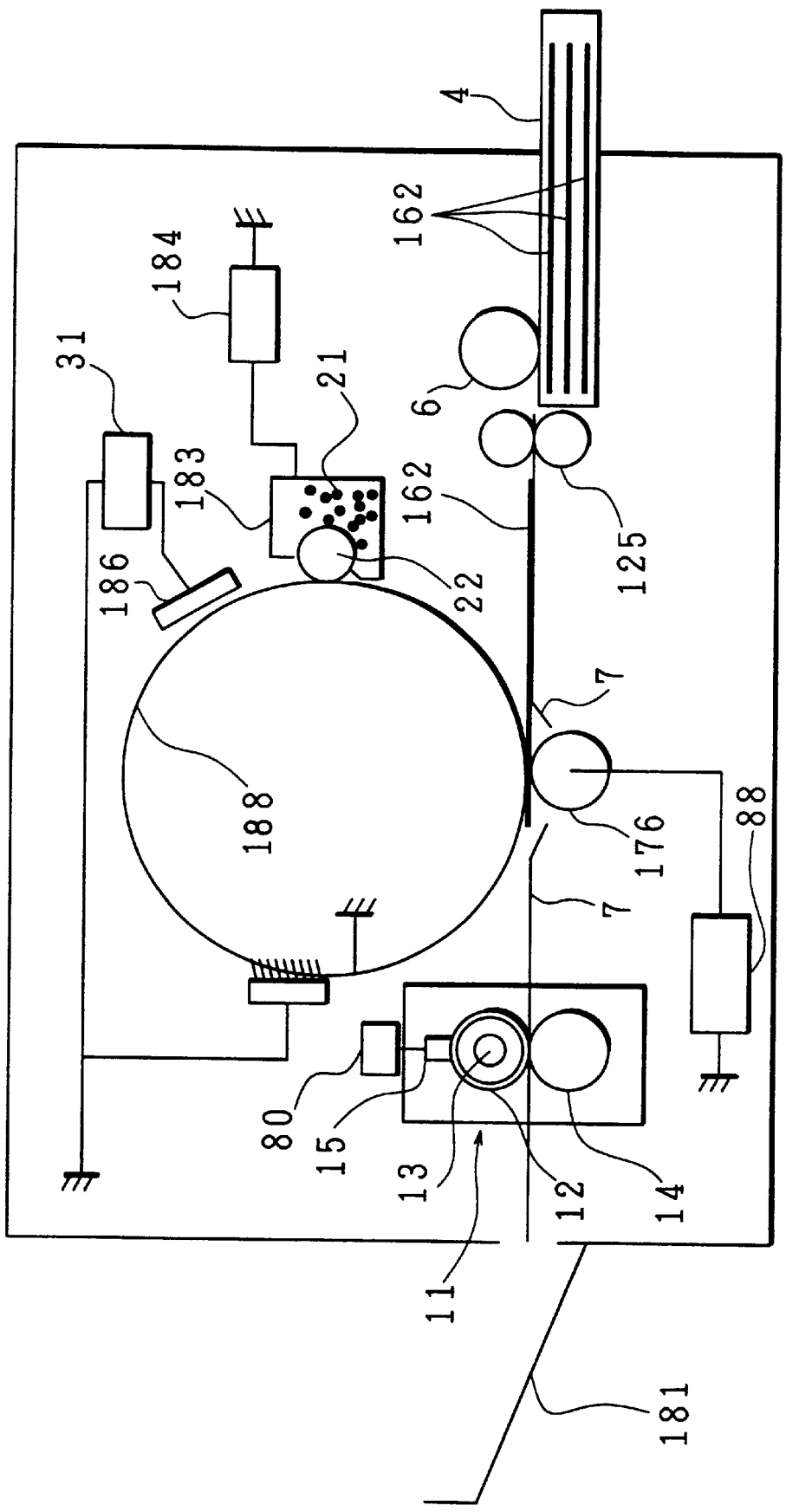
FIG. 42 is a drawing showing yet another example of the image forming apparatus in accordance with one embodiment of the present invention.

The image forming operation by the image forming apparatus of FIG. 38 can also be realized by an image forming apparatus adopting a so-called ion flow system, for example, as shown in FIG. 42. As with the image forming apparatus of FIG. 36, the image forming apparatus of FIG. 42 can also form a predetermined image with the first printing mode in which an ordinary sheet is used and the second printing mode in which the recording medium 162 is used, in which the control of the first printing mode is not carried out with respect to the developer tank 183, the fixing section 11, and the transfer roller 167 in the second printing mode. Detailed explanations of this copying operation are omitted here. Note that, in FIG. 42, a GND potential is applied by grounding the image carrier 188. However, not limiting to this, the formation of the electrostatic charge image may be stabilized by applying a potential from a power source which is additionally provided.

Figure 43:
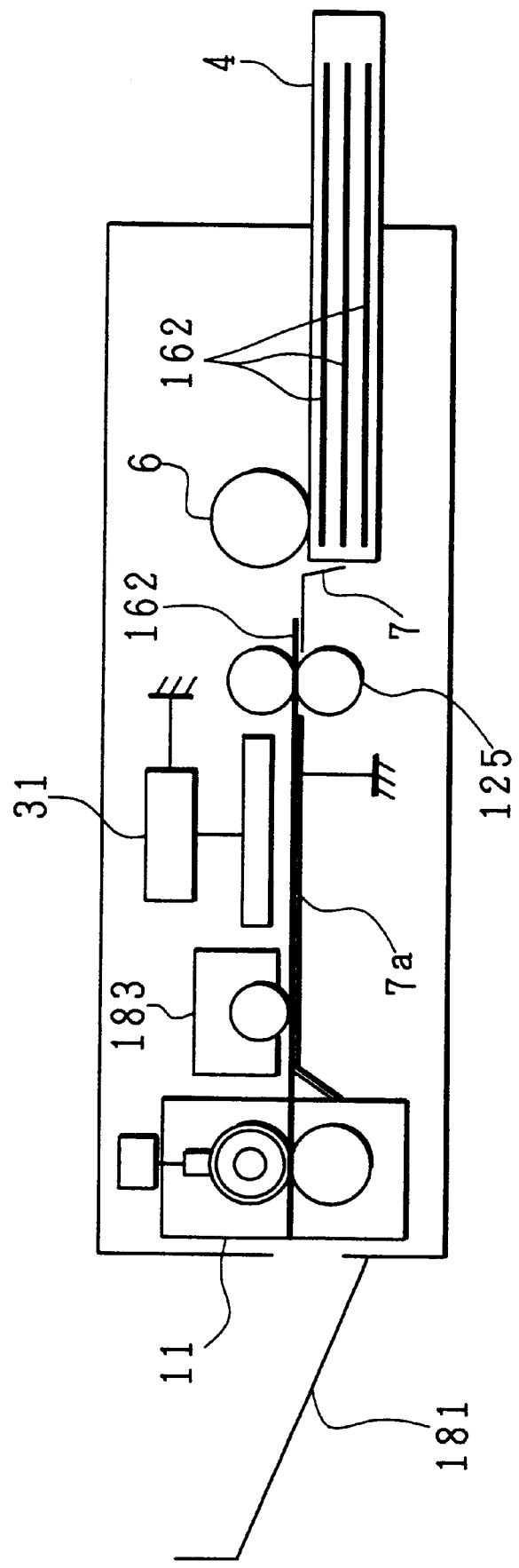
FIG. 43 is a drawing showing still another example of the image forming apparatus in accordance with one embodiment of the present invention.

Similarly, an image forming apparatus as shown in FIG. 43 may be realized from the image forming apparatus of FIG. 41. In FIG. 43, the fixing section 11 and the developer tank 183 are additionally provided in the image forming apparatus of FIG. 41. The image forming apparatus of FIG. 43, as with the image forming apparatus of FIG. 41, is also provided with the first printing mode and the second printing mode, and carries out the control of adjusting the functions of the components in accordance with the recording medium used so as to obtain a desirable image. Note that, in FIG. 43, a GND potential is applied by grounding the guide 7a as a counter electrode. However, not limiting to this, the formation of the electrostatic charge image may be stabilized by applying a potential from a power source which is additionally provided.

Also, using an image forming apparatus having a variety of printing processes for an ordinary sheet of paper but not having the second printing mode for the recording medium 162, in the case where the image forming apparatus is provided with control means capable of changing the control content of the components of the apparatus, the control may be carried out by changing the control content stored in the control means so that the image forming apparatus can form an image on the recording medium 162 in the second printing mode. Here, when the content data to be changed are large, the control content may be changed by using, for example, a floppy disk, MO disk, CD-ROM, hard disk, or IC card, which stores the content to be changed and an application for appropriately changing the content and also the application data.

As described, the recording medium of the present invention includes an optical polarizing material whose polarizing axis is controlled by an applied electric field; and a layer including the optical polarizing material, and spacing maintaining means for maintaining a constant spacing between the layer, the recording medium being formed in a form of a sheet having bending elasticity which is bendable, a visible image being recorded on the recording medium by applying a predetermined electrostatic charge image composed of electrostatic charges on a surface of the recording medium and by controlling the polarizing axis of the optical polarizing material by an electric field formed by the charges of the electrostatic charge image, by which reflectance or transmittance of incident light is controlled.

With this arrangement, an image is formed by application of a charge on the surface of the recording medium, thus realizing an inexpensive recording medium having rewritability which can be handled with ease.

Also, with the above arrangement, since the spacing maintaining means (spacers) is provided, image formation by the optical polarizing material, and the strength and durability of the recording medium are ensured. The spacing maintaining means may be provided in the form of a wall so as to part each pixel, or may be randomly disposed, or may be spherical spacers.

As the optical polarizing material, for example, a liquid crystal material may be adopted. Alternatively, the optical polarizing material may be provided with a white board on its back surface.

The optical polarizing material may control the reflectance or transmittance of incident light by an applied electric field by itself. With this arrangement, it is not required to additionally provide a polarizing plate for controlling transmission of light, thus simplifying the structure of the recording medium and reducing the cost.

It is preferable that an arbitrary portion of the optical polarizing material can be colored. This is preferable because when, for example, the back side of the optical polarizing material is colored, the same effect as obtained when the board is provided can be obtained with a simpler structure.

The optical polarizing material may be made of a material having a threshold value for changing the polarizing axis with respect to the strength of an applied electric field. This prevents deterioration of the image on the edge of the charge image applied on the surface of the recording medium, thus forming an image with a desirable contrast.

The recording medium may be provided with a protective layer on the surface. This allows the recording medium to be desirably maintained without damaging the polarizing plate and the board provided on the surface of the recording medium and without damaging the optical polarizing material.

The surface of the recording medium or the protective layer on the surface thereof may be made of a middle to high resistance material. This allows the charge existing on the surface or other parts of the recording medium to be easily removed and the charge generated by rubbing with other materials to be quickly neutralized.

The recording medium may be provided with a transmissive board. This realizes an effectively transparent recording medium, thus realizing a recording medium that can be used as an OHP sheet.

The recording medium may be provided with a conductive board. This stabilizes formation of an electric field in the recording medium by the charge put on the surface thereof, thus realizing stable image formation regardless of where the recording medium is provided.

The recording medium of the present invention preferably includes a plurality of capsules including the optical polarizing material, and filling means for filling the gaps between the capsules.

In this arrangement, the capsules and the filling means between the capsules are provided, and the optical polarizing material such as a liquid crystal material is enclosed in the capsules, thus increasing the selection of the liquid crystal materials which can be used, reducing the cost, and improving the strength of the recording medium.

In the arrangement without the capsules, there is a case where the property of the liquid crystal material is changed by the chemical reaction between the liquid crystal material and the spacers and the boards. In contrast, in the arrangement with the capsules, these members are completely separated from the capsules, thus stably maintaining the property of the liquid crystal material for an extended period of time. Further, this arrangement does not require spacers to be additionally provided, preventing various problems associated with the spacers.

The filling means may be transmissive. This realizes an effectively transparent recording medium, thus realizing a recording medium that can be used as an OHP sheet.

It is preferable that in the recording medium of the present invention, the optical polarizing material maintains the polarizing state of the polarizing axis, which is controlled by application of a charge, even after the charge is removed.

With this arrangement, the optical polarizing material has memory effect, and therefore it is not required to constantly apply an electric field in accordance with the image, thus maintaining the image for an extended period of time and realizing a desirable recording medium.

It is preferable that the recording medium of the present invention includes a second optical polarizing material, which is provided via the optical polarizing material with respect to the surface on which the charge is applied so that different images are recorded on the optical polarizing material and the second optical polarizing material.

With this arrangement, it is possible to realize a recording medium capable of recording an image on the both sides.

A first image forming apparatus of the present invention, as described, is an image forming apparatus which forms an image on the recording medium having an optical polarizing material, and includes recording means for supplying a charge on the surface of the recording medium by being made contact with the recording medium, and an image is formed by moving the recording means on the recording medium.

With this arrangement, an image is formed on the recording medium with ease using the recording means.

The image formed on the recording medium may be different depending on the pressure of the recording means on the recording medium. With this arrangement, the dark region formed is changed in accordance with the pressure of the recording means, allowing the user to easily control the line width, etc., and increasing the degree of freedom of image formation, thus realizing a recording medium capable of forming a more desirable image.

It is preferable that the first image forming apparatus of the present invention includes a power source for applying a voltage to the recording means, and a conductive substrate, which is provided on an opposite side of a surface to be made contact with the recording means, and that the recording means is provided with a middle to high resistance member on a portion brought into contact with the recording medium.

With this arrangement, no insulator is used for a region where the recording means is made contact with the recording medium, preventing a charge-up due to frictional charging in recording operation and maintaining desirable image formation for an extended period of time. Also, since no conductor is used for the region of contact, there occurs no short-circuiting with other components and no electrification of the user by the potential supplied to the recording means.

Also, because the conductive substrate is provided, the electric field by the charge put on the surface of the recording medium is stably formed in the recording medium, thus realizing stable image formation regardless of where the recording medium is provided.

It is preferable that in the first image forming apparatus of the present invention, the recording means supplies a charge onto the surface of the recording medium by the friction force between the recording means and the recording medium.

With this arrangement, because the charge is supplied to the recording medium by the frictional charging with the recording means, it is not required to provide the power source for the recording means and wiring for the power source, thus realizing the simplest arrangement of image formation and eliminating restrictions imposed by the power source and the wiring on the power source.

A second image forming apparatus of the present invention, as described, is an image forming apparatus which forms an image on the recording medium having the optical polarizing material, and includes an image carrier, electrostatic charge image generating means for generating an electrostatic charge image in accordance with image data on a surface of the image carrier, and transport means for transporting the recording medium onto the surface of the image carrier so as to form an image in accordance with the electrostatic charge image on the recording medium.

With this arrangement, an electrostatic charge image in accordance with image data is formed on the image carrier, and the image is formed on the recording medium using the electrostatic charge image. Namely, it is possible to realize an image forming apparatus which, in addition to allowing the user to freely form an image on the recording medium, forms a predetermined image by image data, for example, from a copy image of a document or from a computer.

In order to form an image on the recording medium, the second image forming apparatus of the present invention may include an electric field generating means which is provided so as to face the image carrier, and the transport means transports the recording medium to a facing region of the image carrier and the electric field generating means and transports the recording medium out of the facing region. As a result, an electric field in accordance with the electrostatic charge image is generated in a region where the surface of the image carrier faces the electric field generating means, and an image is formed on the recording medium by the electric field.

It is preferable that the second image forming apparatus of the present invention includes developing means, provided so as to face the image carrier, for visualizing the electrostatic charge image by a developer of at least one color, and is provided with a first printing mode in which an image is formed on the recording medium using an image visualized on the image carrier by the developer, and a second printing mode in which an image is formed on the recording medium including the optical polarizing material from the electrostatic charge image formed on the image carrier.

With this arrangement, because the first printing mode and the second printing mode are provided, it is possible to realize an image forming apparatus which allows the use of not only the recording medium having the optical polarizing material but also an ordinary sheet of paper, etc. For example, it is possible to have an arrangement wherein switching means for switching the first printing mode and the second printing mode is provided, and while the image formed on the surface of the image carrier by the developer is transferred to the recording medium in the first printing mode, the developing means is disabled in the second printing mode.

It is also possible to have an arrangement wherein an image is formed on the recording medium having the optical polarizing material using a developer also in the first printing mode. This allows, for example, borders or ruled lines of a predetermined format to be formed on the recording medium having the optical polarizing material also in the first printing mode.

It is also possible to have an arrangement wherein, when forming an image on the recording medium in the second printing mode, a strength of an electric field applied to the recording medium, other than a component due to the electrostatic charge image is controlled to be different from a strength of an electric field at least in the first printing mode. With this control, the strong electric field used in transfer in the first printing mode is not applied in the second printing mode. Therefore, a predetermined image formation is not disturbed by the strong electric field and a desirable image forming operation is ensured, thus realizing a desirable transfer even when the recording medium having the optical polarizing material is used, obtaining a predetermined image.

The second image forming apparatus of the present invention may also have an arrangement including control means for controlling the image forming operation of the image forming apparatus, and the control means controls image formation which does not use the developer with respect to at least the recording medium including the optical polarizing material. This allows the control content of the components to be changed so that the image formation is smoothly carried out in the second printing mode.

It is also possible to have an arrangement wherein the image forming operation is controlled using an information recording medium containing information for controlling image formation which does not use the developer with respect to the recording medium including the optical polarizing material. This allows the predetermined image forming operation of the second printing mode to be carried out also in image forming apparatuses which do not allow image formation with respect to the recording medium.

It is preferable that the second image forming apparatus of the present invention includes a charged particle source, provided so as to face the image carrier, for outputting charged particles including ions or electrons, the electrostatic charge image forming means being provided on a facing region of the charged particle source and the image carrier and including a plurality of passage sections of the charged particles outputted from the charged particle source, the electrostatic charge image forming means controlling passage of the charged particles by application of a potential in accordance with image data to an electrode provided on each of the plurality of passage sections so as to form an electrostatic charge image on the image carrier.

With this arrangement, it is not required to provide charging means for a photoreceptor (image carrier) with respect to image formation on the recording medium, and exposing means for exposing the photoreceptor, thus further reducing the number of components and the size and the cost of the apparatus.

A third image forming apparatus of the present invention, as described, is an image forming apparatus which forms an image on the recording medium having the optical polarizing material, and includes a charged particle source for outputting charged particles including ions or electrons; a counter electrode facing the charged particle source; electrostatic charge image forming means, provided on a facing region of the counter electrode and the charged particle source, including a plurality of passage sections of the charged particles outputted from the charged particle source, for forming an electrostatic charge image on a surface of the recording medium transported onto a surface of the counter electrode by controlling passage of the charged particles by application of a potential in accordance with image data to an electrode provided on each of the plurality of passage sections; and developing means for visualizing the electrostatic charge image by a developer of at least one color, the image forming apparatus being provided with a first printing mode in which an image is formed on the recording medium using the developer, and a second printing mode in which an image is formed on the recording medium including the optical polarizing material from the electrostatic charge image.

With this arrangement, the image can be formed directly on the recording medium, thus realizing image formation on the recording medium with a simple arrangement.

It is preferable that the second or third image forming apparatus of the present invention includes fixing means for fixing the developer on the recording medium; and control means for controlling the fixing means so that the fixing means carries out fixing in the first printing mode and does not carry out fixing in the second printing mode.

With this arrangement, when using the recording medium having the optical polarizing material, the fixing device is controlled so that the heat applied in the first printing mode is not applied to the fixing section in the second printing mode. This increases the selection of the optical recording materials such as a liquid crystal material that can be used for the recording medium and reduces the power consumption in the second printing mode, and a warm-up time is not required, thus realizing fast printing.

It is preferable that the second or third image forming apparatus of the present invention includes discharge means for removing the charge on the recording medium after forming an image on the recording medium in the second printing mode.

With this arrangement, the surface charge on the recording medium is removed after forming an image on the recording medium in the second printing mode, and the problems caused by the electrostatic force of the charge are prevented. For example, when a charge remains on the surface of the recording medium, the recording medium adheres on the transport path by the electrostatic force of the charge. This is not preferable because transport failure of the recording medium and the paper jam are easily generated and it may cause other troubles in the apparatus. Also, a remaining charge on the recording medium causes the recording medium to be easily contaminated by dusts and particles in the air which are attracted by the electrostatic force of the charge after the recording medium is transported out of the image forming apparatus. In this manner, a remaining charge on the surface of the recording medium causes many problems. Such problems can all be solved by discharging the surface of the recording medium after forming an image.

The discharge means may have an arrangement wherein a discharge effect of the discharge means for removing a charge is exhibited by a part of the discharge means which is positioned so as to make contact with or to be in a vicinity of the recording medium.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A recording medium, including:
an optical polarizing material whose polarizing axis is controlled by an applied electric field; and
a layer including the optical polarizing material, and a spacer for maintaining a constant spacing between first and second substrates sandwiching the layer, said spacer being provided independently of the optical polarizing material,
said recording medium being formed in a form of a sheet having bending elasticity which is bendable,
an image being recorded on said recording medium by applying a predetermined electrostatic charge image composed of electrostatic charges on a surface of said recording medium and by controlling the polarizing axis of the optical polarizing material by an electric field formed by the charges of the electrostatic charge image, by which reflectance or transmittance of incident light is controlled.

2. The recording medium as set forth in claim 1, wherein the spacer is randomly disposed.

3. The recording medium as set forth in claim 1, wherein the optical polarizing material is a liquid crystal material.

4. The recording medium as set forth in claim 1, wherein a white board is provided on one side of the sheet.

5. The recording medium as set forth in claim 1, wherein the optical polarizing material is partially colored.

6. The recording medium as set forth in claim 1, wherein the optical polarizing material has a threshold value for changing the polarizing axis with respect to a strength of an applied electric field.

7. The recording medium as set forth in claim 1, wherein a protective layer is provided on one side of the sheet.

8. The recording medium as set forth in claim 1, wherein a middle to high resistance member is provided on one side of the sheet.

9. The recording medium as set forth in claim 1, wherein a transmissive board is provided on one side of the sheet.

10. The recording medium as set forth in claim 1, wherein a conductive board is provided on one side of the sheet.

11. The recording medium as set forth in claim 1, including a plurality of capsules containing the optical polarizing material, and filling means for filling gaps between the plurality of capsules.

12. The recording medium as set forth in claim 11, wherein said filling means is transmissive.

13. The recording medium as set forth in claim 1, wherein the optical polarizing material maintains a polarizing state of the polarizing axis, which is controlled by application of a charge, even after the charge is removed.

14. A recording medium as set forth in claim 1 wherein the spacer is a plurality of spherical spacers having a plurality of diameters.

15. A recording medium as set forth in claim 1 wherein the spacer is a plurality of spherical spacers of a predetermined diameter.

16. A recording medium as recited in claim 1 wherein the first substrate is a polarizing plate and the second substrate is a white board.

17. A recording medium including:
an optical polarizing material whose polarizing axis is controlled by an applied electric field; and
a layer including the optical polarizing material, and a spacer for maintaining a constant spacing between first and second substrates sandwiching the layer, said spacer being provided independently of the optical polarizing material,
said recording medium being formed in a form of a sheet having bending elasticity which is bendable,
an image being recorded on said recording medium by applying a predetermined electrostatic charge image composed of electrostatic charges on a surface of said recording medium and by controlling the polarizing axis of the optical polarizing material by an electric field formed by the charges of the electrostatic charge image, by which reflectance or transmittance of incident light is controlled, the image being formed by a plurality of pixels into which the optical polarizing material is partitioned, and the spacer being formed in a form of a wall so as to part each pixel.

18. A recording medium as recited in claim 17 wherein the first substrate is a polarizing plate and the second substrate is a white board.

19. A recording medium, including:

an optical polarizing material whose polarizing axis is controlled by an applied electric field; and a layer including the optical polarizing material, and a spacer for maintaining a constant spacing between first and second substrates sandwiching the layer, said spacer being provided independently of the optical polarizing material, said recording medium being formed in a form of a sheet having bending elasticity which is bendable, an image being recorded on said recording medium by applying a predetermined electrostatic charge image composed of electrostatic charges on a surface of said recording medium and by controlling the polarizing axis of the optical polarizing material by an electric field formed by the charges of the electrostatic charge image, by which reflectance or transmittance of incident light is controlled, and wherein the spacer is a spherical spacer.

20. A recording medium as recited in claim 19 wherein the first substrate is a polarizing plate and the second substrate is a white board.

21. A recording medium including:

an optical polarizing material whose polarizing axis is controlled by an applied electric field; and a layer including the optical polarizing material, and a spacer for maintaining a constant spacing between first and second substrates sandwiching the layer, said spacer being provided independently of the optical polarizing material, said recording medium being formed in a form of a sheet having bending elasticity which is bendable, an image being recorded on said recording medium by applying a predetermined electrostatic charge image composed of electrostatic charges on a surface of said recording medium and by controlling the polarizing axis of the opticil polarizing material by an electric field formed by the charges of the electrostatic charge image, by which reflectance or transmittance of incident light is controlled, and a second optical polarizing material, which is provided via the optical polarizing material with respect to the surface on which the charges are applied so that different images are recorded on the optical polarizing material and the second optical polarizing material.

22. A recording medium as recited in claim 21 wherein the first substrate is a polarizing plate and the second substrate is a white board.

23. An image forming apparatus for forming an image on a recording medium including an optical polarizing material whose polarizing axis is controlled by an applied electric field, a layer including the optical polarizing material, and a spacer for maintaining a constant spacing between first and second substrates sandwiching the layer, said spacer being provided independently of the optical polarizing material, the recording medium being formed in a form of a sheet having bending elasticity which is bendable, an image being recorded on the recording medium by applying a predetermined electrostatic charge image composed of electrostatic charges on a surface of the recording medium and by controlling the polarizing axis of the optical polarizing material by an electric field formed by the charges of the electrostatic charge image, by which reflectance or transmittance of incident light is controlled, said image forming apparatus including recording means for supplying a charge on the surface of the recording medium by being made contact with the recording medium, an image being formed by moving the recording means on the recording medium.

24. The image forming apparatus as set forth in claim 23, comprising:

a power source for applying a voltage to the recording means; and a conductive substrate, which is provided on an opposite side of a surface to be made contact with the recording means, the recording means being provided with a middle to high resistance member on a portion brought into contact with the recording medium.

25. An image forming apparatus for forming an image on a recording medium including an optical polarizing material whose polarizing axis is controlled by an applied electric field, a layer including the optical polarizing material, and a spacer for maintaining a constant spacing between first and second substrates sandwiching the layer, said spacer being provided independently of the optical polarizing material, the recording medium being formed in a form of a sheet having bending elasticity which is bendable, an image being recorded on the recording medium by applying a predetermined electrostatic charge image composed of electrostatic charges on a surface of the recording medium and by controlling the polarizing axis of the optical polarizing material by an electric field formed by the charges of the electrostatic charge image, by which reflectance or transmittance of incident light is controlled, said image forming apparatus including recording means for supplying a charge on the surface of the recording medium by being made contact with the recording medium, an image being formed by moving the recording means on the recording medium, and wherein different images are formed on the recording medium by a difference in pressure of the recording means on the recording medium.

26. An image forming apparatus as recited in claim 25 wherein said spacer is not provided independently of the optical polarizing material, and wherein the spacer is the optical polarizing material which is a high molecular weight liquid crystal material.

27. A recording medium as recited in claim 25 wherein the first substrate is a polarizing plate and the second substrate is a white board.

28. An image forming apparatus for forming an image on a recording medium including an optical polarizing material whose polarizing axis is controlled by an applied electric field, a layer including the optical polarizing material, and a spacer means for maintaining a constant spacing between first and second substrates sandwiching the layer, said spacer being provided independently of the optical polarizing material, the recording medium being formed in a form of a sheet having bending elasticity which is bendable, an image being recorded on the recording medium by applying a predetermined electrostatic charge image composed of electrostatic charges on a surface of the recording medium and by controlling the polarizing axis of the optical polarizing material by an electric field formed by the charges of the electrostatic charge image, by which reflectance or transmittance of incident light is controlled, said image forming apparatus including recording means for supplying a charge on the surface of the recording medium by being made contact with the recording medium, an image being formed by moving the recording means on the recording medium, and wherein different images are formed on the recording medium by a difference in pressure of the recording means on the recording medium.

29. An image forming apparatus as recited in claim 28 wherein said spacer is not provided independently of the optical polarizing material, and wherein the spacer is the optical polarizing material which is a high molecular weight liquid crystal material.

30. A recording medium as recited in claim 28 wherein the first substrate is a polarizing plate and the second substrate is a white board.

31. An image forming apparatus for forming an image on a recording medium including an optical polarizing material whose polarizing axis is controlled by an applied electric field, a layer including the optical polarizing material, and a spacer for maintaining a constant spacing between first and second substrates sandwiching the layer, said spacer being provided independently of the optical polarizing material, the recording medium being formed in a form of a sheet having bending elasticity which is bendable, an image being recorded on the recording medium by applying a predetermined electrostatic charge image composed of electrostatic charges on a surface of the recording medium and by controlling the polarizing axis of the optical polarizing material by an electric field formed by the charges of the electrostatic charge image, by which reflectance or transmittance of incident light is controlled, said image forming apparatus comprising:
an image carrier;
electrostatic charge image forming means for generating an electrostatic charge image in accordance with image data on a surface of the image carrier; and
transport means for transporting the recording medium onto the surface of the image carrier so as to form an image in accordance with the electrostatic charge image on the recording medium.

32. The image forming apparatus as set forth in claim 31, including developing means, provided so as to face the image carrier, for visualizing the electrostatic charge image by a developer of at least one color, said image forming apparatus being provided with a first printing mode in which an image is formed on a recording medium using an image visualized on the image carrier by the developer, and a second printing mode in which an image is formed on the recording medium including the optical polarizing material from the electrostatic charge image formed on the image carrier.

33. The image forming apparatus as set forth in claim 32, including switching means for switching the first printing mode and the second printing mode, the image formed on the surface of the image carrier by the developer being transferred to the recording medium in the first printing mode, and the developing means being disabled in the second printing mode.

34. The image forming apparatus as set forth in claim 32, including a transfer roller, provided so as to face the image carrier, for generating an electric field, said transport means transporting the recording medium to a facing region of the image carrier and the transfer roller and transporting the recording medium out of the facing region.

35. The image forming apparatus as set forth in claim 32, wherein an image forming operation is controlled using an information recording medium containing information for controlling image formation which does not use the developer with respect to the recording medium including the optical polarizing material.

36. The image forming apparatus as set forth in claim 32, including:
fixing means for fixing the developer on the recording medium; and
control means for controlling the fixing means so that the fixing means carries out fixing in the first printing mode and does not carry out fixing in the second printing mode.

37. The image forming apparatus as set forth in claim 32, including discharge means for removing a charge on the recording medium after forming an image on the recording medium in the second printing mode.

38. The image forming apparatus as set forth in claim 37, wherein a discharge effect of the discharge means for removing a charge is exhibited by a part of the discharge means which is positioned so as to make contact with or to be in a vicinity of the recording medium.

39. The image forming apparatus as set forth in claim 31, including a charged particle source, provided so as to face the image carrier, for outputting charged particles including ions or electrons, the electrostatic charge image forming means being provided on a facing region of the charged particle source and the image carrier and including a plurality of passage sections of the charged particles outputted from the charged particle source, the electrostatic charge image forming means controlling passage of the charged particles by application of a potential in accordance with image data to an electrode provided on each of the plurality of passage sections so as to form an electrostatic charge image on the image carrier.

40. An image forming apparatus for forming an image on a recording medium, including an optical polarizing material whose polarizing axis is controlled by an applied electric field, a layer including the optical polarizing material, and a spacer for maintaining a constant spacing between first and second substrates sandwiching the layer, said spacer being provided independently of the optical polarizing material, the recording medium being formed in a form of a sheet having bending elasticity which is bendable, an image being recorded on the recording medium by applying a predetermined electrostatic charge image composed of electrostatic charges on a surface of the recording medium and by controlling the polarizing axis of the optical polarizing material by an electric field formed by the charges of the electrostatic charge image, by which reflectance or transmittance of incident light is controlled, said image forming apparatus comprising:
an image carrier;
electrostatic charge image forming means for generating an electrostatic charge image in accordance with image data on a surface of the image carrier; and transport means for transporting the recording medium onto the surface of the image carrier so as to form an image in accordance with the electrostatic charge image on the recording medium, developing means, provided so as to face the image carrier, for visualizing the electrostatic charge image by a developer of at least one color, said image forming apparatus being provided with a first printing mode in which an image is formed on a recording medium using an image visualized on the image carrier by the developer, and a second printing mode in which an image is formed on the recording medium including the optical polarizing material from the electrostatic charge image formed on the image carrier, and wherein, when forming an image on the recording medium in the second printing mode, a strength of an electric field applied to the recording medium, other than a component due to the electrostatic charge image is controlled to be weaker than a strength of an electric field at least in the first printing mode.

41. An image forming apparatus as recited in claim 40 wherein said spacer is not provided independently of the optical polarizing material, and wherein the spacer is the optical polarizing material which is a high molecular weight liquid crystal material.

42. An image forming apparatus for forming an image on a recording medium including an optical polarizing material whose polarizing axis is controlled by an applied electric field, a layer including the optical polarizing material, and a spacer for maintaining a constant spacing between first and second substrates sandwiching the layer, said spacer being provided independently of the optical polarizing material, the recording medium being formed in a form of a sheet having bending elasticity which is bendable, an image being recorded on the recording medium by applying a predetermined electrostatic charge image composed of electrostatic charges on a surface of the recording medium and by controlling the polarizing axis of the optical polarizing material by an electric field formed by the charges of the electrostatic charge image, by which reflectance of transmittance of incident light is controlled, said image forming apparatus comprising:

a charged particle source for outputting charged particles including ions or electrons;

a counter electrode facing the charged particle source;

electrostatic charge image forming means, provided on a facing region of the counter electrode and the charged particle source, including a plurality of a passage sections of the charged particles outputted from the charged particle source, for forming an electrostatic charge image on a surface of the recording medium transported onto a surface of the counter electrode by controlling passage of the charged particles through the plurality of passage sections by application of a potential in accordance with image data to an electrode provided on each of the plurality of passage sections; and developing means for visualizing the electrostatic charge image by a developer of at least one color, said image forming apparatus being provided with a first printing mode in which an image is formed on a recording medium using the developer, and a second printing mode in which an image is formed on the recording medium including the optical polarizing material from the electrostatic charge image.

43. The image forming apparatus as set forth in claim 42, including switching means for switching the first printing mode and the second printing mode, the image formed by the developer on the recording medium in the first printing mode, and the developing means being disabled in the second printing mode.

44. The image forming apparatus as set forth in claim 42, including a transfer roller, provided so as to face an image carrier for the counter electrode, for generating an electric field, said transport means transporting the recording medium to a facing region of the image carrier and the transfer roller and transporting the recording medium out of the facing region.

45. The image forming apparatus as set forth in claim 42, wherein an image forming operation is controlled using an information recording medium containing information for controlling image formation which does not use the developer with respect to the recording medium including the optical polarizing material.

46. The image forming apparatus as set forth in claim 42, including:

fixing means for fixing the developer on the recording medium; and control means for controlling the fixing means so that the fixing means carries out fixing in the first printing mode and does not carry out fixing in the second printing mode.

47. The image forming apparatus as set forth in claim 42, including discharge means for removing a charge on the recording medium after forming an image on the recording medium in the second printing mode.

48. The image forming apparatus as set forth in claim 47, wherein a discharge effect of the discharge means for removing a charge is exhibited by a part of the discharge means which is positioned so as to make contact with or to be in a vicinity of the recording medium.

49. An image forming apparatus for forming an image on a recording medium, including an optical polarizing material whose polarizing axis is controlled by an applied electric field, a layer including the optical polarizing material, and a spacer for maintaining a constant spacing between first and second substrates sandwiching the layer, said spacer being provided independently of the optical polarizing material, the recording medium being formed in a form of a sheet having bending elasticity which is bendable, an image being recorded on the recording medium by applying a predetermined electrostatic charge image composed of electrostatic charges on a surface of the recording medium and by controlling the polarizing axis of the optical polarizing material by an electric field formed by the charges of the electrostatic charge image, by which reflectance or transmittance of incident light is controlled, said image forming apparatus comprising:

a charged particle source for outputting charged particles including ions or electrons;

a counter electrode facing the charged particle source;

electrostatic charge image forming means, provided on a facing region of the counter electrode and the charged particle source, including a plurality of passage sections of the charged particles outputted from the charged particle source, for forming an electrostatic charge image on a surface of the recording medium transported onto a surface of the counter electrode by controlling passage of the charged particles through the plurality of passage sections by application of a potential in accordance with image data to an electrode provided on each of the plurality of passage sections; and developing means for visualizing the electrostatic charge image by a developer of at least one color, said image forming apparatus being provided with a first printing mode in which an image is formed on a recording medium using the developer, and a second printing mode in which an image is formed on the recording medium including the optical polarizing material from the electrostatic charge image, and wherein, when forming an image on the recording medium in the second printing mode, a strength of an electric field applied to the recording medium, other than a component due to the electrostatic charge image is controlled to be weaker than a strength of an electric field at least in the first printing mode.

50. An image forming apparatus as recited in claim 49 wherein said spacer is not provided independently of the optical polarizing material, and wherein the spacer is the optical polarizing material which is a high molecular weight liquid crystal material.

* * * * *